United States Patent
Wei et al.

(10) Patent No.: US 10,924,574 B2
(45) Date of Patent: *Feb. 16, 2021

(54) SYSTEMS AND METHODS FOR MANAGING LOADING PRIORITY OR SEQUENCING OF FRAGMENTS OF A WEB OBJECT

(71) Applicant: Yottaa Inc., Waltham, MA (US)

(72) Inventors: Coach K. Wei, Natick, MA (US); Robert Buffone, Wakefield, MA (US)

(73) Assignee: Yottaa Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,671

(22) Filed: Nov. 9, 2017

(65) Prior Publication Data
US 2018/0067909 A1 Mar. 8, 2018

Related U.S. Application Data

(63) Continuation of application No. 15/061,711, filed on Mar. 4, 2016, which is a continuation of application
(Continued)

(51) Int. Cl.
*G06F 17/00* (2019.01)
*H04L 29/08* (2006.01)
(Continued)

(52) U.S. Cl.
CPC ............ *H04L 67/2823* (2013.01); *G06F 9/46* (2013.01); *G06F 9/54* (2013.01); *G06F 16/00* (2019.01);
(Continued)

(58) Field of Classification Search
CPC ........ G06F 17/2247; G06F 9/54; G06F 40/14; H04L 67/34; H04L 67/2804
(Continued)

(56) References Cited

U.S. PATENT DOCUMENTS 6,618,751 B1 * 9/2003 Challenger ........... H04L 67/325
709/203
7,266,595 B1 * 9/2007 Black .................. H04L 41/0806
709/223
(Continued)

FOREIGN PATENT DOCUMENTS

EP 1 918 826 B1 2/2012

OTHER PUBLICATIONS

Alli et al., Automatic Page Scrolling for Mobile Web Search, IEEE 2014, pp. 175-182.
(Continued)

*Primary Examiner* — Stephen S Hong
*Assistant Examiner* — Matthew J Ludwig
(74) *Attorney, Agent, or Firm* — Foley & Lardner LLP

(57) ABSTRACT

This disclosure is directed to methods and systems for managing rendering of a web page in a browser. A client operated by a user may execute code within a first fragment of a web page as the first fragment is presented to the user. The code may be injected into the first fragment by an intermediary between the client and a server of the web page. The intermediary may have split the web page into the first fragment and a plurality of fragments, and may have modified a default rendering characteristic for each of the plurality of fragments. Each of the modified rendering characteristic may include a trigger and action for rendering of a corresponding fragment. The executing code may dynamically detect a trigger for rendering of a second fragment from the plurality of fragments. The executing code may initiate a corresponding action for rendering of the second fragment.

20 Claims, 21 Drawing Sheets

Related U.S. Application Data

No. 14/163,642, filed on Jan. 24, 2014, now Pat. No. 9,282,145.

(60) Provisional application No. 61/880,347, filed on Sep. 20, 2013.

(51) Int. Cl.

| | |
|---|---|
| *G06F 16/00* | (2019.01) |
| *G06F 9/54* | (2006.01) |
| *G06F 40/14* | (2020.01) |
| *H04L 29/06* | (2006.01) |
| *G06F 9/46* | (2006.01) |

(52) U.S. Cl.
CPC .............. *G06F 40/14* (2020.01); *H04L 67/02* (2013.01); *H04L 67/10* (2013.01); *H04L 67/2804* (2013.01); *H04L 67/2819* (2013.01); *H04L 67/34* (2013.01); *H04L 67/42* (2013.01); *G06F 2209/541* (2013.01); *G06F 2209/542* (2013.01)

(58) Field of Classification Search
USPC .......................... 715/234, 243, 254; 709/203
See application file for complete search history.

(56) References Cited

U.S. PATENT DOCUMENTS

| | | | |
|---|---|---|---|
| 7,320,028 B2 | 1/2008 | Dinovo | |
| 7,398,304 B2* | 7/2008 | Smith | G06F 16/9574 709/218 |
| 7,613,723 B2 | 11/2009 | Tully | |
| 7,657,595 B2 | 2/2010 | Agarwalla et al. | |
| 7,711,854 B2* | 5/2010 | Ecklund | H04L 67/2823 709/238 |
| 7,770,130 B1 | 8/2010 | Kaptelinin | |
| 7,774,331 B2 | 8/2010 | Barth et al. | |
| 7,797,376 B1 | 9/2010 | Desai | |
| 7,823,057 B1* | 10/2010 | Schultz | G06F 16/9566 715/229 |
| 7,849,403 B2 | 12/2010 | Joshi et al. | |
| 7,895,523 B2 | 2/2011 | Stockton | |
| 7,930,285 B2 | 4/2011 | Abraham et al. | |
| 7,987,243 B2 | 7/2011 | Stavrakos et al. | |
| 8,001,175 B2* | 8/2011 | Betancourt | H04L 67/2828 709/203 |
| 8,522,131 B1 | 8/2013 | Geddes | |
| 8,639,753 B1 | 1/2014 | Meadows | |
| 8,694,520 B1* | 4/2014 | Krishnakumar | G06F 17/30867 707/758 |
| 8,701,000 B2 | 4/2014 | Kroeger et al. | |
| 8,850,070 B2 | 9/2014 | Raghu et al. | |
| 9,870,349 B2* | 1/2018 | Wei | G06F 16/00 |
| 9,953,007 B2 | 4/2018 | Oyarzabal et al. | |
| 2002/0035642 A1 | 3/2002 | Clarke et al. | |
| 2002/0133627 A1 | 9/2002 | Maes et al. | |
| 2003/0174841 A1 | 9/2003 | Nault et al. | |
| 2003/0188016 A1 | 10/2003 | Agarwalla et al. | |
| 2004/0049574 A1 | 3/2004 | Watson et al. | |
| 2004/0064481 A1 | 4/2004 | Azami | |
| 2004/0101873 A1 | 5/2004 | Went | |
| 2004/0162886 A1 | 8/2004 | Ims et al. | |
| 2005/0071745 A1 | 3/2005 | Ehrich et al. | |
| 2005/0210243 A1 | 9/2005 | Archard et al. | |
| 2006/0015512 A1 | 1/2006 | Alon et al. | |
| 2006/0225065 A1 | 10/2006 | Chandhok et al. | |
| 2008/0016240 A1 | 1/2008 | Balandin | |
| 2008/0077809 A1 | 3/2008 | Hayler et al. | |
| 2008/0104269 A1* | 5/2008 | Vitanov | G06F 17/30902 709/236 |
| 2008/0120538 A1 | 5/2008 | Kurz et al. | |
| 2008/0126479 A1 | 5/2008 | Zhang et al. | |
| 2008/0148145 A1* | 6/2008 | Jacob | G06F 16/958 715/243 |
| 2009/0083538 A1 | 3/2009 | Merugu et al. | |
| 2009/0106255 A1* | 4/2009 | Lacapra | G06F 11/1076 |
| 2009/0106349 A1 | 4/2009 | Harris | |
| 2009/0119504 A1 | 5/2009 | Van Os et al. | |
| 2009/0234972 A1 | 9/2009 | Raghu et al. | |
| 2009/0281989 A1 | 11/2009 | Shukla et al. | |
| 2009/0307622 A1 | 12/2009 | Jalon et al. | |
| 2010/0002013 A1 | 1/2010 | Kagaya | |
| 2010/0005169 A1 | 1/2010 | Von Hilgers | |
| 2010/0131585 A1 | 5/2010 | Rodrigue et al. | |
| 2010/0278453 A1 | 11/2010 | King | |
| 2011/0145321 A1 | 6/2011 | Jiang | |
| 2012/0096129 A1* | 4/2012 | Green | G06F 16/972 709/219 |
| 2012/0110450 A1 | 5/2012 | Kureshy et al. | |
| 2012/0137210 A1 | 5/2012 | Dillon | |
| 2012/0174121 A1 | 7/2012 | Treat et al. | |
| 2012/0194519 A1 | 8/2012 | Bissell et al. | |
| 2012/0198050 A1 | 8/2012 | Maki et al. | |
| 2012/0203873 A1 | 8/2012 | Lewin et al. | |
| 2012/0271960 A1 | 10/2012 | Geetha et al. | |
| 2012/0303697 A1* | 11/2012 | Alstad | G06F 17/30902 709/203 |
| 2013/0039419 A1 | 2/2013 | Denoual et al. | |
| 2013/0097522 A1 | 4/2013 | Devries | |
| 2013/0111325 A1 | 5/2013 | Yue et al. | |
| 2013/0117238 A1 | 5/2013 | Gower | |
| 2013/0124683 A1 | 5/2013 | Watanabe et al. | |
| 2013/0174000 A1 | 7/2013 | Bernstein et al. | |
| 2013/0185164 A1 | 7/2013 | Pottjegort | |
| 2013/0227004 A1 | 8/2013 | Scoda | |
| 2013/0250761 A1 | 9/2013 | Shatzkamer et al. | |
| 2013/0332253 A1 | 12/2013 | Shiffert et al. | |
| 2014/0026187 A1 | 1/2014 | Johnson et al. | |
| 2014/0059420 A1 | 2/2014 | Cole et al. | |
| 2014/0074588 A1 | 3/2014 | Bertsch et al. | |
| 2014/0096023 A1 | 4/2014 | Falkenberg et al. | |
| 2014/0136971 A1 | 5/2014 | Kumar et al. | |
| 2014/0244406 A1 | 8/2014 | Garcia-Martinez et al. | |
| 2014/0298298 A1 | 10/2014 | Cook et al. | |
| 2015/0032803 A1 | 1/2015 | Graham-Cumming et al. | |

OTHER PUBLICATIONS

Cardellini et al., Collaborative Proxy System for Distributed Web Content Transcoding, ACM 2000, pp. 520-527.
International Preliminary Report on Patentability on PCT/US2014/012962 dated Mar. 31, 2016.
International Search Report & Written Opinion on PCT/US2014/012962 dated Jun. 27, 2014.
Kiciman et al., AjaxScope: A Platform for Remotely Monitoring the Client-Side Behavior of Web 2.0 Applications, ACM 2010, pp. 1-52.
Notice of Allowance on U.S. Appl. No. 14/163,642 dated Oct. 22, 2015.
Office Action on U.S. Appl. No. 14/163,627 dated Apr. 8, 2016.
Office Action on U.S. Appl. No. 14/163,627 dated Jan. 29, 2015.
Office Action on U.S. Appl. No. 14/163,627 dated Oct. 4, 2016.
Office Action on U.S. Appl. No. 14/163,627 dated Oct. 8, 2015.
Office Action on U.S. Appl. No. 14/163,627 dated Mar. 23, 2017.
Office Action on U.S. Appl. No. 14/163,627 dated Jun. 18, 2015.
Office Action on U.S. Appl. No. 14/163,627 dated Jul. 3, 2014.
Office Action on U.S. Appl. No. 14/163,642 dated Feb. 13, 2015.
Office Action on U.S. Appl. No. 14/163,642 dated Aug. 11, 2014.
Office Action on U.S. Appl. No. 14/163,645 dated Jan. 4, 2016.
Office Action on U.S. Appl. No. 14/163,645 dated Dec. 12, 2014.
Office Action on U.S. Appl. No. 14/163,645 dated Apr. 1, 2015.
Office Action on U.S. Appl. No. 14/163,645 dated May 20, 2014.
Office Action on U.S. Appl. No. 14/163,645 dated Jul. 29, 2015.
Office Action on U.S. Appl. No. 14/488,536 dated Mar. 3, 2017.
Paterno et al., Automatically Adapting Web Sites for Mobile Access through Logical Description and Dynamic Analysis of Interaction Resources, ACM 2008, pp. 260-267.

(56) References Cited

OTHER PUBLICATIONS

Thompson et al., Intermediary Architecture: Interposing Middleware Object Services between Web Client and Server, ACM 1999, pp. 1-5.
Vasudevan et al., On Web Annotations: Promises and Pitfalls of Current Web Infrastructure, IEEE 1999, pp. 1-9.
Witt et al., Reducing Cognitive Overhead on the World Wide Web, Google 2001, pp. 311-320.
Final Office Action on U.S. Appl. No. 14/488,536 dated Sep. 6, 2019.
Final Office Action on U.S. Appl. No. 14/488,536 dated Jan. 5, 2018.
Final Office Action on U.S. Appl. No. 15/061,711 dated May 18, 2018.
Final Office Action on U.S. Appl. No. 15/802,025 dated Mar. 27, 2020.
Non-Final Office Action on U.S. Appl. No. 14/488,536 dated Oct. 2, 2018.
Non-Final Office Action on U.S. Appl. No. 15/802,025 dated Jun. 15, 2018.
Notice of Allowance on U.S. Appl. No. 14/488,536 dated Apr. 16, 2020.
Notice of Allowance on U.S. Appl. No. 14/488,536 dated Jul. 29, 2020.
Notice of Allowance on U.S. Appl. No. 15/802,025 dated Jun. 15, 2020.

\* cited by examiner

Fig. 2E

SYSTEMS AND METHODS FOR MANAGING LOADING PRIORITY OR SEQUENCING OF FRAGMENTS OF A WEB OBJECT

RELATED APPLICATIONS

This application is a continuation of, and claims priority to and the benefit of U.S. patent application Ser. No. 15/061,711, filed Mar. 4, 2016, entitled "SYSTEMS AND METHODS FOR MANAGING LOADING PRIORITY OR SEQUENCING OF FRAGMENTS OF A WEB OBJECT", which in turn is a continuation of, and claims priority to and the benefit of U.S. patent application Ser. No. 14/163,642, filed Jan. 24, 2014, entitled "SYSTEMS AND METHODS FOR MANAGING LOADING PRIORITY OR SEQUENCING OF FRAGMENTS OF A WEB OBJECT", which in turn is a nonprovisional of, and claims priority to U.S. Provisional Application No. 61/880,347, filed Sep. 20, 2013, entitled "SYSTEMS AND METHODS FOR MANAGING LOADING PRIORITY OR SEQUENCING OF FRAGMENTS OF A WEB OBJECT", all of which are hereby incorporated by reference in their entireties for all purposes.

FIELD OF THE DISCLOSURE

This disclosure generally relates to systems and methods for web performance optimization and dynamic content delivery. In particular, this disclosure relates to systems and methods for dynamically managing loading priority or sequencing of fragments of a web object.

BACKGROUND OF THE DISCLOSURE

Content delivery systems are typically used to improve the end-to-end performance of web content delivery between a server and a client. These systems may cache static web pages or other objects, and may serve these cached objects to requesting clients directly, thereby improving performance while reducing load and congestion on a content originator such as a server. However, a significant portion of typical web content may be dynamic in nature. Thus, web pages that are returned to different clients at different times may differ significantly. For example, web pages catering to personalized web applications are commonly dynamic. As such, typical content delivery systems may not handle dynamic content efficiently. For a web application involving significant dynamic content, when a web client ("browser") requests a webpage, the webpage is served by a web server. The web server may perform certain business logic and database query processing in order to generate the webpage from both dynamic and static content. This server-side processing can take seconds or even longer, while the web client may be waiting for the server to respond. This can significantly impair the web experience of a user. Moreover, the number of web objects referenced in the web page, both static and dynamic, may affect web page loading and user experience.

BRIEF SUMMARY OF THE DISCLOSURE

Described herein are systems and methods for dynamically modifying a requested web page from a server at an intermediary for presentation at a client. The present systems and methods can provide real time intervention via a cloud service or at an intermediary, upon receiving a client's request for a web page of a server. The intermediary may manage content and/or resources delivered to the client while communicating with the server to process or fulfill the request. The intermediary may identify or define a plurality of HTML fragments that can be assembled into a modified web page for the client, in response to the request. The intermediary may provide a plurality of web object fragments that can be assembled into a web object of a web page. Web objects can include an HTML page, a script (e.g., Javascript) file, an image, a video object, audio object, a flash file or small web format (SWF) file, or a CSS file, as examples. The fragments may be delivered by the intermediary, sequentially and in a controlled manner over a number of transmissions (e.g., as data is available at the intermediary and/or from the server, or as needed to improve page loading performance and/or user experience), for processing by the client's browser and presented to the user. Code incorporated into the web page may affect a loading priority or sequence of certain web object fragments on the browser. Instead of rendering all fragments, only certain fragments are delivered and/or rendered as needed, leading to bandwidth and processing efficiencies. One or a combination of such mechanisms can lead to improved or enhanced system performance and/or user experience.

The intermediary may be configured to inject or incorporate code into a transmitted fragment. The code may be executed by the browser (e.g., in the background) as one or more fragments are loaded or rendered as part of the modified web page. In some embodiments, the code may be intelligently configured to perform certain actions that modify the web page or affect some aspect of a resource of the web page. The web page may be modified to improve user experience. For example, the code may, upon execution, pre-fetch a resource for faster loading at a right moment, provide cookie management for enhanced web-based interactions, incorporate third-party resources to a web page, or alter the characteristics of resources. In certain embodiments, the code injected and delivered via a first fragment may control how subsequent fragments are incorporated or assembled with the first fragment. For example, the code may identify unique identifiers or markers in the first fragment for additional fragments, and may selectively generate HTML requests to retrieve particular fragments. In some embodiments, the code may control or manage loading and/or integration of web object fragments at the client, for example, by changing a rendering priority or characteristic of one or more fragments. A requested web page may therefore be modified dynamically at the intermediary and assembled at the client without affecting how the server generates its web pages. Code injected into the web page fragments can execute in the background as each fragment is loaded onto a browser, altering web page features without the user even realizing except for an improved user experience, e.g., a more responsive loading or rendering of web page elements, a richer experience with additional or custom content, or an improved or more appropriate web page layout.

In one aspect, the present disclosure is directed to a method for delivering an item of web content requested by a client. The method may include intercepting, by an intermediary between a client and a server, a request from the client to the server for an item of web content. The intermediary may split the item of web content into a plurality of fragments. The intermediary may identify, responsive to the request, a first fragment of the plurality of fragments to transmit to the client. The intermediary may inject executable code into the first fragment of the plurality of fragments. The executable code may be configured to conditionally incorporate additional fragments from the plurality of fragments into the first fragment at the client.

In some embodiments, the intermediary may determine that the item of web content comprises one of: an HTML page, an image, a cascading style sheet (CSS), a script file, a video object, an audio object, and a Flash file or small web format (SWF) file. The intermediary may split the item of web content into the plurality of fragments based on a version of the item of web content cached by the intermediary. The intermediary may split the item of web content into a plurality of fragments based on a response from the server to the request. The intermediary may perform at least one of the splitting and the identifying, based on a user-defined configuration of the item of web content. The intermediary may intercept the request for the item of web content, and the item of web content may include dynamic or personalized information to be generated by the server. The intermediary may send the request to the server. The intermediary may deliver the first fragment from a cache by the intermediary.

In certain embodiments, the intermediary may update a cache based on a response from the server to the request. The intermediary may form a second fragment of the plurality of fragments based on a response from the server to the request. The intermediary may deliver one or more of the additional fragments to the client based on at least one of: a network condition, dependencies between related fragments, size of a fragment, importance of a fragment, availability of a fragment, and visibility of a fragment. The intermediary may determine to deliver one of the additional fragments to the client responsive to at least one of: a user event, a timer event and a document object model event, that involves a display or use of the corresponding fragment at the client. The intermediary may inject the executable code, the executable code may include code expressed in at least one of: ECMAScript language or a language similar or related to the ECMAScript language, ActionScript language, visual basic language and hypertext markup language.

In another aspect, the present disclosure is directed to a system for delivering an item of web content requested by a client. The system may include an intermediary between a client and a server. The intermediary may intercept a request from the client to the server for an item of web content. The intermediary may split the item of web content into a plurality of fragments. The intermediary may identify a first fragment of the plurality of fragments to transmit to the client responsive to the request. The system may include executable code, injected by the intermediary into the first fragment of the plurality of fragments for execution at the client. The code may be configured to conditionally incorporate additional fragments from the plurality of fragments into the first fragment at the client.

In some embodiments, the intermediary determines that the item of web content comprises one of: an HTML page, an image, a cascading style sheet (CSS), a script, a video object, an audio object, and a Flash file or small web format (SWF) file. The intermediary may split the item of web content into the plurality of fragments based on a version of the item of web content cached by the intermediary. The intermediary may split the item of web content into a plurality of fragments based on a response from the server to the request. The intermediary may perform at least one of the splitting and the identifying based on a user-defined configuration of the item of web content. The intermediary may intercept the request for the item of web content, and the item of web content may include dynamic or personalized information to be generated by the server. The intermediary may send the request to the server. The intermediary may deliver the first fragment from a cache by the intermediary.

In some embodiments, the intermediary updates a cache based on a response from the server to the request. The intermediary may form a second fragment of the plurality of fragments based on a response from the server to the request. The intermediary may determine to deliver one or more of the additional fragments to the client based on at least one of: a network condition, dependencies between related fragments, size of a fragment, importance of a fragment, availability of a fragment, and visibility of a fragment. The intermediary may determine to deliver one of the additional fragments to the client responsive to at least one of: a user event, a timer event and a document object model event, that involves a display or use of the corresponding fragment at the client. The intermediary may inject the executable code, and the executable code may include code expressed in at least one of: ECMAScript language or a language similar or related to the ECMAScript language, ActionScript language, visual basic language and hypertext markup language.

In yet another aspect, the present disclosure is directed to a method for managing rendering of a web page in a browser. The method may include executing, by a client operated by a user, code within a first fragment of a web page as the first fragment is presented to the user. The code may be injected into the first fragment by an intermediary between the client and a server of the web page. The intermediary may have split the web page into the first fragment and a plurality of fragments. The intermediary may have modified a default rendering characteristic derived from the server for each of the plurality of fragments. Each of the modified rendering characteristic may include a trigger and an action for rendering of a corresponding fragment of the plurality of fragments. The executing code may dynamically detect a trigger for rendering of a second fragment from the plurality of fragments. The trigger may include one of: a user event, a timer event and a document object model event, that involves a display or use of the second fragment. The executing code may initiate, responsive to the detected trigger, a corresponding action for rendering of the second fragment within the first fragment.

In some embodiments, the client may send a request to the server for the web page, and the request may be intercepted by the intermediary. The client may receive, from the intermediary, the first fragment with the injected code. The client may execute the code. The code may include at least one of: code expressed in JavaScript language, code expressed in ECMAScript language or a language similar or related to the ECMAScript language, language code expressed in ActionScript language, code expressed in hypertext markup language, code expressed in visual basic language, a plug-in, code referencing a browser plug-in, and code referencing a native module. The client may receive at least one of the plurality of fragments from the intermediary, each of the plurality of fragments having a rendering characteristic modified by the intermediary based on a configuration. The client may perform a pre-trigger action for the second fragment prior to detecting the trigger. The pre-trigger action may include at least one of: withholding rendering of the second fragment, displaying nothing at an identified location of the web page, and displaying at least one item, the at least one item comprising at least one of: an indicator or message indicating that an item is loading, a temporary or placeholder item or image, an advertisement, and a special call-to-action item.

In some embodiments, the client may detect a user event comprising one of: a click event, a tap event, a touch event, a mouse-over event and a scroll event on the web page. The client may detect that a viewing region of the client corresponds to a portion of the web page involving a display or use of the second fragment of the web page. The client may detect that a viewing region of the client corresponds to a portion of the first fragment that includes a unique identifier for the second fragment. The code or client may initiate the corresponding action, the corresponding action comprising replacing one or more displayed items with the rendering of the second fragment. The code or client may initiate the corresponding action, the corresponding action may include rendering the second fragment immediately or as soon as the second fragment is available for rendering. The code or client may initiate the corresponding action, the corresponding action may include rendering the second fragment based on a specified delay or after a subset of the plurality of fragments have been loaded. The code or client may initiate the corresponding action, the corresponding action may include sending a request to the server for downloading a resource, the second fragment or a related fragment. The code or client may initiate the corresponding action, the corresponding action may include sending a request to the server, the request intercepted or received by the intermediary. The code or client may initiate the corresponding action for rendering the second fragment, the second fragment may include one of at least a portion of: an image, a cascading style sheet (CSS), a script, a video object, an audio object, a flash file or small web format (SWF) file, and a HTML file.

In still another aspect, the present disclosure is directed to a system for managing rendering of a web page in a browser. The system may include a browser executing on a client operated by a user. Code may be injected into a first fragment of a web page by an intermediary between the client and a server of the web page. The code may be executed by the browser as the first fragment is presented to the user. The intermediary may have split the web page into the first fragment and a plurality of fragments. The intermediary may have modified a default rendering characteristic derived from the server for each of the plurality of fragments. Each of the modified rendering characteristic may include a trigger and an action for rendering of a corresponding fragment of the plurality of fragments. The executing code may dynamically detect a trigger for rendering of a second fragment from the plurality of fragments. The trigger may include one of: a user event, a timer event and a document object model event, that involves a display or use of the second fragment. The executing code may initiate, responsive to the detected trigger, a corresponding action for rendering of the second fragment within the first fragment.

In some embodiments, the browser sends a request to the server for the web page, the request intercepted by the intermediary. The browser may receive from the intermediary the first fragment with the injected code. The code may include at least one of: code expressed in ECMAScript language or a language similar or related to the ECMAScript language, code expressed in JavaScript language, code expressed in ActionScript language, code expressed in hypertext markup language, code expressed in visual basic language, a plug-in, code referencing a browser plug-in, and code referencing a native module. The browser may receive at least one of the plurality of fragments from the intermediary. Each of the plurality of fragments may have a rendering characteristic modified by the intermediary based on a configuration. The browser may perform a pre-trigger action for the corresponding fragment prior to detecting the trigger, the pre-trigger action may include at least one of: withholding rendering of the second fragment, displaying nothing at an identified location of the web page, and displaying at least one item, the at least one item comprising at least one of: an indicator or message indicating that an item is loading, a temporary or placeholder item or image, an advertisement, and a special call-to-action item. The executing code may detect a user event including one of: a click event, a tap event, a touch event, a mouse-over event and a scroll event on the web page. The executing code may detect that a viewing region of the client corresponds to a portion of the web page involving a display or use of the second fragment of the web page. The executing code may detect that a viewing region of the client corresponds to a portion of the first fragment that includes a unique identifier for the second fragment.

In some embodiments, the executing code initiates the corresponding action, the corresponding action comprising replacing one or more displayed items with the rendering of the second fragment. The executing code may initiate the corresponding action, the corresponding action comprising rendering the second fragment immediately or as soon as the second fragment is available for rendering. The executing code may initiate the corresponding action, the corresponding action may include rendering the second fragment based on a specified delay or after a subset of the plurality of fragments have been loaded. The executing code may initiate the corresponding action, the corresponding action may include sending a request to the server for downloading a resource, the second fragment or a related fragment. The executing code may initiate the corresponding action, the corresponding action may include sending a request to the server, the request intercepted or received by the intermediary. The executing code may initiate the corresponding action for rendering the second fragment, the second fragment may include one of at least a portion of: an image, a cascading style sheet (CSS), a script, a video object, an audio object, a flash file or small web format (SWF) file, and a HTML file.

In another aspect, the present disclosure is directed to a method for managing delivery and rendering of an item of web content. The method may include intercepting, by an intermediary between a client and a server, a request from the client to the server for an item of web content. The intermediary may split the item of web content into a first fragment and a plurality of fragments. The intermediary may inject, into the first fragment for delivery to the client, executable code and a plurality of unique identifiers corresponding to the plurality of fragments. The intermediary may send the first fragment to the client. The injected executable code may generate a request at the client to the server for a second fragment from the plurality of fragments responsive to detecting an event. The detected event may correspond to a unique identifier of the second fragment, and may include one of: a user event, a timer event and a document object model event, that involves a display or use of the second fragment. The intermediary may intercept the request for the second fragment. The intermediary may send the second fragment to the client responsive to the request for the second fragment.

In some embodiments, the intermediary may determine that the item of web content comprises one of: an HTML page, an image, a cascading style sheet (CSS), a script file, a video object, an audio object, and a Flash file or small web format (SWF) file. The intermediary may split the item of web content based on a version of the item of web content cached by the intermediary. The intermediary may split the item of web content based on a response from the server to the request for the item of web content. The intermediary may split the item of web content based on a configuration of the item of web content. The intermediary may modify a default rendering characteristic derived from the server for each of the plurality of fragments. Each of the modified rendering characteristic may include an action and a trigger based on detecting one of: a user event, a timer event and a document object model event, that involves a display or use of a corresponding fragment. The intermediary may form the first fragment based on a version of the first fragment cached by the intermediary. The intermediary may send to the server the intercepted request for the item of web content. The intermediary may update a cache based on a response from the server to the request for the item of web content.

In some embodiments, the intermediary may store the first fragment in a cache. The intermediary may inject the executable code into the first fragment, the executable code comprising code expressed in at least one of: ECMAScript language or a language similar or related to the ECMAScript language, JavaScript language, ActionScript language, visual basic language and hypertext markup language. The intermediary may intercept the request for the second fragment. The intercepted request for the second fragment may be prevented from reaching the server by the intermediary. The intermediary may form the second fragment based on a version of the second fragment cached by the intermediary. The intermediary may form the second fragment based on a response from the server to the request for the item of web content. The intermediary may wait for a response from the server to the request for the item of web content, to generate the second fragment.

In another aspect, the present disclosure is directed to a system for managing delivery and rendering of an item of web content. The system may include or incorporate executable code injected into a first fragment of an item of web content, for delivery to a client. The injected executable code may generate a request at the client to a server for a second fragment from a plurality of fragments of the item of web content responsive to detecting an event. The detected event may correspond to a unique identifier of the second fragment, and may include one of: a user event, a timer event and a document object model event, that involves a display or use of the second fragment. The system may include an intermediary between the client and the server. The intermediary may intercept a request from the client to the server for the item of web content. The intermediary may split the item of web content into the first fragment and the plurality of fragments. The intermediary may inject into the first fragment the executable code and a plurality of unique identifiers corresponding to the plurality of fragments. The intermediary may send the first fragment to the client. The intermediary may intercept the request for the second fragment. The intermediary may send the second fragment to the client responsive to the request for the second fragment.

In some embodiments, the intermediary determines that the item of web content includes one of: an HTML page, an image, a cascading style sheet (CSS), a script file, a video object, an audio object, and a Flash file or small web format (SWF) file. The intermediary may split the item of web content based on a version of the item of web content cached by the intermediary. The intermediary may split the item of web content based on a response from the server to the request for the item of web content. The intermediary may split the item of web content based on a configuration of the item of web content. The intermediary may modify a default rendering characteristic derived from the server for each of the plurality of fragments. Each of the modified rendering characteristic may include an action and a trigger based on detecting one of: a user event, a timer event and a document object model event, that involves a display or use of a corresponding fragment. The intermediary may form the first fragment based on a version of the first fragment cached by the intermediary. The intermediary may send to the server the intercepted request for the item of web content. The intermediary may update a cache based on a response from the server to the request for the item of web content.

In certain embodiments, the intermediary stores the first fragment in a cache. The intermediary may inject the executable code into the first fragment. The executable code may include code expressed in at least one of: ECMAScript language or a language similar or related to the ECMAScript language (e.g., JavaScript), ActionScript language, visual basic language and hypertext markup language. The intermediary may intercept the request for the second fragment. The intercepted request for the second fragment may be prevented from reaching the server. The intermediary may form the second fragment based on a version of the second fragment cached by the intermediary. The intermediary may form the second fragment based on a response from the server to the request for the item of web content. The intermediary may wait for a response from the server to the request for the item of web content, to generate the second fragment.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2E includes one embodiment of a web page segment including a highlighted portion referencing an image or a resource;

FIG. 2I is a flow diagram of an embodiment of a method for dynamically modifying a requested web page from a server for presentation at a client;

FIG. 2O depicts one embodiment of a comparison between Javascript optimization results between a number of applications;

Figure 1A:
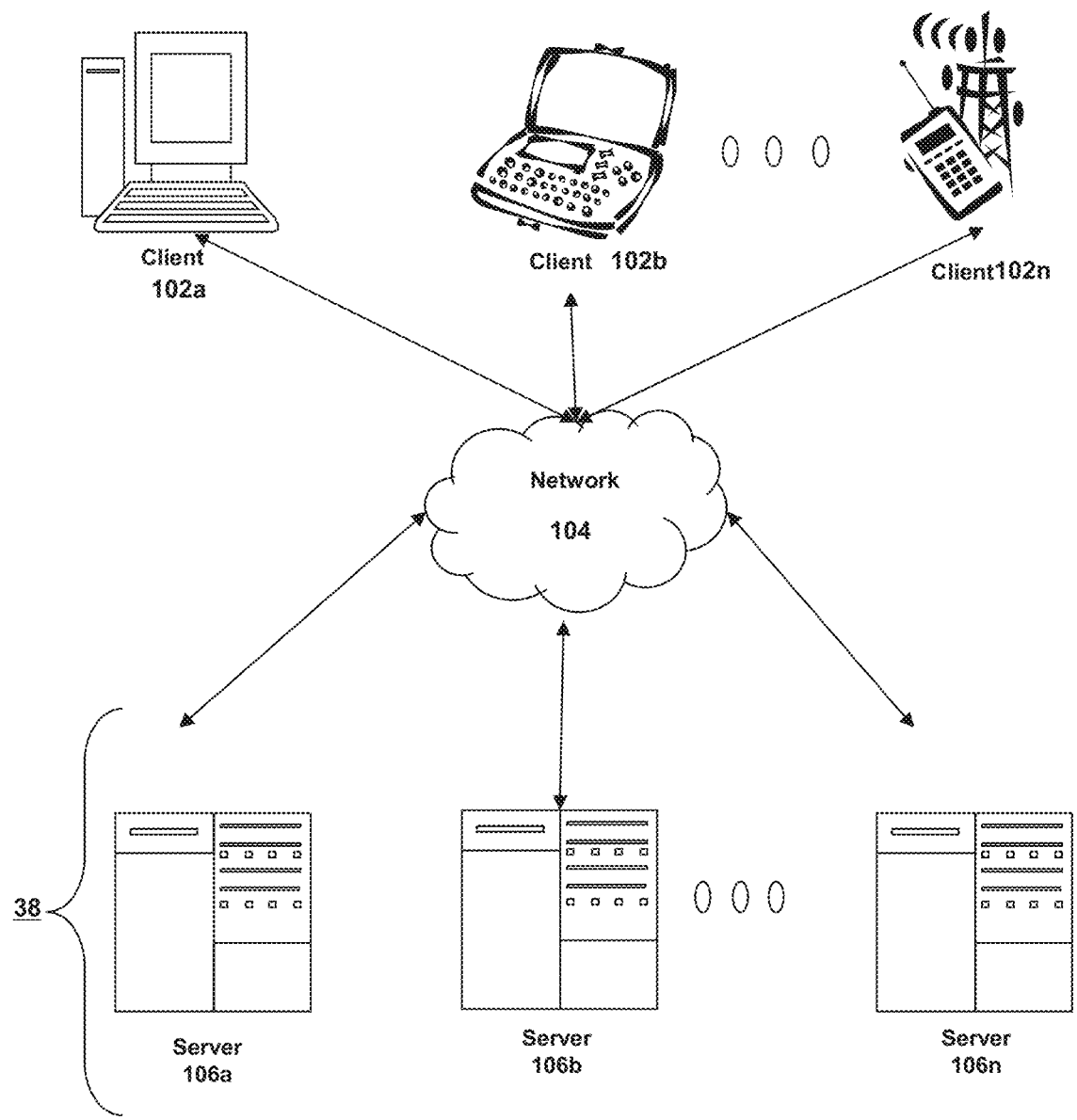
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for dynamically modifying a requested web page from a server for presentation at a client; and Section C describes embodiments of systems and methods for dynamically managing loading priority or sequencing of fragments of a web object.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 206b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
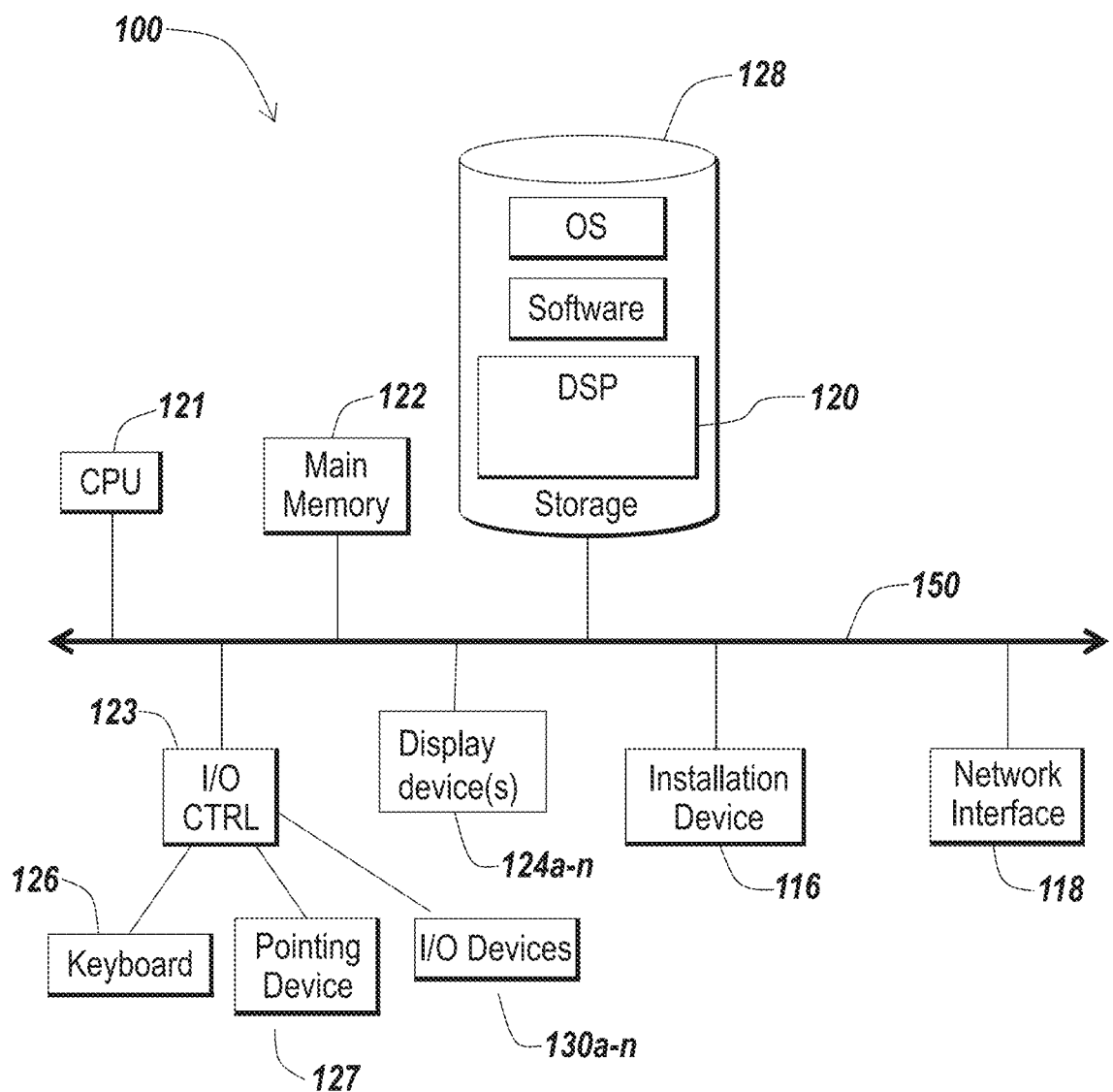
FIGS. 1B and 1C are block diagrams depicting embodiments of computing devices useful in connection with the methods and systems described herein.
Figure 1C:
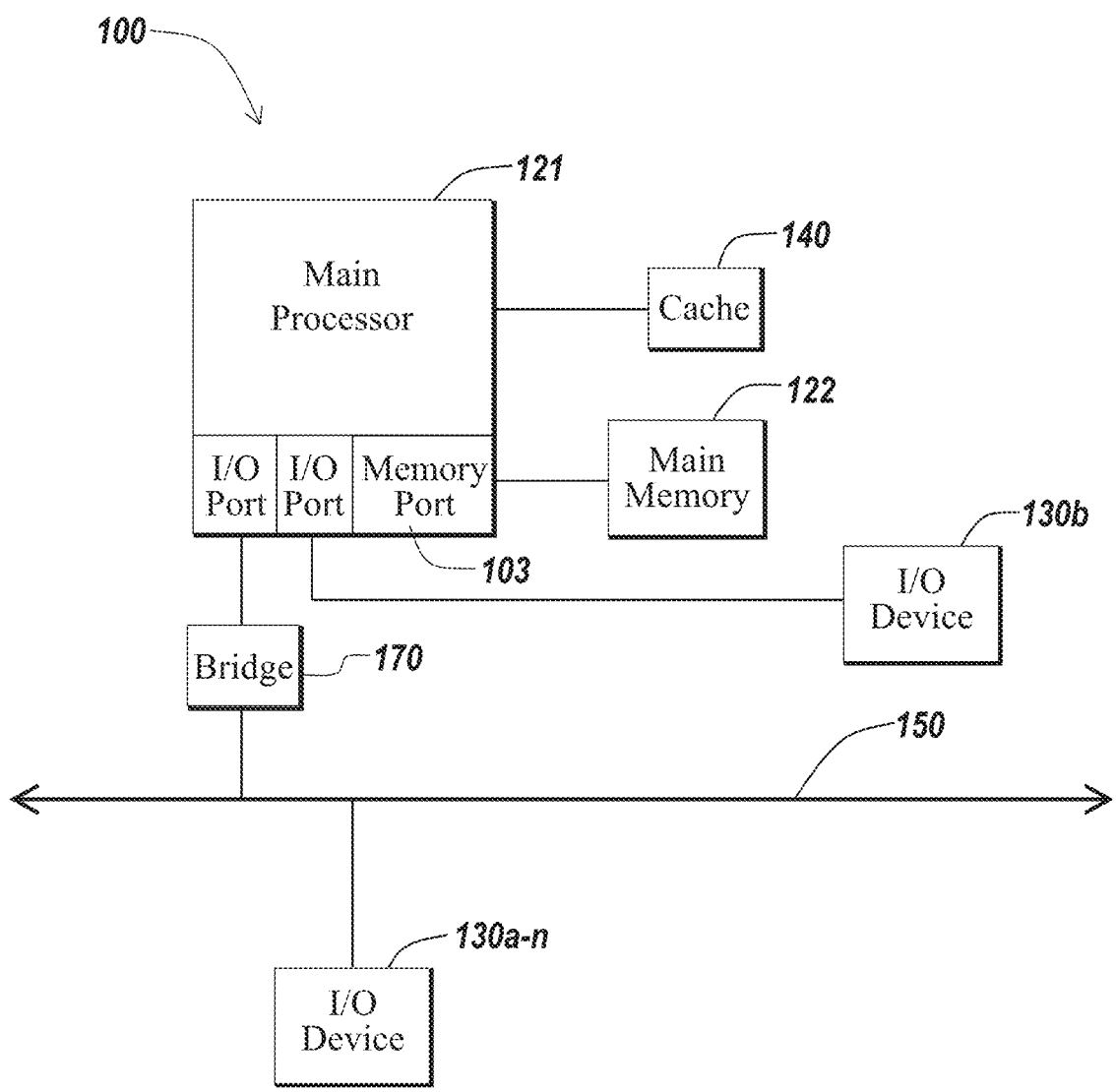

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINI-BAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the demand side platform. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 players. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Dynamically Modifying a Requested Web Page from a Server

Described herein are systems and methods for dynamically modifying a requested web page from a server at an intermediary for presentation at a client. The present systems and methods can provide real time intervention via a cloud service or at an intermediary, upon receiving a client's request for a web page of a server. The intermediary may manage content and/or resources delivered to the client while communicating with the server to process or fulfill the request. The intermediary may provide a plurality of HTML fragments that can be assembled into a modified web page for the client, in response to the request. The fragments may be delivered sequentially and in a controlled manner (e.g., as data is available at the intermediary and/or from the server), for processing by the client's browser and presented to the user. This can lead to improved or enhanced system performance (e.g., using caching methods) and/or user experience.

The intermediary may be configured to inject or incorporate code into a fragment for transmission to the client. The code may be executed by the browser (e.g., in the background) as the fragments are loaded or rendered as part of the modified web page. In some embodiments, the code may be intelligently configured to perform certain actions that modify the web page or affect some aspect of a resource of the web page. The web page may be modified to improve user experience. For example, the code may, upon execution, pre-fetch a resource for faster loading at a right moment, provide cookie management for enhanced web-based interactions, incorporate third-party resources to a web page, or alter certain characteristics of resources. A requested web page may therefore be modified dynamically at the intermediary and assembled at the client without affecting how the server generates its web pages. Code injected into the fragments can execute in the background as each fragment is loaded onto a browser, altering web page features without the user even realizing. The code-based processing produces an improved user experience, e.g., a richer experience with additional or custom content, an improved or more appropriate web page layout, or a more responsive loading or rendering of web page elements.

Figure 2A:
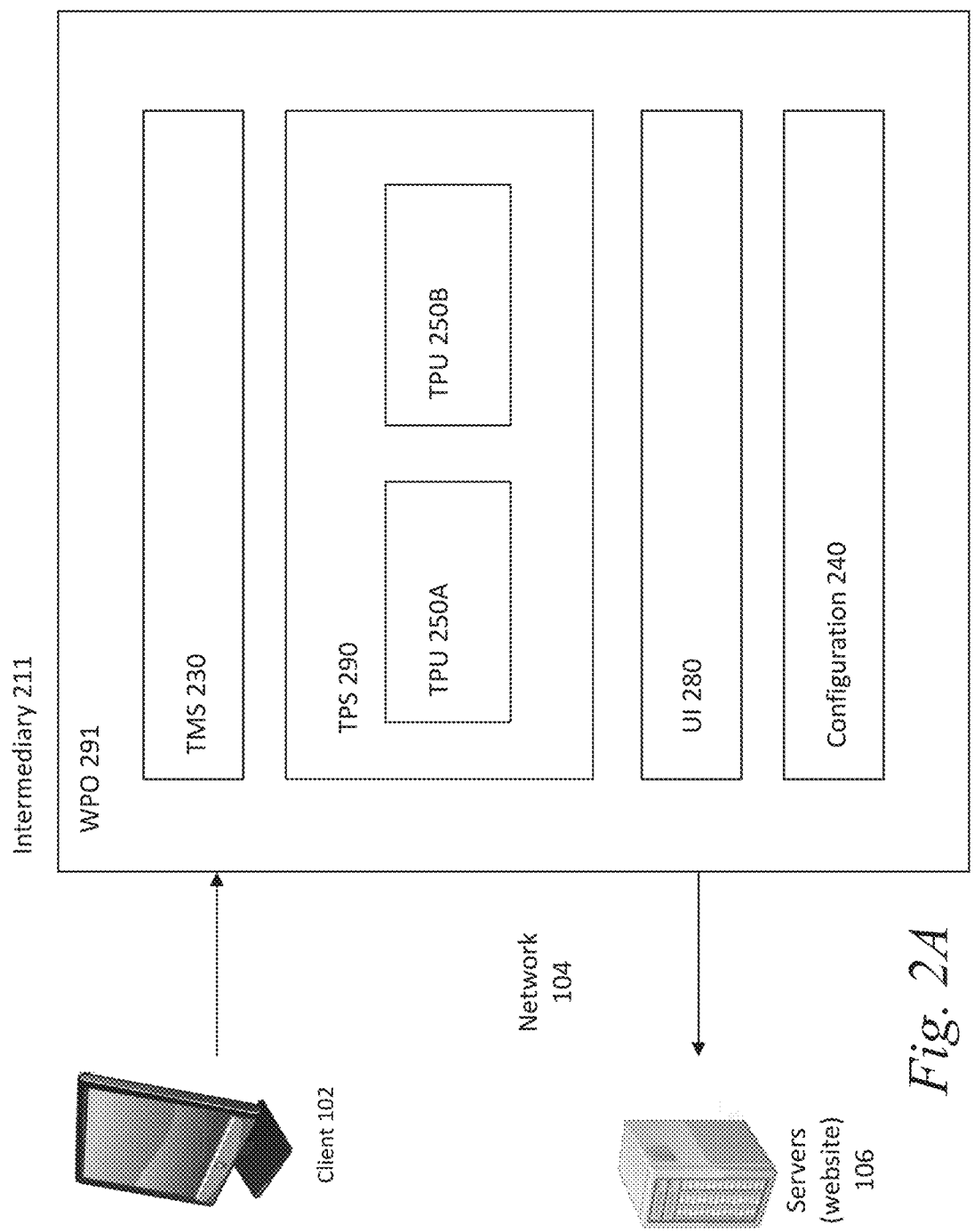
FIG. 2A is a block diagram depicting one embodiment of a system for dynamically modifying a requested web page from a server for presentation at a client.

Referring to FIG. 2A, one embodiment of a system for dynamically modifying a requested web page from a server for presentation at a client is depicted. In brief overview, the system may include an intermediary between at least one client device and at least one server. The intermediary may include a web performance optimization system (WPO) 291. The WPO may include a traffic processing system (TPS) 290, a traffic management system (TMS) 230 and a customizing user interface (UI) 280. The TPS 290 may include geographically-dispersed or cloud-based traffic processing units (TPU) 250. The TPS 290 may receive and process HTTP (or HTTPS) requests and responses between a client and a server or website, and the TMS may manage routing of client requests through the TPS. In the present disclosure, although HTTP may sometimes be referenced by way of example, HTTPS or an alternative scheme is contemplated and within the scope of this disclosure. A user or third party may use the customizing user interface and/or an application programming interface (API) to query, add, remove and adjust a setting, status or configuration of the WPO system to achieve desired results. When a client issues a HTTP request to a server or website, the HTTP request may be directed to pass through the intermediary. Upon receiving HTTP request (e.g., via the TMS), the TPS may analyze the HTTP request (e.g., determine the client type), select and apply context-specific optimization techniques to deliver appropriate fragments for assembly into a modified web page.

The intermediary may include a hardware device such as an appliance, network component, proxy, router, or any combination thereof. In instances where an intermediary device is referenced, the intermediary device may comprise any one or more of the above-mentioned components (e.g., TPS, TMS) within a single device or a collection of networked devices. Each of the components may embody hardware, or a combination of hardware and software (e.g., program code executing on hardware of the intermediary).

The WPO can deliver dynamic content from an originating server to one or more clients via partial object caching and client-side processing. An object may, for example, include a web page, and a partial object may include a fragment of a web page. Instead of connecting to the server directly, a client may communicate with the server via an intermediary device. The intermediary may store cached copies of content and other resources from the server. The cached copies may have been identified and extracted based on prior interactions with the server and/or client. When a client requests for an object such as a web page, the intermediary may return a partial object from its cache almost immediately, e.g., while the intermediary is requesting the object from the server.

The intermediary may employ client-side pre-fetch which allows the WPO to send a fragment or segment of an HTML page (e.g., the "head") as quickly as possible in response to a request. This can accelerate the loading process by allowing a corresponding browser to start the downloading and rendering process in parallel to the server-side processing of the web page request. Once the object from the server is returned responsive to the request, the intermediary may compare the returned object to the delivered partial object from its cache. The intermediary may find any differences based on the comparison, and may deliver the differences to the client. In conjunction with or in between delivery of the partial object and differences, the intermediary may provide the client with client-side processing instructions or injected code. The client (e.g., a browser of the client) may execute the code or instructions while loading or rendering fragments of the web page.

Figures 2A, 2B:
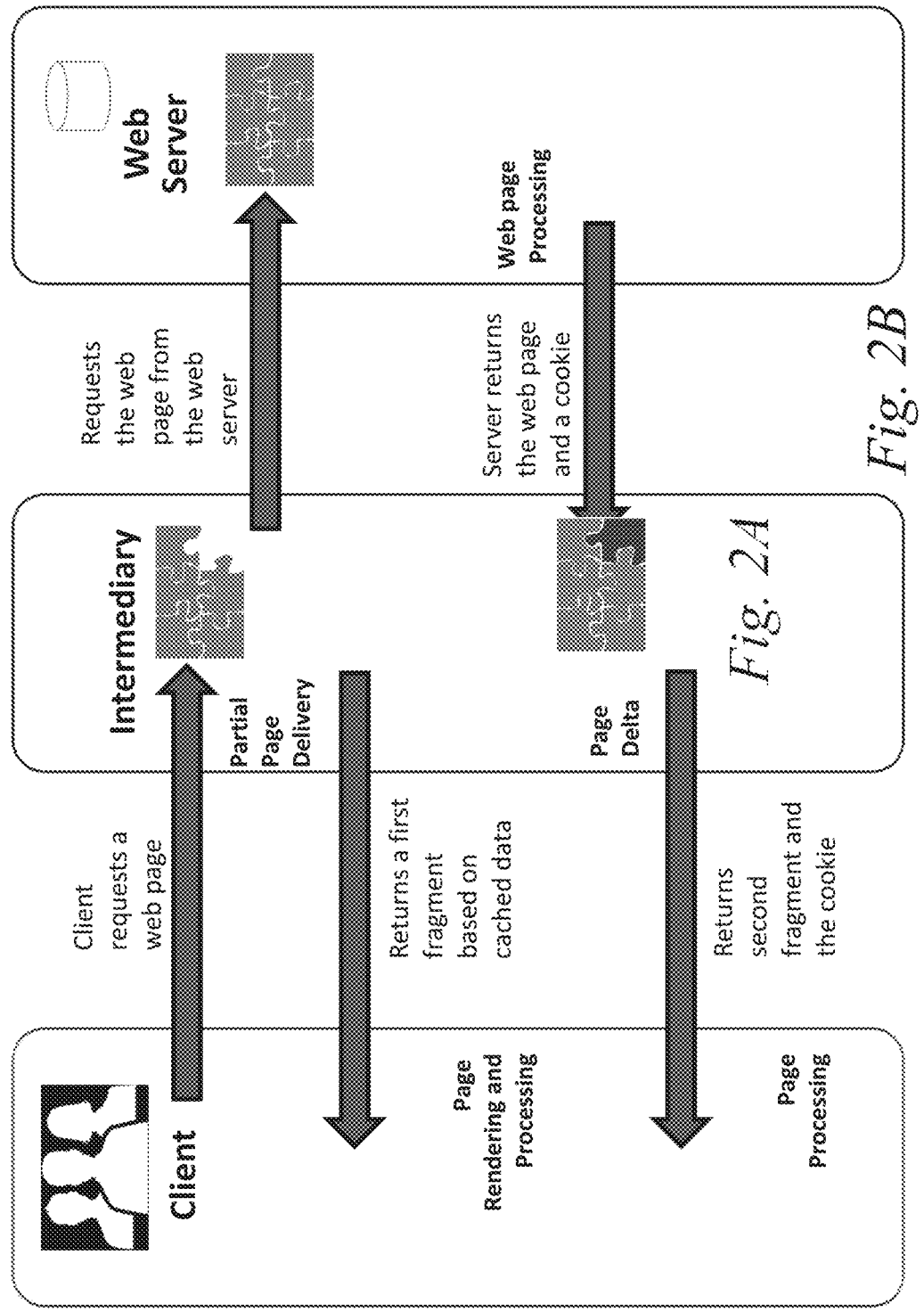
FIGS. 2B and 2C are flow diagrams depicting embodiments of process steps in a method for dynamically modifying a requested web page from a server for presentation at a client.
Figure 2C:
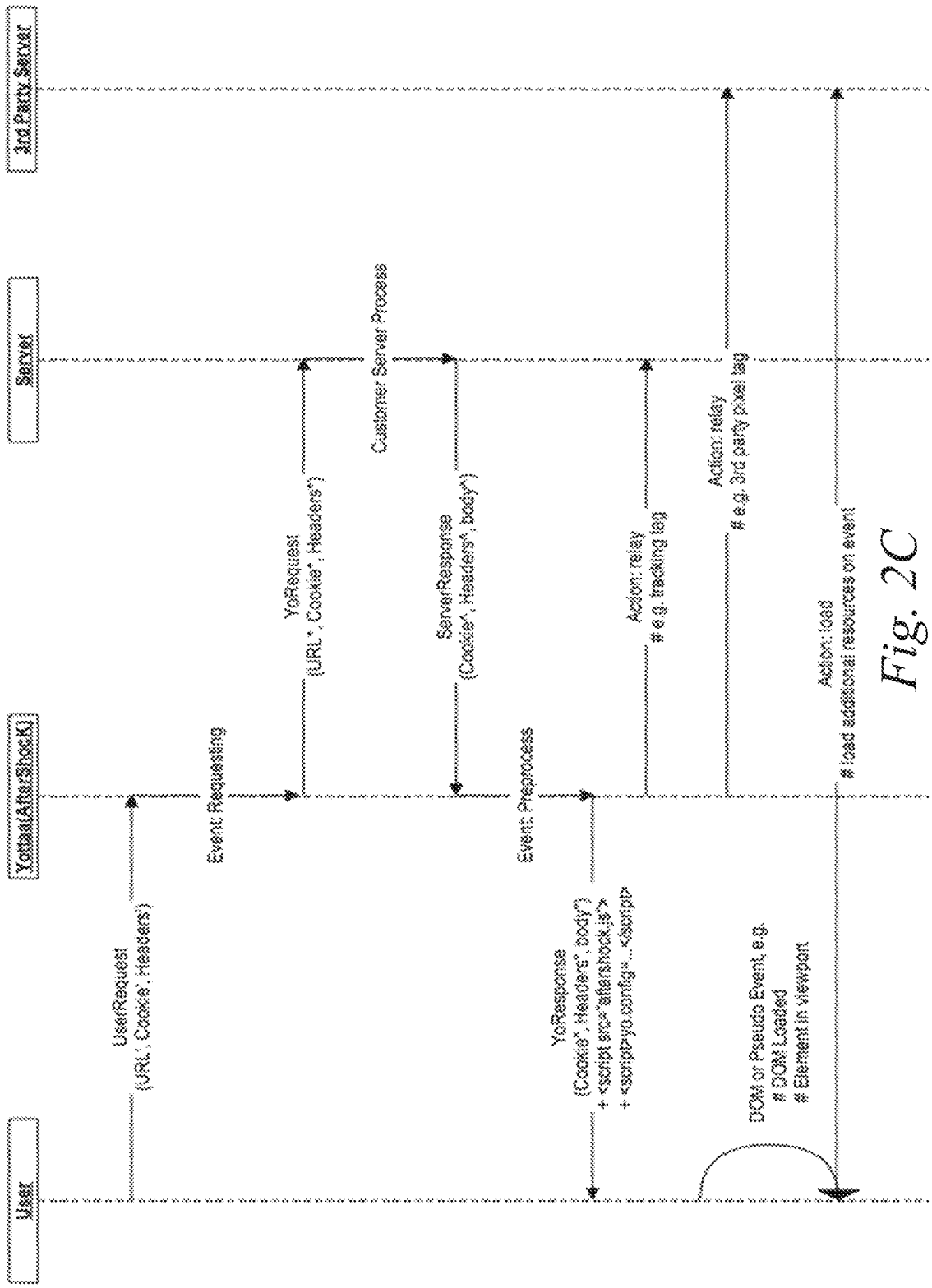

By way of example, embodiments of a method for dynamically modifying a web page are depicted in FIGS. 2B and 2C. Referring to these figures, a prior request for a web page from a server may involve the following illustrative HTML source file:

---
Original Source File
---
```
<html>
    <head>
        <link href="//www.foo.com/style.css" rel="stylesheet"
        type="text/css"></link>
        <script src="//www.foo.com/jquery.js"></script>
        <script src="//www.foo.com/app.js"></script>
    </head>
    <body>
        <!--ADDITIONAL/OPTIONAL MATERIAL -->
    </body>
</html>
```
---

Some portions of the web page may be cached by the intermediary. Once the page is in cache, and in response to a subsequent request for the web page, the WPO system may respond immediately with a HTML fragment, for example up to the "<body>" tag from the cached copy (e.g., as shown in FIG. 2B):

---
Initial Part/Fragment Returned To The Client
---
```
<html>
    <head>
        <link href="//www.foo.com/style.css" rel="stylesheet"
        type="text/css"></link>
        <script src="//www.foo.com/jquery.js"></script>
        <script src="//www.foo.com/app.js"></script>
    </head>
```
---

The TPU may inject or incorporate code into the initial fragment delivered to the client. In the embodiment depicted in FIG. 2C, an initial first fragment is not shown. In parallel, the Traffic Processing Unit (TPU) of the WPO system may convey the request for the webpage to the server. When the TPU receives a response back from the server, the TPU may extract a difference or delta from the web page, relative to the static portion in the initial fragment, to form a second fragment. The difference or delta may include one or more dynamic portions of the requested web page. The TPU may add code, e.g., which may include a "<script>" block that can set any cookie that the server responded with using a Set-Cookie header, to the response or second fragment (e.g., YoResponse, as depicted in FIG. 2C):

---
Code injected into Subsequent Returned Part/Fragment To The Client
---
```
<script>
    //This code can be executed on a browser.
    function setCookie(name, value, expires, path){
        var exdate=new Date( );
        exdate.setDate(exdate.getDate( ) + exdays);
        var c_value=escape(value) + ((exdays==null) ? "" : ";
        expires="+exdate.toUTCString( ));
        document.cookie=c_name + "=" + c_value;
    }
    //Set each cookie the server responds with.
    setCookie("session", "12312312312123", new Date(2013, 12, 31),
    "");
</script>
```
---

If the code is added directly to the response received from the server, the TPU may, in this case, remove content that has already been sent to the client (e.g., the initially returned part/fragment). The TPU may send the remainder of the content (and the injected code) to the client, for example:

---
The Remaining Response
---
```
<body>
    <!-- ADDITIONAL/OPTIONAL MATERIAL, e.g., dynamic
    portions of the web page, injected code -->
</body>
</html>
```
---

Web pages may be made up of many different web resources that vary in their content-type and purpose. Each web resource may be stored and requested individually on a web server. This web page structure can make deployment of web pages and websites easy. However, the issue with this deployment model is that the web browser may need to request each of the web resources individually. The web browser may request one web resource and then process it to see if other web resources are needed. If more resources are required, the browser may request them one at a time and then it will repeat the process. Today's websites typically require many web resources to create the interactivity and presentation envisioned by their designers. Ajax, Web 2.0, and Collaboration websites all lead to an increase in the interactivity and design required to acquire and keep customers. Developers may design and implement web pages by breaking up the page into images, JavaScript, CSS, HTML, media (Flash, Sound, Video) and other resources. Developers do this in a way that makes it quick to build, debug, deploy, test, and maintain. This web page development process usually results in resources being broken down into specific tasks including, JavaScript files that implements a specific set of tasks, CSS files that manage the presentation of a certain section, component or element of a page, and images that display one graphical element of a page. However, browsers may be able to open only a limited number of connections to the web server. For instance, if the browser can only create two connections with a web server, resource requests may queue up until a previous resource is completely downloaded.

Typically, the loading of the assets/resources may not happen until the end, after the last byte of a web page. This can waste significant amounts of waiting time, impairing user experience. The WPO can deliver the initial fragment with injected code so that the browser can start to immediately begin the parallelization process of downloading the required assets. For example, the WPO may add JavaScript to the end of the first delivered fragment or HTML section (e.g., into a head section) to load resources or images, instead of waiting for the HTML that include the images. Even certain resources referenced in the page body may be moved into the <head> tag. For a certain web page, the "head" or static portion(s) may be identified by a user via the UI of the intermediary. The WPO may re-order code/scripts that are loaded at the end of the web page file to the beginning. If the browser can begin loading assets, for example, within 100 ms or less from the request, there can be significant page speed increases.

The WPO may incorporate code into a web page fragment that can intelligently modify an aspect of the originally-requested web page. For example, upon execution, the code may direct specific images (e.g., of a social plugin) from a website to load if and/or when these images are viewable to visitor. For example, images that are hidden in a background, cached, or configured to be invisible, may be identified and excluded/delayed by the code from loading and slowing down the page load. Based on specific requirements, a user may configure the code to manage images relative to a viewport. A viewport in a browser tab is the viewable area of a page. For example, a user may configure the code such that when a page on a website is loaded in a visitor's browser tab, all images within viewport may be loaded immediately. A user may configure the code to manage images such that only those images viewable to a visitor when the visitor scrolls on the page, may be loaded when in viewport.

In some embodiments, the WPO may incorporate code to load all or certain social plug-in scripts on a web page when the corresponding document object model (DOM) structure (e.g., HTML source) is ready. The WPO may recognize social plug-ins by their signature string. For example, a Facebook script tag may have a source attribute value: "//connect.facebook.net/en US/all.js#xfbml=1". In some embodiments, the WPO may incorporate code to load images in a web page slideshow when a visitor performs an action, e.g., clicks a *next* button. The WPO may identify such elements in a web page, for example, an image is a slideshow may have a CSS class "slide-img" and the next button may have a CSS class "slide-btn-next".

In another illustrative example, a web page may place a quoted tweet in the top half of a web page, but locate a related Tweeter script tag at the bottom of the page. The WPO may incorporate code to advance or execute the script tag so that the tweet may be fully functional when loaded. The WPO may incorporate code to configure a social plugin script tag to load when the corresponding social plugin is viewable.

In certain embodiments, the code may operate under a language framework or specification, which may be referred to as "AfterShocK" or "ASK". The specification may provide for a number of system components. For example, AfterShocK may provide for components including a server-side program/script (hereafter sometimes referred to as "Transformer"), and a client-side script/program (hereafter sometimes referred to as "Executor"). The specification may include a language (hereafter sometimes referred to as "ASK lang"). ASK lang may be a domain-specific language designed to configure an AfterShocK system. ASK lang may provide an interface for the Transformer and the Executor. ASK language statements may comprise a structural form of English or other language words, and in some embodiments, may be read naturally. The ASK lang can help bridge participants involved in an AfterShocK system, making communication more efficient. ASK does not necessarily represent any form of internal data structure in either the Transformer or the Executor, nor intermediate data passing in between components. In one illustrative embodiment, the ASK specification includes one or more of the following:

```
DEFINE_STATEMENT ::= define IDENTIFIER VALUE
RULE_STATEMENT ::= for SELECTOR_STRING
ACTION_STATEMENTS
ACTION_STATEMENTS ::= ACTION_STATEMENT |
ACTION_STATEMENTS
ACTION_STATEMENT ::= do ACTIONS_STRING
EVENT_STATEMENT
ACTIONS_STRING ::= ACTION_STRING
ACTIONS_STRING_REST
ACTIONS_STRING_REST ::= "" | "," ACTION_STRING
ACTIONS_STRING_REST
ACTION_STRING ::= FUNCTION_CALL_STYLE
EVENT_STATEMENT ::= on EVENTS_STRING
EVENTS_STRING ::= EVENT_STRING
EVENTS_STRING_REST
EVENTS_STRING_REST ::= "" | "," EVENT_STRING
EVENTS_STRING_REST
EVENT_STRING ::= FUNCTION_CALL_STYLE
FUNCTION_CALL_STYLE ::= IDENTIFIER | "("
    FUNCTION_CALL_STYLE_ARGUMENTS ")"
    FUNCTION_CALL_STYLE_ARGUMENTS ::= "" |
FUNCTION_CALL_STYLE_ARGUMENT |
FUNCTION_CALL_STYLE_ARGUMENT
FUNCTION_CALL_STYLE_ARGUMENTS_EXT
    FUNCTION_CALL_STYLE_ARGUMENTS_EXT ::= ","
FUNCTION_CALL_STYLE_ARGUMENT
    FUNCTION_CALL_STYLE_ARGUMENT ::= STRING |
    NUMBER
    KEYWORDS ::= define for do on
    COMMENT ::= "#".STRING."\n"
```

By way of illustration, code based on the ASK specification may be implemented as follows:

```
define delay_time 5000
  # Set delay_time to 5000
  for "script[src*='facebook.com']" do load on ready
  # load script tag which src attribute contains 'facebook.com' when ready
  for "img.delay" do load on delay($delay_time)
  # load img with "delay" class in $delay_time millisecond after DOM ready
  for "h2, h3" do log("focus"), pass on viewable, mouseenter
  # for h2 and h3 tags, log with tag "focus" to server and pass on to the next rule,
  # when they are viewable or mouseenter fired; this is a feature for Tag Management
  for "div.content"
    do append("<img src='question.jpg'>") on viewable
    do redirect("about.html") on click("button.about")
  # append "<img src='question.jpg'>" tag to "div.content" tag when it is viewable and
  # redirect the page to about.html when "button.about" is clicked
```

By way of illustration, data structures corresponding to the ASK specification may be implemented or defined as follows. The data structure may be an internal representation of AfterShocK states. It may written in JSON or another format.

```
RULE_CHAIN = [RULE]
RULE = {
    id: Number,
    for: [SELECTOR],
    act: RULE_ACTION
}
RULE_ACTION = {
    do: [ACTION],
    on: [EVENT],
}
ACTION, EVENT = {
    name: "Action or Event name",
    args: [VALUE]
}
VALUE = {
    val: JSON
}
```

The following illustrative definitions may be applied to the above data structures:
ACTION may be one of:
* load: load selected element.
* pass: indicate this is not a final rule for selected element. When it is finish processing in current rule, it may pass on to the next rule in the rule chain.
EVENT may be one of:
* ready: fire after DOM is ready, closely related to document ready event in browser; ready event is equal to delay(0)
* delay(ms:Integer): fire after *ms* millisecond of ready event
* click(selector:String): fire when capture click event from element selected by *selector*
* viewable(selector: String): fire when capture DOM element is in viewport event; If selector is omitted, then use target element instead The following is an illustrative glossary of mentioned terms:
* Target Element: DOM element on which actions may be apply
* Final Rule: a Final Rule is the last rule applied to Selected Element
* Selected Element: element matched by selector
* Selector: a subset of CSS selectors
* Element: HTML element
* Rule Chain: a list of rules, order by rule's ID
* Rule ID: an unsigned integer number, higher number means higher priority
* Rule: action apply to selected element on event In some aspects, the ASK server or Transformer maintains session information for the system. For example, the Transformer may keep track of the client session and the third party session that are created. Each third party service may deliver cookies to the client. The Transformer may communicate these cookies to the service whenever a user requests a page. The Transformer may maintain component information for each page. When a page is processed by the TPU, the TPU may send information or instructions on components that should be injected into the page, to the AfterShocK server. Based on the information/instructions, the server may inject the correct components or resources, and may communicate with any associated third party services. By way of illustration, information maintained by the Transformer may be represented in the following:

```
{
    "referer": <URL-FOR-PAGE>
    "session-id": <Id of the clients session maintained by aftershock,
could be the same as the yottaa session>
    "components": [{
        "type": {img, script}
        "url": <URL FOR THE SCRIPT>
        "code": <The block of code that specifies the component>
    }, ...]
```

In certain embodiments, the ASK client or Executor may perform asynchronous injection of a component, which may include a third party component. The Executor may maintain the location of these components. By way of illustration, one embodiment of a configuration of the AfterShock client is as follows, and describes how to setup various types of processing for various resources:

```
var config = {
            //The may load all resources after
            defaultDelay: 5000,
    log: true,
            resources: [
    //      {
    //          url: "<The URL of the object to delay>", //Matching of the URL is done using a contains and not a ==
    //          delayType: "{scroll, timer, none}",
    //          delayTime: int //The number of milliseconds after the onload to load this resource.
    //          delayPosition: int //When the scroll bar reaches this position it may be loaded.
    //      },
    //          EXAMPLES
    //      {
    //          "url": "http://platform.twitter.com/widgets.js",
    //          "delayType": "defer", //This may delay loading of the object until the time specified by "delayTime"
    //          "delayTime": 1000
    //      },
    //      {
    //          "url": "http://connect.facebook.net/en_US/all.js#xfbml=1",
    //          "delayType": "lazy", //This may delay the loading of the object until the scroll position
    //              Will allow the users to track a different object then the supplied one. Helpful for loading JS when
    //              a UI component is visible.
    //          "delayPosition": "<id or if jquery is used on website a selector string>"
    //      },
    //      {
```

-continued

```
            //       "url":
"http://www.facebook.com/plugins/likebox.php",
            //       "delayType": "none" // skip the
delay loading. Default - iframes
            //       }
        // {
        // "url":
"http://www.facebook.com/plugins/likebox.php",
            //       "delayType": "event"
            //    may use a similar string as backbone js.
<event> <selector>.
            //    Example: "delayEvent": "click #mybutton"
            // "delayEvent":
            // }
    ]}
```

Changes to the configuration may be applied by making a call, e.g., yo_configureAfterShock({ }).

Figure 2D:
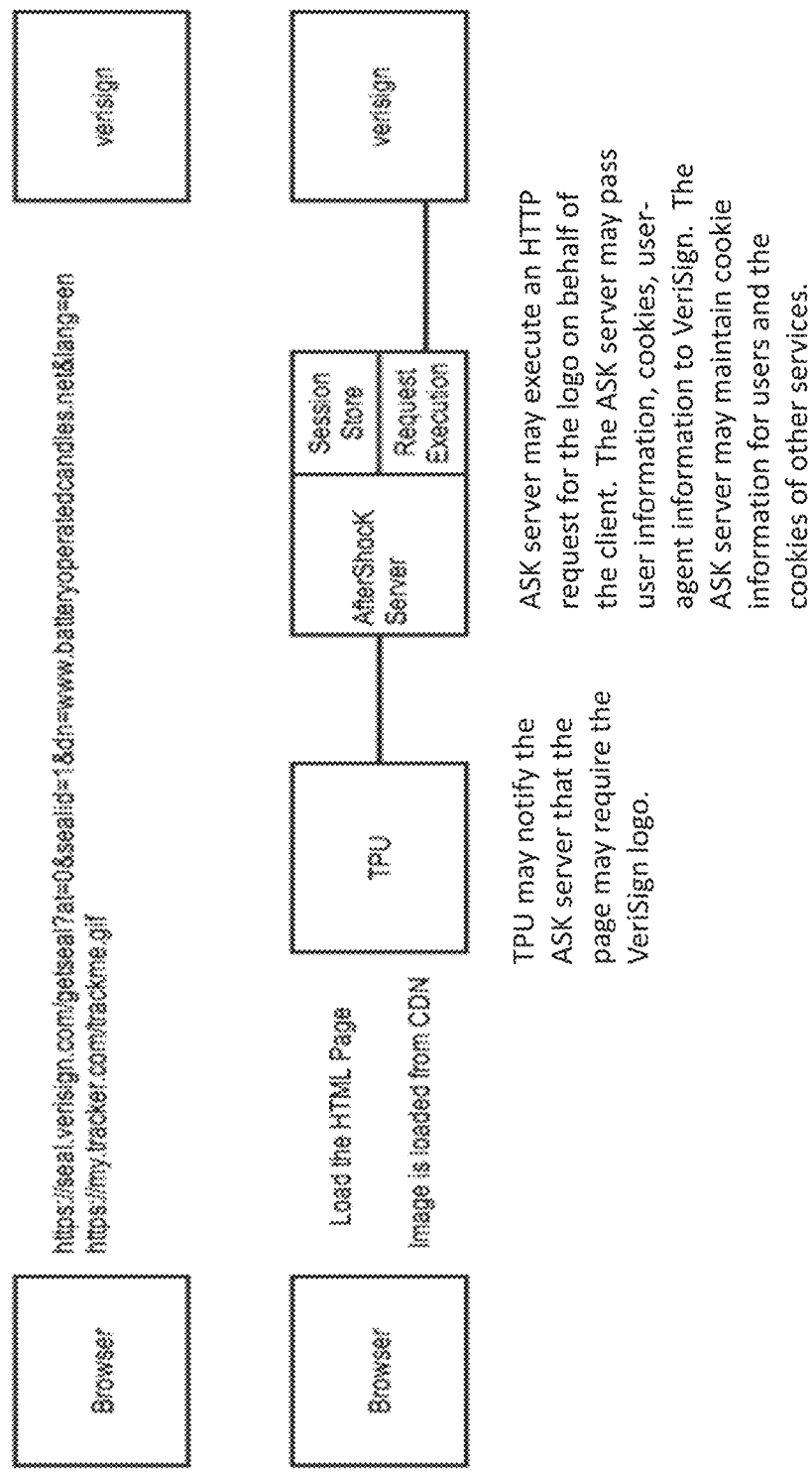
FIG. 2D comprises flow diagrams of embodiments of methods for handling a widget in a browser with and without a web performance optimization (WPO) system.

Web pages may include one or more widgets, such as pixel tags, beacons, social media plugins, images, analytics trackers or agents, media files, and trust shields or badges. Examples of such widgets include: a VeriSign logo, Google analytics agents, Hubspot plugins, and Marketo agents. When WPO detects a widget from a web page, the WPO may direct a request for JavaScript and/or images associated with the widget, to the WPO or TPU's optimizer for handling. Referring to FIG. 2D, a manner by which a widget may be handled by a browser in the absence of the WPO system, as well as via the WPO system, is depicted.

In some embodiments, the WPO may incorporate code into the modified web page to handle the various types of widgets or plug-ins, including third party widgets (e.g., from Facebook, Twitter and Pinterest). Categories of third party widgets include at least the following: (i) Widgets for Facebook, Twitter, Pinterest, Google+, Add this, etc.; (ii) Badges, logos or trust shields, for example, from VeriSign; (iii) Ads, for example, resulting from Google ad words; and (iv) Beacons or agents, for example, from Google Analytics, Marketo, etc. In some embodiments, the WPO may handle ads in a way that is simpler than the handling of widgets, e.g., allow ads to be delay loaded.

The WPO may allow for customization of a configuration of the code, e.g., by a user via the UI. For example, the WPO may allow a user to select or identify specific widgets for targeted processing or handling. The WPO may allow the user to specify when the widget should be injected or loaded onto the page (e.g., disable, X milliseconds after an onLoad event). The WPO may allow a user to change or replace existing widget injection instructions, e.g., change <script src=""> and inline <iframe> into asynchronous injected widgets. The WPO may allow a user to specify a location within the page into which an <iframe> tag may be injected.

In certain embodiments, the WPO may control the injection of widgets via a JavaScript (JS). Javascript-based injection of a widget may be standardized or implemented in the following manner:

```
(function(d, s, id) {
    var js, fjs = d.getElementsByTagName(s)[0];
    if (d.getElementById(id))
        return;
    js = d.createElement(s);
    js.id = id;
    js.src =
"//connect.facebook.net/en_US/all.js#xfbml=1";
    fjs.parentNode.appendChild(js);
}(document, 'script', 'facebook-jssdk'));
```

The WPO may check or verify if such a script is already injected and if not, add, move, replace or otherwise modify the script into the head node or section. The added/modified script can then handle the injection and/or display of the widget.

In some embodiments, widgets may be injected via an iframe, for example:

```
$("#here").append('<ifr'+'ame
src="//www.facebook.com/plugins/likebox.php?href=http%3A%2F%2Fwww.
facebook.com%2Fplatform&width=292&height=590&show_face
s=true&colorscheme=light&stream=true&border_color&
header=true&appId=20152740944" scrolling="no" frameborder="0"
style="border:none; overflow:hidden; width:292px; height:590px;"
allowTransparency="true"></ifr'+'ame>');
```

The WPO or a user may identify (e.g., locate and indicate) the position of the iframe, for example, via the UI. The WPO may include a library to listen for changes to the DOM and implement the client-side functionality. The library may be Javascript-based, and can be used to manage the scripts and iframes discussed above. In some embodiments, widgets may be loaded in external JS files, and loaded within a sandbox. These widgets may be ignored, or handled differently or similarly to that described above. For example, the widget injection code may be modified to be inline, or the code may be injected into that JS file to affect widget handling within that JS file.

In some web pages, deferring scripts may be incorporated and used to defer or delay an action, for example. Such scripts may be suboptimal and may delay page loading and/or consume system resources. An illustrative embodiment is shown below:

```
<!-- Begin: 4q.iperceptions.com --><script
src="http://4qinvite.4q.iperceptions.com/1.aspx?sdfc=4b17eba0-8764-
3a2c35d2-fbbc-45c0-ae78-5f89f694567e&lID=1&loc=4Q-WEB2"
type="text/javascript" defer="defer" ></script><!-- End:
4q.iperceptions.com -->
```

The WPO may detect and may replace such scripts with the WPO's code injection method to efficiently control any deferral/delay using ASK, for example:

```
<script>
    (function(d, s, id) {
        var js, fjs = d.getElementsByTagName(s)[0];
        if (d.getElementById(id))
            return;
        js = d.createElement(s);
        js.id = id;
        js.src =
"http://4qinvite.4q.iperceptions.com/1.aspx?sdfc=4b17eba0-8764-
3a2c35d2-fbbc-45c0-ae78-5f89f694567e&lID=1&loc=4Q-WEB2";
        fjs.parentNode.appendChild(js);
    }(document, 'script', 'facebook-jssdk'));
</script>
```

In addition, WPO may detect and may replace blocking scripts using the ASK code injection method. For example, the following blocking script:

```
<script type="text/javascript"
    src="http://connect.facebook.net/en_US/all.js#xfbml=1"></script>
``` may be replaced by or modified to:

```
<script type="text/javascript"
    src="dataUri:text/javascript;yo_loader('http://connect.facebook.net/
en_US/all.js#xfbml=1')"></script>
```

Alternatively, and in some embodiments, a blocking script may be replaced with similar asynchronous code as discussed above to delay the loading of a resource.

With regards to handling of images, the WPO may handle these with HTML inclusion of image tags. By way of example, the following:
    <img src="//cdn.optimizely.com/js/179843588.js>
may be changed into, or replace with the following example code snippet:

```
<img
src="data:image/gif;base64,R0lGODlhAQABAAAAACH5BAEKAAE
ALAAAAAABAAEAAAICTAEAOw=="
            onload="yo_imageLoader(event)"
            onerror="yo_imageLoader(event)"
yo_src='http://seal.stellaservice.com/seals/stellaservice_excellent.png
?c=3010'
            yo_delayType='scroll'>
```

Figure 2E:
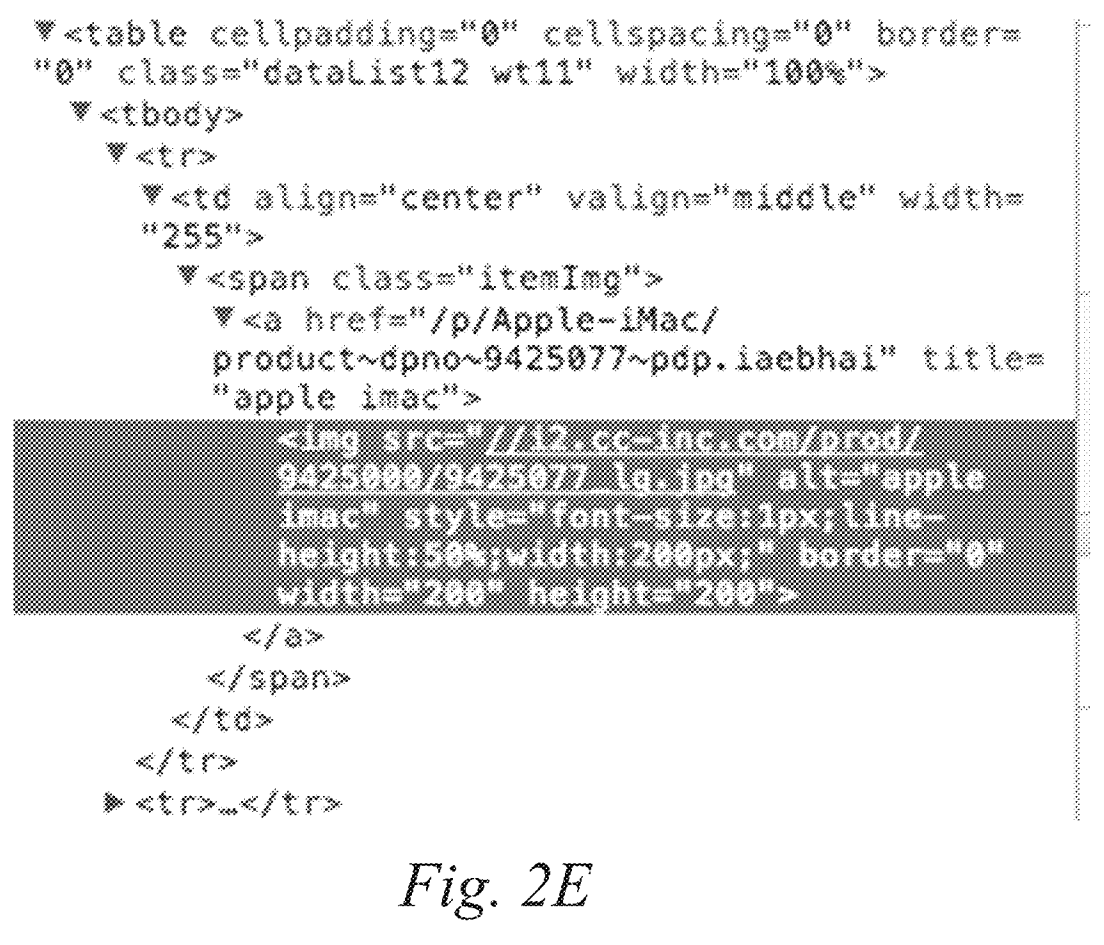

The WPO may use injected code to delay the loading of specific images. Using delay loading may be useful, for example, on blogs and product listing pages, web pages that include many images. To handle images, the WPO may have to perform image selection. This may involve finding and identifying the right images (e.g., to delay load), selecting multiple images, and controlling an appropriate number of images to select. The WPO may in some cases, use URL matching techniques to select images. The WPO may perform image selection using a standard, custom or proprietary query language. The WPO may perform selection of images based on one or more criteria, including DOM position, e.g., identifying a child of a certain element, since in some cases, an image may not have a style or other selectable attributes. For example, and referring to FIG. 2E, an image identified in the highlighted portion may have to be selected from within a web page.

In some embodiments, all elements located after a certain position in a web page may be selected for code-based processing. For example, in a product listing page, it may be desirable to delay the loading of images residing in a secondary, or less important portion of a web page.

In some embodiments, the injected code may control the transitioning characteristics of an image being displayed or appearing on a web page. For example, the code may perform fade-in or fade-out of an image. The image may fade-in or gradually transition to visible state, e.g., when a user scrolls into a portion of the page at which the image is located. This can make the appearance/disappearance of an image less jarring. The code can, alternatively, direct an image to snap on or off screen without a gradual transition.

The WPO may identify and handle existing scripts or script tags in a requested web page. Script tags can block the loading of an application and can cause long delays in page load. The WPO may handle scripts or script tags by code injection into the delivered, modified web page. For such tags, the WPO may process these using ASK to provide the corresponding code for injection. A script loader of the ASK client (e.g., yo_scriptLoader) may perform the actual loading of the script based a configuration. By way of illustration, the following script tag:
    <script   src="//cdn.optimizely.com/js/179843588.js"></script>
may be changed into, or replaced with the following code snippet:

```
<script src="data:text/javascript;plain,/*yo_delay*/"
            onload="yo_scriptLoader(event)"
            onerror="yo_scriptLoader(event)"
            yo_src='//cdn.optimizely.com/js/179843588.js'
            yo_delayType='timer'
            yo_delayValue='1550'></script>
```

In some embodiments, the WPO may detect the insertion of a script tag into the DOM using the AfterShocK client library. The WPO may use the library to manage or perform code/JS injection into the modified page, for example:

```
(function(d, s, id) {
    var js, fjs = d.getElementsByTagName(s)[0];
    if (d.getElementById(id)) return;
    js = d.createElement(s);
    js.id = id;
    js.src = "//cdn.optimizely.com/js/179843588.js";
    fjs.parentNode.appendChild(js);
}(document, 'script', 'facebook-jssdk'));
```

Configuration of these components may be handled by the following illustrative statements:

```
yo_configureAfterShock({ defaultDelay: 5000, resources:
[{url:"//cdn.optimizely.com/js/179843588.js", delayType: "timer",
delayTime: "5000"}] });
```

The WPO may identify and handle existing iframe tags in a requested web page. Iframe tags may block the loading of an application and can cause long delays in page load. The WPO may handle iframe tags by code injection into the delivered, modified web page. For such tags, the WPO may process these using ASK to provide the corresponding code for injection. An iframe loader of the ASK client (e.g., yo_iframeLoader) may perform the actual loading of the iframe based a configuration. The WPO may handle at least two types of iframe injection. By way of illustration, the following iframe tag:

```
<iframe
src="http://seal.stellaservice.com/seals/stellaservice_excellent.png?c
=3010"></iframe>
  may be changed into, or replaced with the following code snippet:
    <iframe src="data:text/html;plain,<html><body></body></html>"
        onload="yo_iframeLoader(event)"
        onerror="yo_iframeLoader(event)"
yo_src='http://seal.stellaservice.com/seals/stellaservice_excellent.png
?c=3010'
        yo_delayType='timer'
        yo_delayValue='1550'></iframe>
```

In some embodiments, the WPO may detect the insertion of a iframe tag into the DOM using the AfterShocK client library. The WPO may use the library to manage or perform code/JS injection into the modified page, for example:

```
$("#here").append('<ifr'+'ame
src="//www.facebook.com/plugins/likebox.php?href=http%3A%2F%2F-
www.facebook.com%2Fplatform&width=292&height=
590& show_faces=true&colorscheme=light&stream=
true& border_color&header=true&appId=20152740944"
scrolling="no" frameborder="0" style="border:none; overflow:hidden;
width:292px; height:590px; "allowTransparency="true"></ifr'+'ame>');
```

Configuration of these components may be handled by the following illustrative statements:

```
yo_configureAfterShock({ defaultDelay: 5000, resources:
[{url:"//www.facebook.com/plugins/likebox.php?", delayType: "timer",
delayTime: "5000"}] });
```

The WPO may generate HTML fragments or injected code to handle waiting images. For iframes and images, the WPO may allow customization of an image displayed while the component has not been loaded. By default, an image (img) may use a transparent 1 pixel gif, for example:

```
data:image/gif;base64,R0lGODlhAQABAAAAACH5BAEKAAEALAAA
AAABAAEAAAICTAEAOw==and an iframe may use the following,
for example: data:text/html;plain,<html><body></body></html>
```

The WPO may allow customization of such default content for images. For example, the WPO may allow customization to provide a specific URL, so that user of the WPO system may add a wait cursor via the URL to the modified page, for example. The URL may allow a data URI incorporation of data, inline to a web page. The WPO may allow customization to provide an optimized version for each encountered image in the requested page. For example, if a user is requesting for a web page from a mobile device, the WPO may provide for an extremely compressed image that is no larger than 2 kb in size, for example.

In some embodiments, the WPO may provide the code for injection. The WPO may store or maintain a base code, which may comprise a configuration for configuring or specifying the injected code. The injected code may comprise the ASK client code. In some embodiments, injected code received by a number of clients for a plurality of web pages may be the same or substantially the same. For example, a full or minimized version of the ASK client code may be accessed from a database (e.g., of the intermediary), or from an online repository (e.g., via a URL), for incorporation into a web page fragment.

The WPO may provide a different configuration to each client and/or for each web page, for example, to configure the injected code to behave or operate differently between two clients and/or two web pages. In some embodiments, a configuration specific to a client and/or web page may be used to configure, specify or otherwise generate a piece of code at the intermediary for injection into a particular fragment. In other words, the injected code may be unique to a client (or user) and/or a web page.

By way of illustration, one embodiment of a base code or configuration is depicted below:

```
{
    "_id": "51d32ddf63e31e2d9000074f",
    "name": "AfterShock",
    "enabled": true,
    "last_modified": "2013-07-02T19:45:57Z",
    "token": "6",
    "_type": "Platform::DocumentRule",
    "match": [
        {
            "_id": "51bb222a86305e35e90000f6",
            "name": "URI",
            "type": "0",
            "operator": "CONTAIN",
            "condition": "/"
        }
    ],
    "actions": {
        "_id": "51d32ddf63e31e2d90000750",
        "htmlInsert": [
            {
                "_id": "51d32ddf63e31e2d90000751",
                "enabled": true,
                "filters": [ ],
                "content": "<script>//Fill in with the latest
aftershock client code.</script>"
            }
        ],
        "transformer": [
            {
                "enabled": true,
                "comment": true,
                "merger": true,
                "item": [
                    //See the Tag Handler Section
                ]
            }
        ],
        "asyncJs": [ ],
        "prefetch": [ ],
        "cssCombination": [ ],
        "jsCombination": [ ],
        "cssSprite": [ ],
        "urlRewrite": [ ],
```

-continued

```
        "dataURI": [ ],
        "badAssetRemoval": [ ],
        "responsiveImage": [ ],
        "clientPrefetch": [ ],
        "cssInline": [ ],
        "jsInline": [ ]
    }
}
```

In some embodiments, the base code may be used to include the ASK client, or to access the ASK client at the client/browser. In certain embodiments, the ASK client uses the base code to configure the injected code to operate in a particular manner at the client/browser. The base code may incorporate, or be used to access code that performs transformation and/or optimization of an aspect of the page, which may improve user experience. The base code or configuration may be based on a default configuration and/or user-customization from default settings. A user, such as an administrator or a representative of a website, may specify or customize a configuration for a web page via a UI and/or API of the intermediary.

In certain embodiments, the injected code may include one or more tag handlers. A handler may be executed or used to remove or replace a particular script tag, process a widget, process a delay, etc. An example embodiment of a handler for removing or replacing <script src="facebook">, is as follows:

```
{
        "type": "1",
        "selector": "script[src~.*all.*]",
        "content": "<script type='text/javascript'>(function( ) {var
po = document.createElement('script'); po.type = 'text/javascript';
po.async = true;po.src =
'//connect.facebook.net/en_US/all.js#xfbml=1';var s =
document.getElementsByTagName('script')[0];
s.parentNode.insertBefore(po, s);})( );</script>"
}
```

An example embodiment of a handler for removing or replacing <scripts src="googleplus">, is as follows:

```
{
        "type": "1",
        "selector": "script[src~.*plusone.*]",
        "content": "<script type='text/javascript'>(function( ) {var
po = document.createElement('script'); po.type = 'text/javascript';
po.async = true;po.src = '//apis.google.com/js/plusone.js';var s =
document.getElementsByTagName('script')[0];
s.parentNode.insertBefore(po, s);})( );</script>"
}
```

An example embodiment of a handler for removing or replacing <script src="twitter">, is as follows:

```
{
        "type": "1",
        "selector": "script[src~.*twitter\\.com\\/widgets.*]",
        "content": "<script type='text/javascript'>(function( ) {var
po = document.createElement('script'); po.type = 'text/javascript';
po.async = true;po.src = '//platform.twitter.com/widgets.js';var s =
document.getElementsByTagName('script')[0];
s.parentNode.insertBefore(po, s);})( );</script>"
}
```

An example embodiment of a handler for removing or replacing <script type="text/javascript" src="//assets.pinterest.com/js/pinit.js"></script>, is as follows:

```
{
        "type": "1",
        "selector": "script[src~.*js\\/pinit.*]",
        "content": "<script type='text/javascript'>(function( )
{var po = document.createElement('script'); po.type =
'text/javascript'; po.async = true;po.src =
'//assets.pinterest.com/js/pinit.js';var s =
document.getElementsByTagName('script')[0];
s.parentNode.insertBefore(po, s);})( );</script>"
}
```

An example embodiment of a handler for managing delaying of a plugin or widget by a configurable delay value, is as follows:

```
{
        "_id": "51d1fb5e63e31e6724000b9c",
        "enabled": true,
        "filters": [ ],
        "content":
"<script>window.yo_configureAfterShock({log:true,defaultDelay:500,
resources:[{url:'monetate.net', delayType:'none'}]});</script>"
}
```

An example embodiment of a handler for managing player.ooyala.com widgets or media, is as follows:

```
{
        "type": "1",
        "selector": "script[src~.*player\.ooyala\.com.*]",
        "content": "<script type='text/javascript'>(function( )
{var po = document.createElement('script'); po.type =
'text/javascript'; po.async = true;po.src =
'//player.ooyala.com/v3/YjlhZDY1YzdkZDhlMGEzN2ZiMWU4OWI3';
var s = document.getElementsByTagName('script')[0];
s.parentNode.insertBefore(po, s);})( );</script>"
}
```

An example embodiment of a handler for managing or tracking core metrics (e.g., relating to web traffic, user experience, etc.), is as follows:

```
{
        "type": "1",
        "selector":
"script[src~.*coremetrics\\.com\\/eluminate\\.js.*]",
        "content": "<script type='text/javascript'>(function( )
{var po = document.createElement('script'); po.type =
'text/javascript'; po.async = true;po.src =
'//libs.coremetrics.com/eluminate.js';var s =
document.getElementsByTagName('script')[0];
s.parentNode.insertBefore(po, s);})( );</script>"
}
```

An example embodiment of a handler for managing or handling Facebook iframes, is as follows:

```
{
        "type": "1",
        "selector": "iframe",
        "content": "<iframe allowtransparency='true'
frameborder='0' data-yo-delayType='lazy'
src='data:text/html;plain,<html></html>' scrolling='no' data-yo-
src='//www.facebook.com/plugins/like.php?href=
```

```
http%3A%2F%2Fwww.facebook.com%2Fpages%2FUmbrellas-and-
Beyond%2F133948556657323%3Ffref%3Dts&send=false&
layout=button_count&width=75&show_faces=
false&font=arial&colorscheme=light&action=like&
height=21'
style='border:none;overflow:hidden; width:75px;
height:21px;'></iframe>"
}
```

An example embodiment of a reference to an "add this" widget, and an example embodiment of a handler for managing or handling "add this" blocking, is as follows:

```
<script type="text/javascript"
src="http://s7.addthis.com/js/250/addthis_widget.js#pubid=msadegursky"
></script>
{
        "type": "1",
        "selector": "script[src~.*js\\/addthis.*]",
        "content": "<script
type='text/javascript'>(function( ) {var po =
document.createElement('script'); po.type = 'text/javascript';
po.async = true;po.src =
'//s7.addthis.com/js/250/addthis_widget.js#pubid=msadegursky';var s =
document.getElementsByTagName('script')[0];
s.parentNode.insertBefore(po, s);})( );</script>"
}
```

By way of example, one embodiment of code injected to pre-load resources for a webpage from a site called www.mywebsite.com, is as follows:

```
<html xmlns="http://www.w3.org/1999/xhtml" xml:lang="en"
lang="en">
<head>
<script type="text/javascript">
function yo_loader(url){
  try{(new Image( )).src = url;}catch(e){ }
}
</script>
<script
type="text/javascript">yo_loader("http://d272okq92s0nye.cloudfront
.net/50b52f8d4707e6603f000bd8/www.7diamonds.com/v~1f/skin/frontend
/7diamonds/7diamonds/images/free_shipping_and_returns.jpg");
yo_loader("http://d272okq92s0nye.cloudfront.net/50b52f8d4707e6603f
000bd8/www.mywebsite.com/v~1f/media/wysiwyg/
7_diamonds_shop_drop.jpg");
yo_loader("http://d272okq92s0nye.cloudfront.net/50b52f8d4707e6603f
000bd8/www.
mywebsite.com/v~1f/media/mconnect_uploadfiles/f/i/first_video.jpg");
yo_loader("http://d272okq92s0nye.cloudfront.net/50b52f8d4707e6603f
000bd8/www.
mywebsite.com/v~1f/media/catalog/category/button_downs_1.jpg");
yo_loader("http://d272okq92s0nye.cloudfront.net/50b52f8d4707e6603f
000bd8/www.
mywebsite.com/v~1f/media/catalog/category/sweaters_3.jpg");
yo_loader("http://d272okq92s0nye.cloudfront.net/50b52f8d4707e6603f
000bd8/www.
mywebsite.com/v~1f/media/catalog/category/kints_polos.jpg");
yo_loader("http://d272okq92s0nye.cloudfront.net/50b52f8d4707e6603f
000bd8/www.
mywebsite.com/v~1f/media/catalog/category/newarrials.jpg");
</script>
....
```

The above code may be injected into the first HTML fragment sent to the browser. The code may be injected at the beginning of the first HTML fragment.

By way of example, one embodiment of code injected to handle cookies for a site called www.mywebsite.com, is as follows:

```
<!--INSTANTON COOKIES START-->
<script type="text/javascript">
document.cookie="frontend=hrv4ncnv6e7upn25c7eqq37ea6; Expires=Tue,
23-Jul-13 16:46:05 GMT;Path=/;Domain=www.mywebsite.com"</script>
<!-- INSTANTON COOKIES END-->
```

The above code may be injected into the second HTML fragment sent to the browser. The code may be injected at the beginning of the second HTML fragment.

Figure 2F:
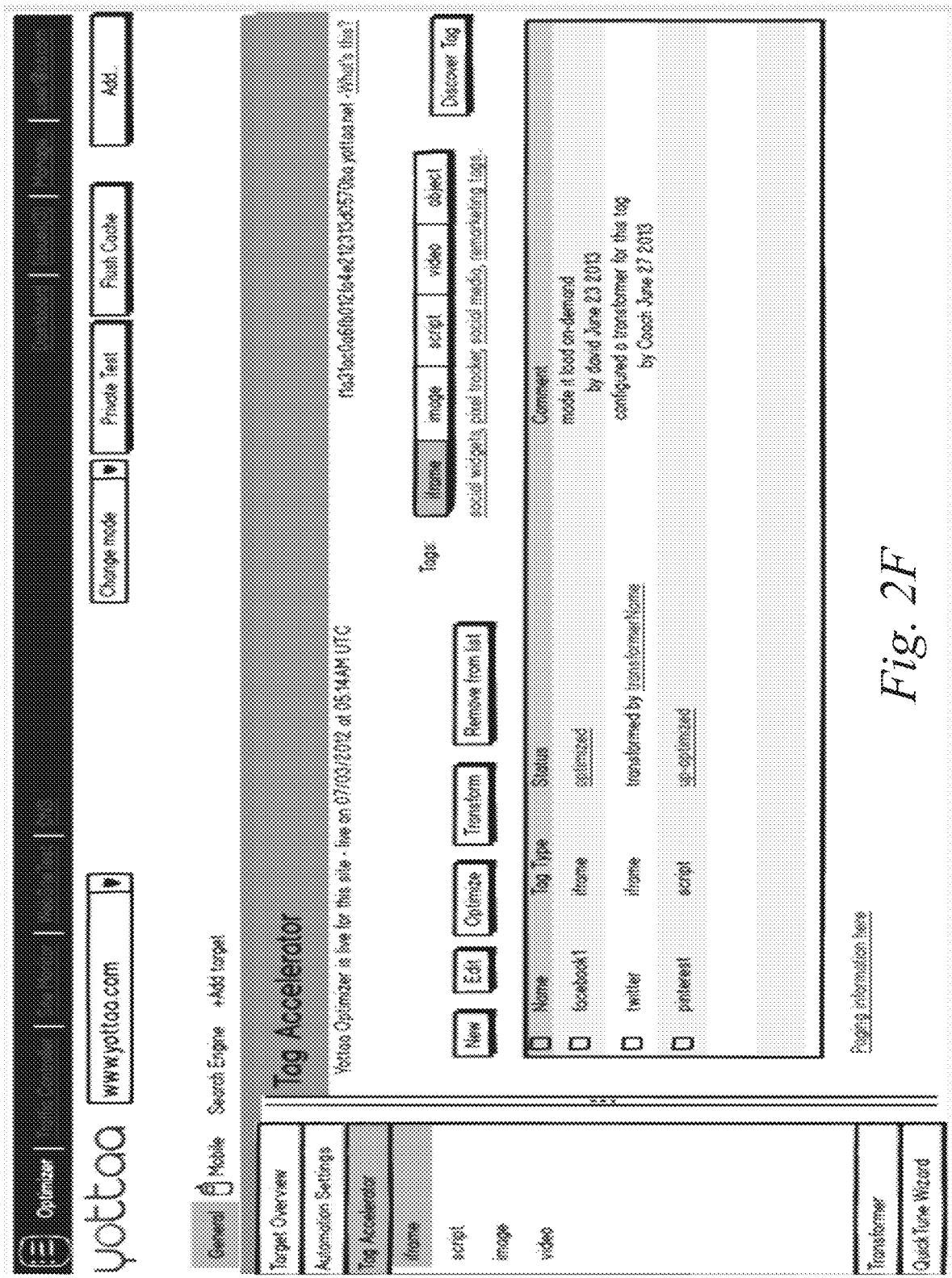
FIGS. 2F-2H comprise embodiments of a user interface for configuring tag-based and other types of modifications to a requested web page.
Figure 2G:
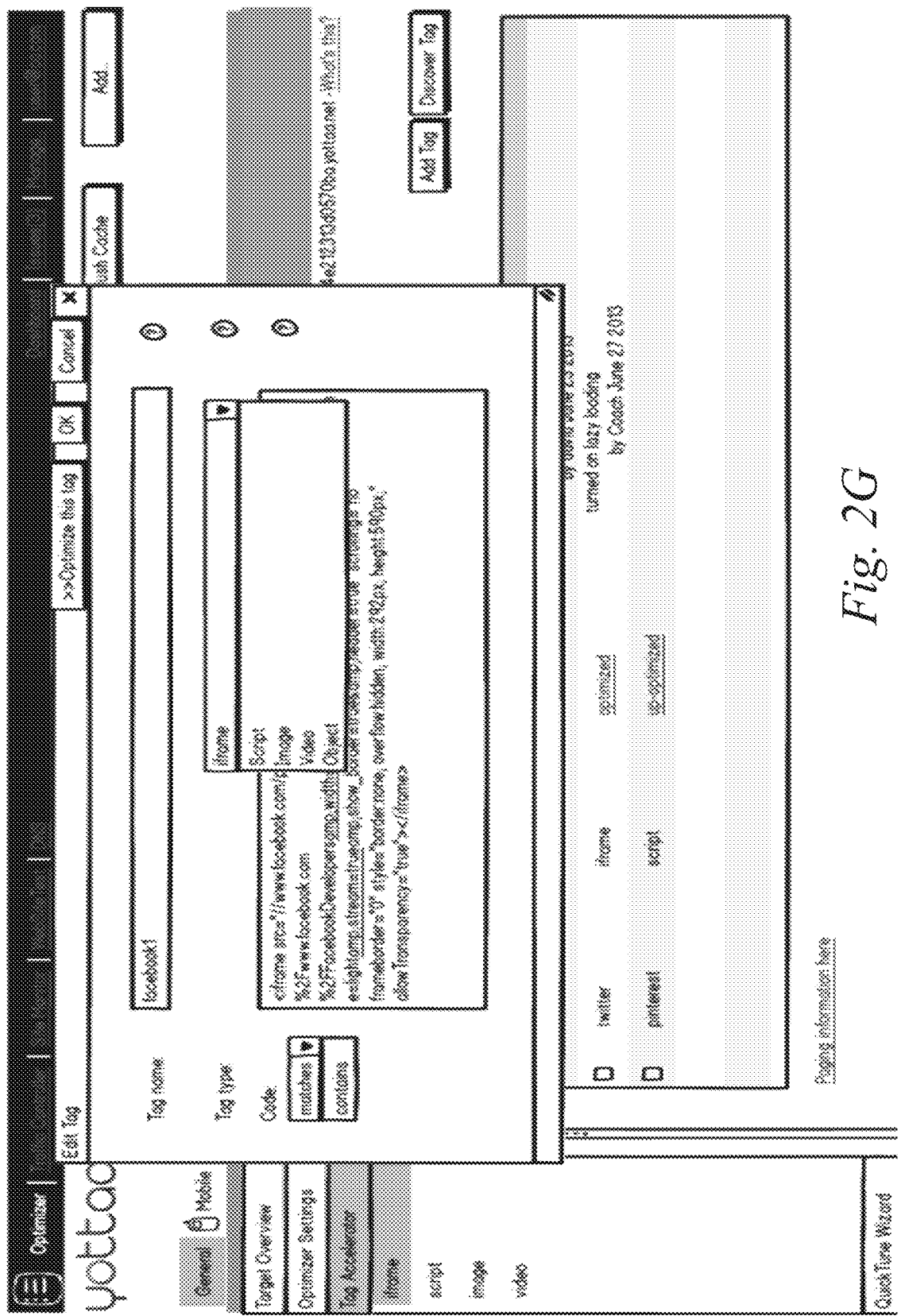
Figure 2H:
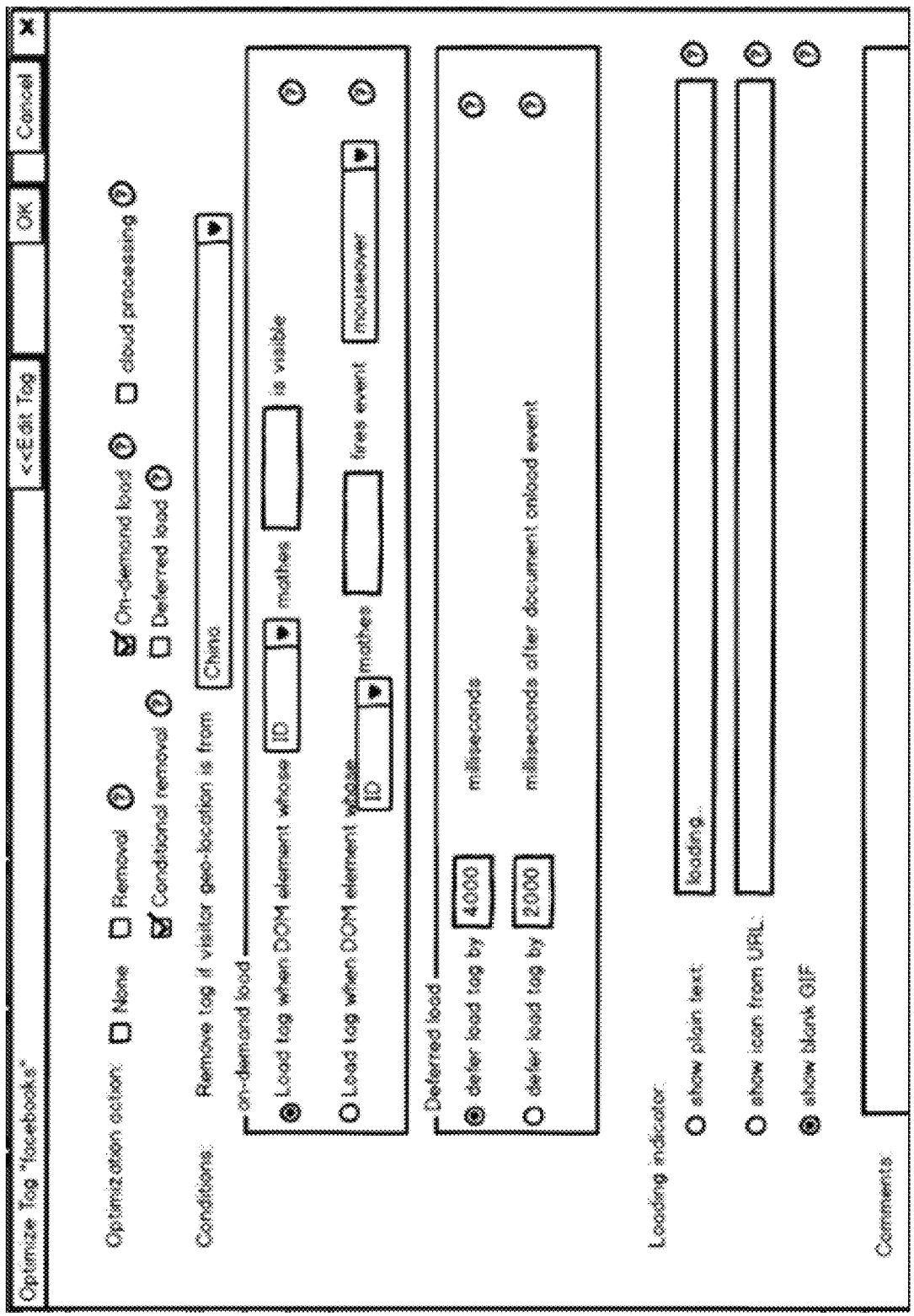
Figure 21:
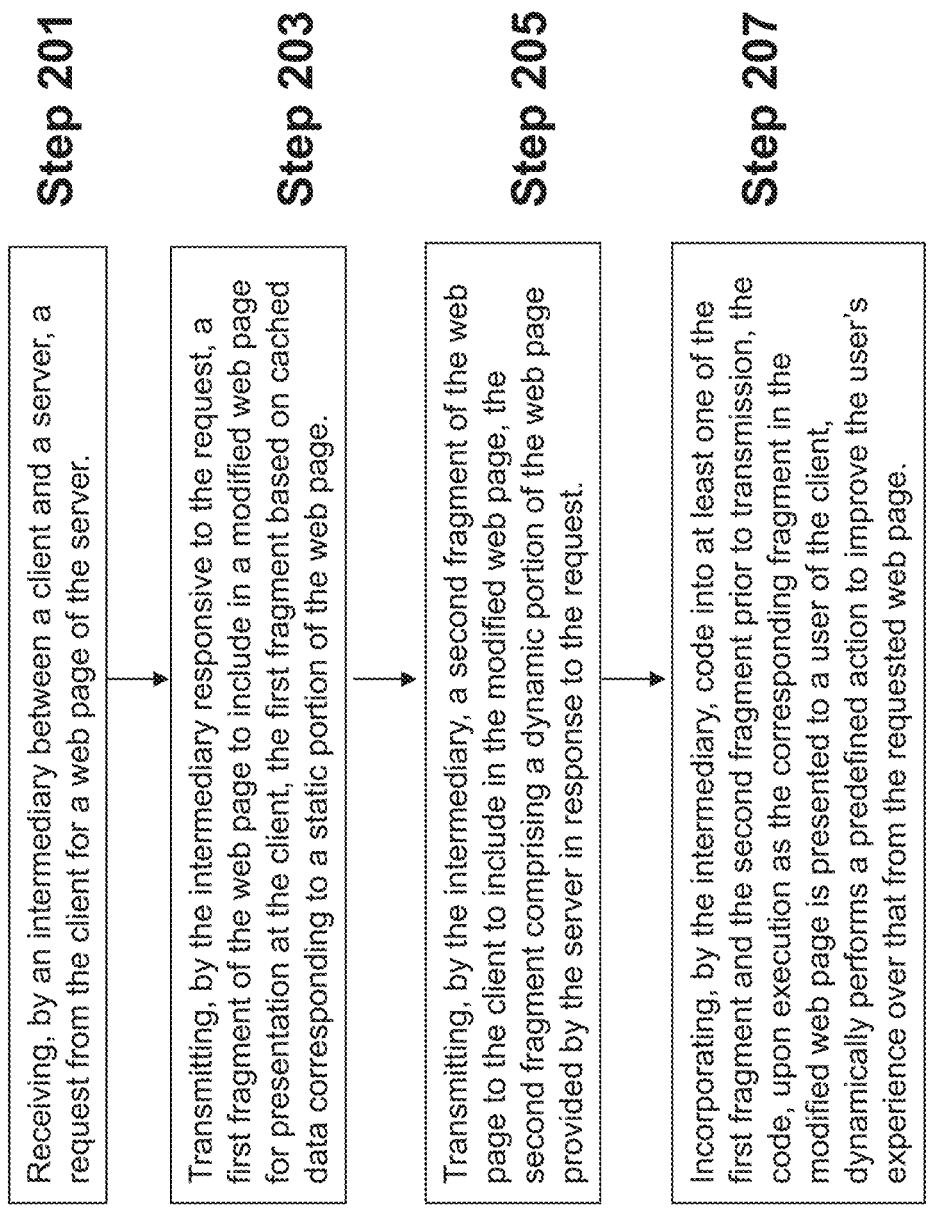

FIGS. 2F, 2G and 2H depict embodiments of a user interface (UI) to configure the intermediary for dynamically modifying a web page from a server for presentation at a client. The user interface may comprise an application or a web-based interface, which may be accessible via the intermediary either remotely, or locally at a component of the intermediary. The user interface may allow a user to customize a configuration for a web page or web site. The configuration may be used to configure code already injected into HTML fragments transmitted to the client, or to configure code for injection into the fragments prior to transmission.

In some embodiments, the UI may provide access to an option for WPO to discover any tags within a requested web page. WPO may automatically recognize or identify different types of tags (e.g., iframe, image, script, video, object) via known signatures (e.g., URL patterns, DOM position). The user may access a list of configured actions on identified tags, with a status and an identification of tag-type for each tag, for example as shown in FIG. 2F. By way of illustration, injected code may be configured to modify a default rendering characteristic of a tag, e.g., make an iframe tag load on-demand. Certain tags may be left un-optimized, e.g., without any configured action, or without any change to its default rendering characteristic(s). In some embodiments, a user may identify a tag to configure an action via injected code. The user may specify, via the UI, to identify a tag through a match or partial match with a string or URL, for example, as shown in FIG. 2G.

The user may direct the WPO to optimize the tag, e.g., based on the tag type and/or a priori knowledge about the tag. The user may manually configure one or more actions. By way of example, and as shown in FIG. 2H, a user may select available options for performing an optimization action, e.g., removal of tag, on-demand loading of the tag, cloud processing of the tag, conditional removal of the tag, or deferred loading of the tag. For on-demand loading, a tag may be configured to be loaded responsive to detection of a trigger, e.g., if an identified DOM element that matches a certain string is visible and/or is accompanied with an event. For example, the event may include a user event such as a mouse-over, mouse movement, or a click. With regards to deferred loading, the injected code can be configured to defer loading of an element/fragment by a customizable delay, which may be determined from the time of the web page request, or a certain time period after a document on-load event.

Referring now to FIG. 2I, one embodiment of a method for dynamically modifying a requested web page from a server for presentation at a client is depicted. The method may include receiving, by an intermediary between a client and a server, a request from the client for a web page of the server (201). The intermediary may transmit, responsive to the request, a first fragment of the web page to include in a modified web page for presentation at the client (203). The first fragment may be based on cached data corresponding to a static portion of the web page. The intermediary may transmit a second fragment of the web page to the client to include in the modified web page (205). The second fragment may include a dynamic portion of the web page provided by the server in response to the request. The intermediary may incorporate code into at least one of the first fragment and the second fragment prior to transmission (207). The code may, upon execution as the corresponding fragment in the modified web page is presented to a user of the client, dynamically perform a predefined action to improve the user's experience over that from the requested web page.

Referring now to (201), and in some embodiments, an intermediary between a client and a server receives a request from the client for a web page of the server. A browser of the client may generate the request based on a user action, such as a click on a link or an advertisement. The intermediary may intercept the request from the client. The intermediary may receive or intercept the request, comprising a HTTP or HTTPS request, from the client. In some embodiments, the client may be configured to transmit the request to the server via the intermediary. The intermediary may receive or intercept the request as a cloud service. The intermediary may process the request as a service or feature of an appliance, router, proxy device or any other network device or system. A TMS of the intermediary may receive and route the request to a TPS, embodiments of which were described above in connection with at least FIGS. 2A and 2B. The TPS may reside in the intermediary or comprise a network device or cloud service. The TPS may receive and process the request, for example, prior to requesting the server for the web page.

Referring now to (203), and in some embodiments, the intermediary may transmit, responsive to the request, a first fragment of the web page to include in a modified web page for presentation at the client. The intermediary may transmit the first fragment of the web page to for processing, assembly, loading, rendering, execution and/or presentation at the client, e.g., on a browser of the client. The first fragment may be based on cached data corresponding to a static portion of the web page. The TPS may access a cache of web page data corresponding to the requested web page. The cache may store or maintain web page data received from one or more servers, including the requested server and/or a mirror site of the requested server. The cache may store one or more components of a web page that may be static, e.g., a header section of the page.

The static portion may comprise elements of the page that do not change between multiple requests, requesting clients, geographical locations of the clients, browsers and/or users, or that do not change over a certain period of time. The static portion may be identified, determined, detected and/or inferred by the TPS over one or more requests for the web page. The static portion may be manually configured or identified by a user or administrator. In some embodiments, the static portion is identified via a comparison between a cached copy of the web page and a later copy provided by the server. The TPS may immediately transmit a first fragment of the page to the client, comprising the static portion of the page, for loading on a browser. Due to the availability of this fragment within a short period of time from the request, a user of the client experiences a more responsive and faster page load in association with the requested web page.

In some embodiments, the intermediary may transmit or convey the request for the web page to the server. The TPS may convey, direct, route or re-transmit the request to the server in parallel with the processing of the request at the intermediary. The TPS may send the request to the server during, before or after processing the request at the intermediary. In some embodiments, the TPS may modify the request, or generate a new request for the web page or for a portion of the web page. Responsive to the request, the server may generate a response comprising a web page, including a dynamic portion of the web page. The dynamic portion may, for example, be specific to the user, the client, the browser, geographical location and/or the time of the request. The server may send the web page and/or a cookie in one or more responses to the request. The server may send the one or more responses to the client or the intermediary, e.g., as each response becomes ready to send.

The intermediary may receive the requested web page from the server responsive to the request, the web page comprising at least the dynamic portion. The intermediary may receive a cookie from the server responsive to the request. The intermediary may receive or intercept the response on behalf of the client (e.g., via Cname or DNS redirection). The intermediary may identify and/or extract the dynamic portion from the response. The intermediary may identify and/or extract a difference or delta from the web page relative to the portion already returned to the client. In some embodiments, the TPS generates or forms a second fragment of the web page based on the difference/delta or the dynamic portion of the web page. The intermediary may form the second fragment as soon as, or responsive to receiving the response from the server.

Referring now to (205), and in some embodiments, the intermediary may transmit another fragment (e.g., a second fragment) of the web page to the client to include in the modified web page. This fragment may include a dynamic portion of the web page provided by the server in response to the request. The TPS may transmit the second fragment to the client as soon as the second fragment is generated. The intermediary may send or convey the cookie from the server to the client. The intermediary may incorporate code (e.g., Javascript, VBScript, ActionScript, a plug-in implemented in a language such as C, C++, a script referencing a browser plug-in, or a script referencing a native module) in the second fragment to set (e.g., maintain, update and/or identify) the cookie at the client for use in a further communication with the server.

In some embodiments, the intermediary may incorporate code in a different fragment (e.g., a third fragment) to set the cookie at the client for use in a further communication with the server. This fragment may be transmitted prior to, responsive to, concurrent with, during or after the transmission of the second fragment to the client. In some embodiments, the third fragment does not include or convey a dynamic portion and/or a static portion of the web page. The intermediary may transmit the corresponding cookie with the third fragment, or transmit the corresponding cookie in a message separate from the third fragment.

Referring now to (207), and in some embodiments, the intermediary may incorporate code into at least one of the fragments (e.g., the first, second and/or third fragments) prior to transmission to the client. The code may be implemented with an appropriate programming or scripting language, such as Javascript, VBScript, ActionScript, a plug-in implemented in a language such as C, C++, a script referencing a browser plug-in, or a script referencing a native module. The intermediary may incorporate or inject a particular type, set and/or collection of code depending on which fragment to which the code is being injected. The intermediary may incorporate a particular type, set and/or collection of code depending on at least one of: data cached in connection with the requested web page, a feature or characteristic of the web page, the requesting user, a characteristic of the client and/or client browser (e.g., client/browser type, geographical location, language preference, etc.), any injected code already delivered to the client via a prior fragment, and a configuration of the intermediary and/or server pertaining to code injection. The intermediary may inject or incorporate code to replace or modify existing code or features in the requested web page. For example, and in some embodiments, the intermediary may disable, modify and/or replace existing deferring or blocking scripts with Javascript code, as discussed above in connection with at least FIGS. 2A and 2B. The intermediary may incorporate or inject the code inline in a message (e.g., HTTP message), or in a separate script file referenced or attached to the message.

The code may, upon execution while the corresponding fragment in the modified web page is presented to a user of the client, dynamically perform a predefined action to improve the user's experience over that from the requested web page. The code may run, execute or be otherwise activated when the corresponding fragment is loaded or processed at a browser or other application of the client. The browser or client application may execute or run the code by loading the fragment. The browser or client application may execute or run the code as the fragment is loaded. At least a portion of the code may remain active or continue to run after the fragment is loaded. For example, the code may, continuously or for a period of time, poll, monitor or detect an action by the user, in the background. A portion of the code may execute after a configured delay, or be triggered by a page load event, browser event, DOM event and/or user action.

The intermediary may incorporate code in a multipurpose internet mail extensions (MIME) multipart message. The code may be injected into a HTTP message. The intermediary may transmit the one or more fragments in a MIME multipart message (e.g., one or more of the subtypes of a multipart message). The intermediary may transmit the one or more fragments via any type of HTTP message. The intermediary may incorporate code in a MIME multipart message to set the cookie at the client for use in a further communication with the server. The intermediary may transmit the first fragment, the second fragment and/or the third fragment via MIME multipart messages to include in the modified web page. The intermediary may transmit one or more of the fragments for assembly and/or processing at the client.

The intermediary may incorporate code based on a configuration of the intermediary. As discussed, the configured may be based on the client device type, browser type, the user, the geographical location, etc. The intermediary may incorporate code customizable via a user interface and/or an API. A representative of the server or website, or an administrator, may customize the configuration based on knowledge of the web page, e.g., obtained via analysis of past traffic. The code may be configured to dynamically perform a predefined action, e.g., using a default and/or customized configuration provided by the intermediary and/or a user. The code may be injected, added or incorporated to operate at the client, e.g., in the background, without the user of the client realizing that the code is present or running. The code may be injected, added or incorporated to operate at the client, without requiring a change or modification at the server, e.g., to generate the web page. The code may be injected, added or incorporated to execute at the client without affecting how the requested web page is generated and transmitted. The code may be incorporated into the one or more transmitted fragments, to modify or alter a feature or characteristic of the requested web page. The code may be incorporated into the one or more transmitted fragments forming a modified version of the requested web page.

In some embodiments, the intermediary incorporates code that directs or requests the client's browser to perform a certain action. The intermediary may incorporate code that directs the client's browser to request for web page data corresponding to the client's device or browser type. For example, the intermediary and/or the injected code may detect that the client comprises a mobile device, or includes a browser with limited capabilities (e.g., lack of support for Flash). By way of an illustrative embodiment, the code may detect the client's device or browser type, or a capability thereof, via a client-agent attribute. The client-agent attribute may be configured in the client or included in the request. The code may direct the browser to request for web page data, of the identified web page, corresponding to the client's device or browser type. For example, the injected code may request for a portion of the web page data (for the requested web page) appropriate for the device/browser, e.g., that can be rendered on the device/browser.

In certain embodiments, the intermediary may incorporate code that directs the client's browser to request for another web page corresponding to the client's device or browser type. As described earlier, the intermediary and/or injected code may detect that the client comprises a mobile device, a large form-factor screen, or a browser with specific capabilities and/or limitations. Based on the detection, the code may be configured to direct or redirect the browser to request for a different web page, e.g., from the same web server or a different web server. For example and in some embodiments, the code may direct the browser to request a different web page optimized for a mobile device, a large-screen device or a touch-screen device. The code may direct the browser to request a web page optimized for an operating system of the device (e.g., iOS, Android, Windows, etc.) The code may direct the browser to request a web page optimized for a particular browser, e.g., Internet Explorer, Safari, Chrome browser, Firefox, etc. Thus, the injected code can improve or optimize a user's experience by customizing web page content or source based on device/browser attributes.

The intermediary may incorporate code that affects an aspect of any one or more resources for the modified web page. By way of illustration, and not intended to be limiting in any way, a resource may include one or more of: hypertext markup language (HTML) content or object, an image, a cascading style sheet (CSS), a widget, a social media plug-in, an analytics agent, a pixel tag, a beacon, a trust seal or badge, a media file, a script and an advertisement.

The intermediary may incorporate code that adds or modifies a configuration for including advertising in the modified web page. The code may detect if advertising is already provided for in the requested web page. The code may remove advertising, e.g., to improve page load time, or to exclude advertising material that is not relevant to the user. The code may modify an existing configuration, e.g., changing an aspect ratio, size, shape, position, animation (e.g., transition effects in presenting an ad or switching ads) of an ad. The code may control timing or delaying of an ad relative to other elements of the page, or in response to a user event or a page load event. In certain embodiments, the code may include an ad by creating a configuration for the ad, or modifying an existing configuration. In this way, the code may be used to incorporate customized content that may be from a third party. The intermediary and/or the injected code may also facilitate impression matching and/or perform brokering with third parties like ad exchanges, ad networks and ad agencies. Accordingly, the code may improve user experience by (i) providing access to relevant and/or customized content, goods and services via intelligent injection/modification of ads, (ii) removing or limiting irrelevant ads, and/or (iii) affecting the presentation of ads based on device/browser attributes and/or particular events.

The intermediary may incorporate code that directs the client's browser to pre-fetch a resource to store in a local cache. The injected code may direct or request the browser to fetch or access a resource (e.g., image), in anticipation that the resource may be needed shortly. For example, the code may direct or request the browser to request and load a resource in a local cache (e.g., of the browser). This pre-fetch may be performed in advance so that any impact from the access, transfer and/or load times for the resource, which may impair page load duration, is minimized. One or more resources may be identified (e.g., via a customized configuration) for pre-fetching. Suitable resources for pre-fetch may include certain large images and widgets, a related web page, or resources originating from a server/database with a slower response. By performing the pre-fetch in advance or in parallel with other page processing activities, the user's experience may be improved with the enhanced performance in loading the web page.

The intermediary may incorporate code that incorporates a third-party widget or content into the modified web page. The injected code may be configured to include content relevant to a user or the requested web page, without reconfiguring the server or how it generates its web page. Widgets from partners, such as third party analytics, may be added to a web page so that a user's online activity (e.g., specific to that web page or across pages) may be tracked and/or analyzed to improve customization of content and/or advertising relevant to the user. Such customization can be performed in real time or introduced at a later, appropriate time. The code may also introduce popular social media widgets or plug-ins, for example, to encourage user interaction, interest and involvement in the web page. Certain trial widgets, features and/or content may be included on-the-fly via the intermediary and/or injected code. For example, trial or limited rollout of a feature may be targeted to specific users, time periods, geographical areas, etc., via a dynamic web page modification using the present systems and methods, without reconfiguring the end server. In some cases, third party provided content or widgets may be more securely introduced at a cloud service or intermediary, instead of being integrated with requested the web page at the server.

The intermediary may incorporate code that controls a location of a resource in the modified web page. The injected code may identify and detect particular resources that are less relevant or which may take longer to load. The injected code may identify and detect particular resources that are more relevant or may be faster to load. The injected code may control the layout of content and other resources by modifying a location of a resource in the web page. For example, the code may control a location of a resource relative to that of another resource. A resource may be re-located to the end of a web page so that it has more time to load, e.g., before the user scrolls to the end of the page. The code may re-position a resource to highlight the resource to a user, consolidate similar resources within a portion of the page, or to improve the layout of the page to the user.

The intermediary may incorporate code that controls a time instant for loading a resource to the modified web page. The injected code may initiate pre-fetching or caching of the resource to control the time instant for loading a resource. The code may delay or time the loading of a resource, e.g., relative to the request for the web page, or relative to a DOM, user or page load event. The code may replace or modify an existing deferring or blocking script. The injected code may comprise an asynchronous loading code. The latter may speed up page loads by allowing asynchronous execution. The latter may prevent a page for being held up trying to load a resource if for example, a third party site goes down or is slow. In some embodiments, the injected code controls a time instant for loading a resource into or from a local cache. For example, the code may direct a browser to load a resource onto a page, but keep the resource in the background (e.g., without making the resource visible or active). In certain embodiments, the injected code may control a time instant for loading a resource relative to a DOM, page load or user event, e.g., a click, a mouse-over, contact with a touchpad, a key entry, eye movement, scrolling action, etc. The injected code may controls a time instant for loading a resource, e.g., an image or widget, when DOM is ready, or when the resource's location is in viewport.

In some embodiments, the intermediary incorporates code that determines a loading sequence for a plurality of resources. As discussed earlier, the injected code can determine a time instance and/or a position for loading a resource. The injected code can determine a time instance and/or a position for loading a resource relative to another resource or to other resources. For example, the code can control a loading sequence for a slideshow function. The intermediary and/or the code may be able to identify or detect a larger image or other resource that should be loaded earlier (e.g., pre-fetched), or delayed (e.g., to avoid a bottleneck in page load). The intermediary and/or the code may incorporate or comprise an algorithm to select and/or order resources for sequential and/or parallel loading.

The intermediary may incorporate code that controls a time instant for making a resource visible or not visible to the user. The injected code may control the time instant(s) and/or duration of a resource's visibility, transparency or alpha-blending with other elements, when loaded on a web page. The injected code may control the time and duration of transitioning effects (e.g., fade-in, fade-out) in making a resource visible or not visible to a user. The injected code may make a resource loaded in the background visible at a certain time or after a certain delay relative to a DOM or user event. The intermediary may incorporate code that triggers loading or visibility of a resource based on an action by the user, e.g., a click, a mouse-over, contact with a touchpad, a key entry, eye movement, scrolling action, etc. The injected code may control a time instant for making a resource visible or not visible relative to the visibility of another resource. The injected code may control a time instant for making a group or collection of resources visible or not visible to the user. In certain embodiments, the intermediary may incorporate code that triggers loading or visibility of a resource based on a web page loading event. The injected code may control a time instant for making a resource, e.g., an image or widget, visible when DOM is ready, or when the resource's location is in viewport.

Different portions or combinations of code may be injected based on existing features, and customizable based on particular requirements. Different portions or combinations of code may be injected on-the-fly to one or more fragments, while a request for a web page is processed.

On-the-page processing occurs as the individual fragments are loaded onto a browser. Accordingly, the present systems and method provide a platform for dynamically modifying aspects of a requested web page that improve user experience.

C. Dynamically Managing Loading Priority or Sequencing of Fragments of a Web Object In some aspects, the present disclosure is directed to methods and systems for dynamically managing delivery and/or loading priority of fragments of a web object, sometimes referred to as application sequencing. In some embodiments, application sequencing refers to a process for orchestrating or managing delivery, as well as client side processing (loading or rendering, which may include download to client and browser loading) of web objects. This process may include re-arrangement of a sequence of items in a requested web object. Application sequencing may include defining fragments each comprising at least a portion of an item, for delivery to a requesting client over a plurality of transmissions. Application sequencing may include a modification of default rendering characteristics of items in a requested web object. The application sequencing process may include re-prioritizing how each item of a requested web object may be delivered and rendered in order to improve the web and mobile user experience. The application sequencing process may include setting conditions/triggers for delivery and rendering of each item of a requested web object in order to improve the web and mobile user experience. Application sequencing, in some embodiments, includes one or both of the following components:

1. Delivery sequencing
2. Interaction sequencing

Application Sequencing Architecture

Figure 2J:
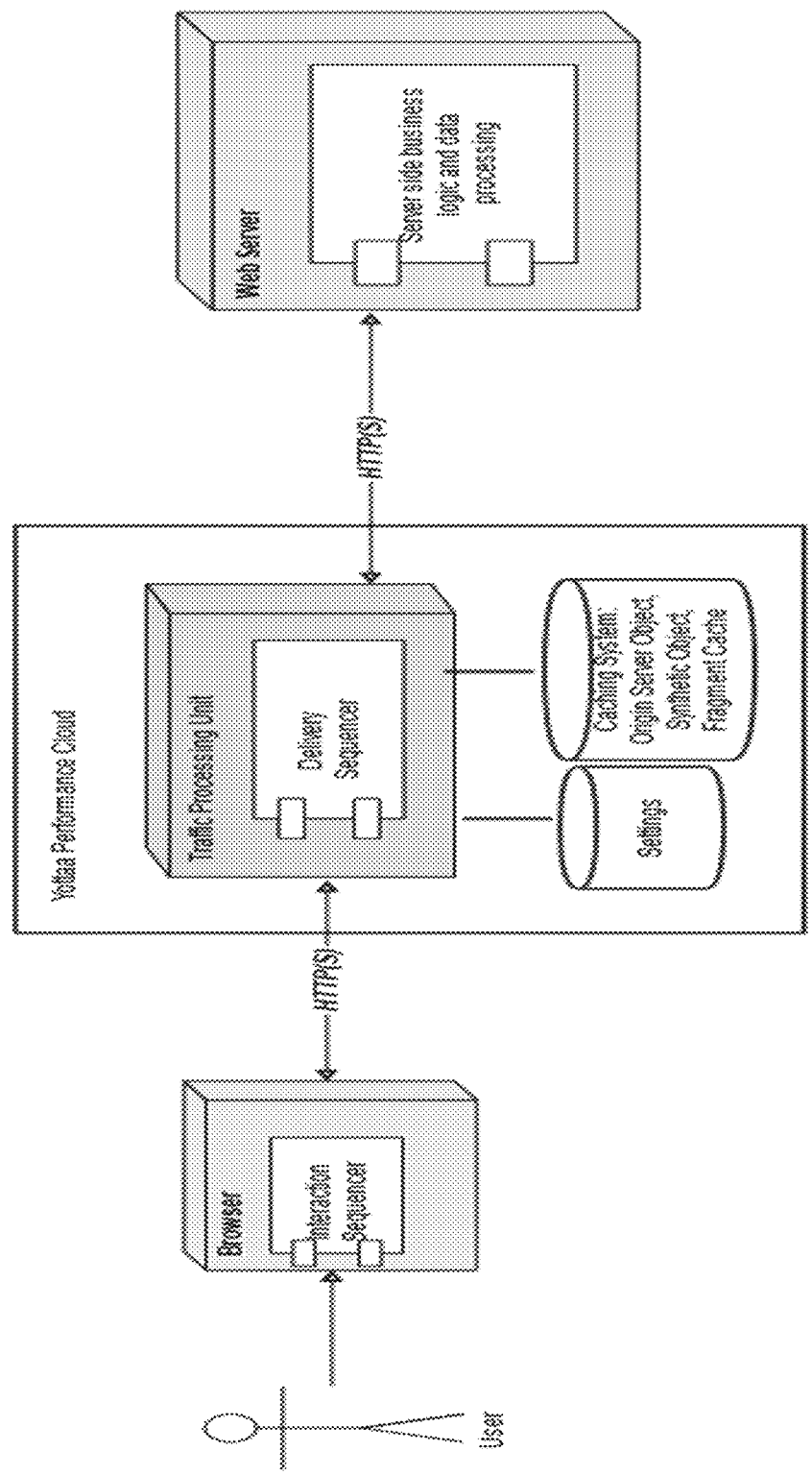
FIG. 2J is a block diagram of an embodiment of a system for dynamically managing loading priority or sequencing of fragments of a web object.

Referring to FIG. 2J, one embodiment of a system for delivering an item of web content requested by a client is depicted. In brief overview, the system may include at least one intermediary between at least one client and at least one server (e.g., web server). Application sequencing, by the system, may be performed using at least one of the following components: a delivery sequencer in the intermediary, and an interaction sequencer operating on the requesting client. The delivery sequencer and interaction sequencer may each comprise a combination of hardware and software, or software executing on hardware (e.g., of the intermediary or client).

The at least one intermediary may include a plurality of network devices, which may include one or more of a server, an appliance, a gateway, a router, a proxy and a domain name service, as examples. The intermediary may comprise embodiments of modules and/or features described above in connection with at least FIGS. 2A-2D. The intermediary may comprise a cloud-based platform and may provide cloud-based services such as web object optimization, delivery optimization and user experience improvements. The intermediary may sometimes be referred to as Yottaa performance cloud.

In some embodiments, the intermediary may include a TPU, a configuration or set of settings, and/or a caching system. The caching system may include and/or manage a cache for storing fragments or items of a web object. For example, the caching system may access a local cache, a remote central storage module, or a storage area network (SAN). The caching system may be configured to track the validity of a stored fragment or item, and may assign or de-allocate memory to an item/fragment based on a static or dynamic behavior of the item/fragment. In some embodiments, the caching system may assign or de-allocate memory to an item/fragment based on a configuration or setting of the intermediary. The configuration or setting(s) may be user-defined and/or set by the intermediary based on prior traffic, and may include any embodiment of the configuration 240 described above in connection with at least FIG. 2A. For example, the intermediary may include or have access to a configuration provided by a representative of the web server. The intermediary may include or have access to a default configuration or set of settings. The intermediary may include a user interface for a privileged person to configure the configuration or settings.

The TPU may include embodiments of TPUs and/or features described above in connection with at least FIGS. 2A-2D. The TPU may include a delivery sequencing engine/module, sometimes referred to as a delivery sequencer. The delivery sequencing engine/module may comprise a combination of hardware and software, or may comprise software executing on hardware (e.g., a processor) of the TPU or intermediary. In some embodiments, the delivery sequencing engine/module or TPU may define a plurality of fragments for a requested item of web content, and may determine to transmit the plurality of fragments to the requestor over a plurality of transmissions. The delivery sequencing engine/module or TPU may order the plurality of fragments in a specific sequence, and may deliver or transmit the fragments according to the sequence. The delivery sequencing engine/module or TPU may define and/or order the fragments based on cached items managed by the caching system for example. The delivery sequencing engine/module or TPU may define and/or order the fragments based on the configuration or settings.

Delivery Sequencing

Delivery Sequencing may involve one or more of: breaking a monolithic web content unit into smaller units (fragments), re-prioritizing the order of (and/or setting conditions for) delivery of these fragments, setting caching policy for each fragment, determining delivery timing for each fragment, and delivering such fragments following the re-prioritized order and delivery timing. The web content unit can be any web content object, such as an HTML document, an image, a CSS file, a Javascript file, a video file, an audio file, or an Adobe Flash or SWF file. Delivery sequencing may be performed at the intermediary by the delivery sequencer.

Interaction Sequencing

In some embodiments, interaction sequencing describes a process for improving or optimizing rendering performance by controlling and streamlining an order of rendering of various elements on a web page, or different fragments of a web content item. The rendering of at least some of these elements may be conditional, e.g., based on triggering events. Rendering may include a process of requesting for, receiving, loading, executing and/or displaying an element on a web page, such as via a browser. Rendering may include a process of interpreting code or instructions, which may include HTML code, to load a portion or element of a web page on a browser. Rendering may include assembly and/or aggregation of components and/or resources into an item for loading, execution and/or display as part of a web page. Rendering may include a process of embedding, incorporating or merging an item, resource and/or fragment into a context/portion of a web page. A browser may perform rendering of an object, which may involve execution of a script or instructions associated with the object. A browser may perform rendering of an object by accessing a graphical processing unit of the client. In some embodiments, rendering includes a process of requesting a component item of an object (e.g., from a server), uploading the component item to the requesting client, loading the component item into memory of the client or a browser, and/or incorporating the component item into the object.

Typically, a browser may render elements in a web page in the order/sequence presented in the web page. For example, for HTML, rendering may start from the top of the page and proceed to the bottom of the page, until the entire page is rendered. Instead of following a normal standard rendering sequence for elements referenced in the web page, interaction sequencing based on the present systems and methods may re-prioritize and/or set condition(s) for the rendering of various components so that important, required and/or available ones are processed immediately while the others may be deferred or processed as needed. Interaction sequencing may be performed at the client by the interaction sequencer. The interaction sequencer may comprise code incorporated, injected or introduced by the intermediary into a portion of a web page that is loaded onto a browser. Injection/incorporation/introduction of executable code may comprise including or embedding the code, in part or in whole, into one or more fragments. Injection of executable code may comprise including a link, reference or locator in one or more fragments, so that the code may be accessible in part or in whole.

Interaction sequencing may include various triggers for processing rendering of a page element, for example, but not limited to:
1. Visibility based trigger: The trigger to render a page element may depend on whether the element is visible to the user (e.g., within a viewing region of a browser or client display).
2. Event based trigger: The trigger to render a page element may be based on a Document Object Model (DOM) event.
3. Timer based trigger: The trigger to render a page element may be based on a timer. When the timer expires, the element can be rendered.

Interaction sequencing can be applied to all kinds of web content types, such as: HTML document, image, video, audio, Javascript, CSS, Flash SWF file, and so on. When the interaction sequencer detects such a trigger, it may initiate a "post-trigger" action for rendering of a corresponding element. In some embodiments, the interaction sequencer implements a pre-trigger action prior to detecting such a trigger. A pre-trigger action may comprise at least one of: withholding rendering of the element/fragment, displaying nothing (e.g., leaving a blank space or an empty object) at an identified location of the web page, and displaying at least one item. The at least one item may comprise at least one of: an indicator or message indicating that an item is loading, a temporary or placeholder item or image, an advertisement, and a special call-to-action item. A call-to-action item may include a widget, image or message for example that entices, motivates or suggests a user to take a particular action, e.g., click on the widget, or scroll the page.

HTML Sequencing

There can be many types of application sequencing, including HTML sequencing. In some embodiments, HTML sequencing refers to a process for improving delivery and rendering of an HTML document, which may be cache-able or non-cache-able. The HTML document can be dynamically generated by a web server, and may include dynamic and/or personalized data unique to the current session, time instant/period/zone, user, device, browser, geographic location, etc. The intermediary may not cache such data when identified and/or received at the intermediary. HTML sequencing may include at least one of the following components:

1. Delivery sequencing: This may be performed by the Traffic Processing Unit (TPU), residing in an intermediary that intercepts HTTP requests and responses between a client and a web server. The TPU may perform one or more of the following: split or break an HTML document into smaller fragments, generate synthetic units based on these fragments, deliver the first unit to the client browser quickly for processing, and store other units for potential subsequent requests from the client. The TPU may also inject executable code (such as JavaScript) into the one of these units or fragments delivered to the browser. This executable code may be configured to perform interaction sequencing.
2. Interaction Sequencing: Interaction sequencing may be performed by the injected executable code, sometimes referred to as "UxSequencer". UxSequencer may execute according to configuration data (e.g., from the intermediary), and may perform actions such as loading additional fragments for the page, determining whether, how and when to render specific fragments on the page, and/or specific HTML tags (including third party tags), and how to render resources on the page (such as images, video, objects, tables, etc.).

HTML sequencing can be applied to both dynamic web pages as well as static web pages. Dynamic web pages may comprise pages that are re-generated or updated by the web server often or at each request, and which may not be cached for direct re-use. Typically, this is because the page may contain (dynamic) personalized data that are unique to the current session, or data that may change dynamically. Static pages are those that may not change over a period of time (sometimes referred to as a Time to Live, TTL). A dynamic page may be assigned with a TTL of a low value (e.g., 1 minute) or zero. Static pages may be cached and thus may not need to be generated by the web server, e.g., until the cache or page expires (e.g., TTL becomes zero).

In one embodiment, HTML sequencing may be performed via one or more of the following steps:
1. A user may visit a web page via a browser (say, a page at http://www.mysite.com/path/loggedin.html).
2. The browser may send an HTTP request to http://www.mysite.com/path/loggedin.html.
3. An intermediary may intercept the HTTP request, and may route it to one of its Traffic Processing Units (TPU) to process the HTTP request.
4. The TPU may access its caching system to check if there are data and sequenced fragments available for this page.
5. If nothing is found from the cache (or what was found from the cache has expired, e.g., with TTL=0), then:
  (i) The TPU may forward the HTTP request to the origin web server for processing, and may wait for the web server to respond.
  (ii) Once the TPU receives the response from the origin web server, the TPU may retrieve the returned HTTP document from the HTTP response, may return it to the current visitor and may perform sequencing in the background.
  (iii) In the background, the TPU may use sequencing settings for this site and this page, and/or other behavioral data that may have been learned beforehand, to sequence this page into small chucks, and may rewrite these chunks into deliverable fragments.

(iv) Rewriting: the TPU may package the chunks and may perform the necessary rewriting, such as:
1. Injecting executable code into the fragment, and/or
2. Remove a content block from the fragment and replace it with a unique identifier or marker (sometimes referred to as "fragment pointers").
(v) The TPU may store some of these fragments into its caching system with the appropriate TTL settings for each one of them. Some fragments may have TTL value of a few hours to a few days for example, but some may have a TTL value of 0, meaning that such a fragment is dynamic and may be retrieved from the origin server's response to the HTTP request.
6. If cached fragments were found with a valid TTL, then the TPU may send back a first fragment to the requestor immediately;
(i) If all fragments for this page have valid TTL (e.g., the page has no dynamic personalized content), the TPU may not need to forward the HTTP request to the origin web server.
(ii) If at least one of the fragments is marked with TTL=0 (dynamic), the TPU may forward the HTTP request to the origin web server to retrieve a new copy of the HTML document.
A. Once the new copy of HTML document is received, the TPU may go through the sequencing steps outlined in Step 5 above again, and may update the cached fragments appropriately.

The steps for delivery sequencing may be performed by the intermediary (e.g., the TPU). Once the first fragment arrives at the client side browser, interaction sequencing may be performed. Interaction sequencing may be performed by executable code injected into the fragment by the intermediary. The injected executable code (e.g., interaction sequencer) may use its configuration data to determine whether, when and how to render content (e.g., page elements) inside this fragment, and whether/when/how to initiate additional fragments onto the page based on page events:

If a page element is visible, interaction sequencer may render it (including loading the resources the element may require);
The timing for rendering may be determined by the configuration data for interaction sequencer. Rendering can be immediate, deferred by a certain duration, deferred until certain resources are rendered, or deferred until everything (e.g., all required resources, or everything else) is rendered;
If the page element is not visible, interaction sequencer may initiate or sequence the element's rendering according to configuration data (e.g., modified/configured rendering behavior): deferred or on-demand as needed. The trigger for rendering can be page events such as user interactivity or other in-page activities. For example:
The user scrolls the page
The user clicks a button or link on the page
A timer expires
A change in a page element that fires a DOM event, etc.

When interaction sequencer is rendering an element, it may load additional resources required by the element. It may identify and/or use one or more fragment pointers to compose an HTTP request to the server to download additional fragment(s) for processing. The following includes a few examples to illustrate how application sequencing may be performed.

Application Sequencing Configuration

Application sequencing configuration data may specify how a website and its pages are sequenced. Application sequencing configuration data may come from various sources, for example:
1. Rules built into the system (e.g., Yottaa Performance Cloud) or intermediary
2. Page behavioral data collected during run-time production data as well as data collected during training sessions (e.g., a profiling process)
3. Sequencing configuration provided by system administrators, site developers and/or technical support team. This may be done by providing a web based user interface that the user can configure or input sequencing settings directly. An example is to provide a graphical user interface that the user can use to select page elements, and apply sequencing configuration to that element from the visual UI directly.

The configuration may guide or direct the intermediary to configure a rendering characteristic for a page element, and/or to modifying a default rendering characteristic of a page element. In some embodiments, a configuration for a page element may provide/answer/address one or more of the following:
1. Is this element static? If so, what is the TTL for this element? Typically the TTL may be the same as the TTL of the corresponding page itself.
2. Is this element dynamic? If so, this element may have a TTL value of 0, which means it should not be cached and should be retrieved from the origin server's response (HTML document).
3. What is the trigger to render this element? The choices may include:
1. Visibility based: render this element as soon as it becomes visible;
2. Event based: render this element as soon as a particular DOM event is fired;
3. User interactivity based: render this element as soon as the user or web visitor takes a particular action on the page;
4. Rendering behavior (sometimes referred to as post-trigger action). The choices may include:
1. Render the element immediately (as soon as possible)
2. Render this element after a certain amount of waiting time (deferred loading)
3. Render this element after all other elements have been rendered Example: Sequencing a Dynamic HTML Page Consider a dynamic web page identified by URL "http://www.mysite.com/path/loggedin.html". This HTML source code for the page may look like:

```
HTML Source Code for "loggedin.html"
<html>
<head>
...
</head>
<body>
<div id="header" ...>
<img src="logo.png">
<span>Welcome, CoachWei. Your last login was at 03:23:14am ET Mar 2 2013</span>
...
</div>
```

```
<div id="block1" ...>
<H1>This is content block #1</H1>
...
</div>
<div id="block2" ...>
<H2>This is a content block #2<H2>
...
</div>
<table id="block3" ...>
<H2>This is content block #3</H2>
....
</table>
</body>
</html>
```

This page may contain many content blocks. Each content block can contain its own resources. In this example, content block "header" may be dynamically generated and may be personalized to the current logged in user. Other content blocks may be static and not personalized. In a typical process, the browser may send the request to the web server for page http://www.mysite.com/path/loggedin.html. The Web server may receive such HTTP request, find the session information and the user information, perform server side business logic processing and may also perform the necessary data lookups and queries. Eventually, the web server may generate the above HTML document, and send this document back to the browser. The browser may start to process this HTML document following the standard processing order (typically line-by-line or element-by-element, from the top to the bottom of the HTML document, including loading the necessary resources along the way). After all elements of this page have been processed and rendered, the page may be ready for user interaction.

Figure 2K:
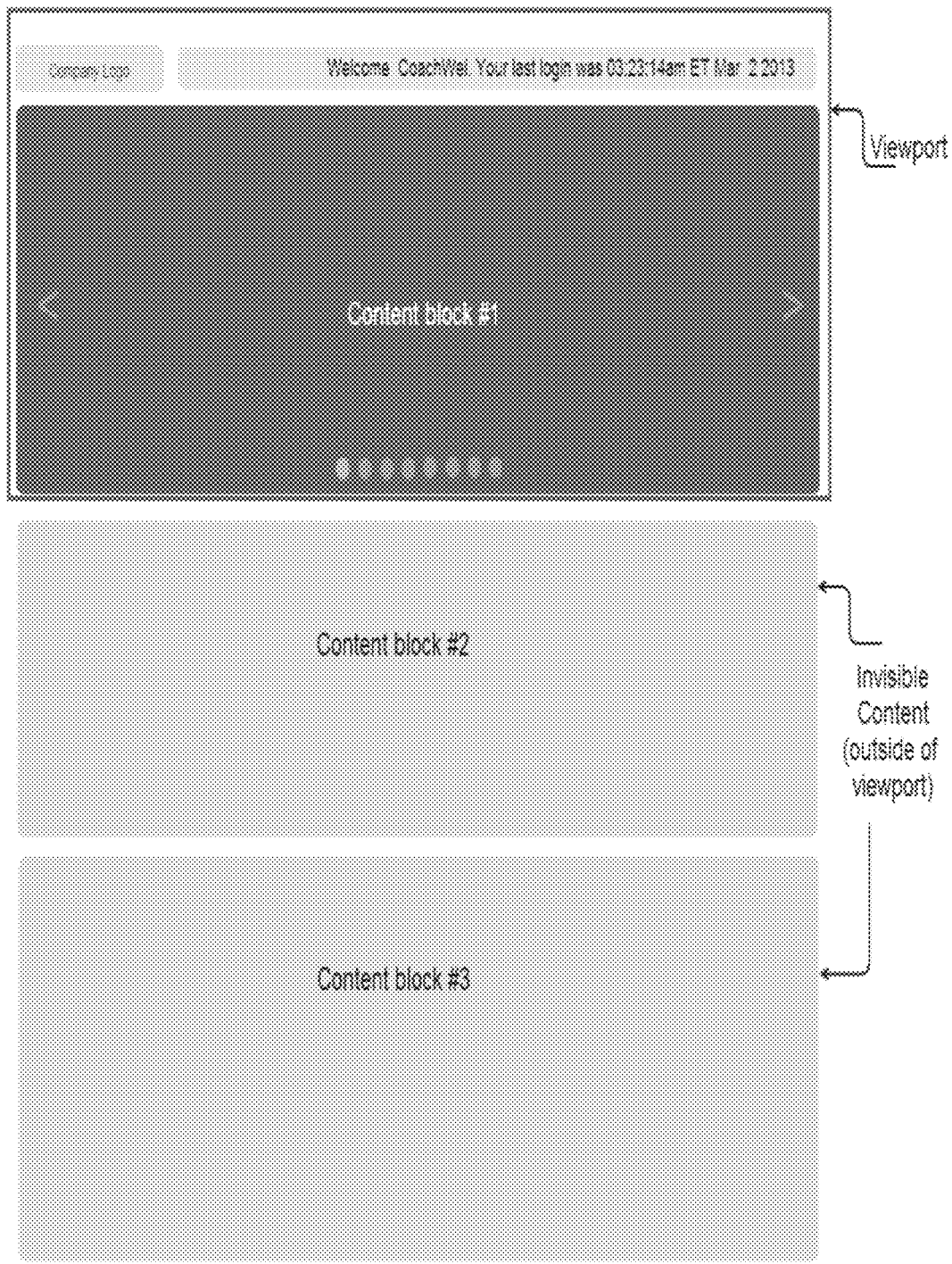
FIG. 2K depicts one embodiment of a HTML document that can be processed by systems and methods for dynamically managing loading priority or sequencing of fragments of a web object.

From a visual display perspective, the above page may be rendered in the illustrative embodiment as shown in FIG. 2K. When the page is displayed in the browser, a significant portion of content may be outside of the viewport or viewing region of the browser screen. The viewport may comprise a viewing region or area of the browser or client device, viewable by the user. Content outside the viewport may not be visible/displayed/viewable to the user, such as Content Block #2 and #3, as shown in FIG. 2K. However, such content may still have to be loaded and rendered as part of the page, which can slow down the page load and impact user experience significantly.

In accordance with some embodiments of the present systems and methods, an intermediary may sequence this page according to sequencing configuration. The document may be broken into chucks and modified by injecting executable code and appropriate unique identifiers or markers, resulting in, for example, five fragments as shown below.

Fragment 1: executable code yo-app-sequencer.js may injected and its configuration settings may be injected as "yo-app-sequencer-config.js". Further, the content of this fragment may be chosen using visibility or viewport-based detection: content that are initially displayed above the fold in the viewport are incorporated into this fragment. Content blocks that are not visible (below the fold) may be stripped out as separate fragments with appropriate unique identifiers or markers (e.g., that includes URL strings) injected into this fragment:

Fragment 1

```
<html>
<head>
...
<script type="text/javascript" src="//yo-app-
sequencer.js"/><script>
<script type="text/javascript" src="//yo-app-sequencer-
config.js"></script>
</head>
<body>
<div id="header" ...>
<img src="logo.png">
<span id="welcome-user"
yopath="http://www.mysite.com/path/loggedin.html/?yoloc-
id=welcome-user"></span>
...
</div>
<div id="block1"
yopath=""http://www.mysite.com/path/loggedin.html/?yoloc-
id=block1" .../>
<div id="block2"
yopath=""http://www.mysite.com/path/loggedin.html/?yoloc-
id=block2" .../>
<table id="block3"
yopath=""http://www.mysite.com/path/loggedin.html/?yoloc-
id=block3" .../>
</body>
</html>
```

Depending on the sequencing configuration, fragment 1 may be set a Time to Live from 0 to a few hours, a few days, etc. If the TTL is set to be larger than 0 and has not expired, the TPU can use the previously cached fragment 1 to respond to future requests for this page without having to wait for the origin server to generate a new page first, thus significantly reducing the waiting time and providing an instant on experience to the user. Once this fragment arrives at the browser, the browser can start rendering the page immediately.

Fragment 2:

Fragment 2

```
<span id="welcome-user">Welcome, CoachWei. Your last login was
at 03:23:14am ET Mar 2 2013</span>
```

Fragment 3:

Fragment 3

```
<div id="block1" ...>
<H1>This is content block #1</H1>
...
```

</div>

Fragment 4:

Fragment 4

```
<div id="block2" ...>
<H2>This is a content block #2<H2>
...
</div>
```

Fragment 5:

| Fragment 5 |
|---|
| <table id="block3" ...><br><H2>This is content block #3</H2><br>....<br></table> |

In this example, fragment 1 may be selected by a visibility or view-port-based rule. It may be configured to be "static" with a TTL larger than 0, which means the previously cached copy can be used. It may be displayed immediately. Fragment #2 may be configured to be dynamic with a TTL=0. It may be retrieved from the origin server's response (HTML file). Fragment #3, #4 and #5 are all static, which means previously cached (and unexpired) copies can be used.

Once fragment 1 is processed and rendered by the browser, the interaction sequencer "yo-app-sequncer.js" may start to manage interactions according to its configuration data. The configuration data may for example specify to: (i) display fragment #2 as quickly as possible; (ii) display fragment #3, #4 and #5 if necessary (e.g., a post-trigger action in response to a trigger), such as when they are becoming visible when the user scrolls down the page (trigger).

When an HTTP request to this webpage is intercepted by a TPU, the TPU may forward the request to the origin web server. However, it may look for a cached copy of fragment #1 for this web page. If it finds such a cached copy, it may return the cached copy to the client immediately, and may not wait for the origin server to respond to the initial HTTP request. Once this fragment arrives at the browser, the browser can start rendering the page immediately, providing a responsive user experience. Once the origin server returns an HTTP response, the HTML, document from the response may be used to reconstruct all fragments, and may replace previously cached copies with an updated TTL policy for each fragment for future usage.

Upon rendering of fragment #1, interaction sequencer yo-app-sequencer.js may immediately scan the page for unique identifiers or markers, and process them according to the configuration. For example, it may find the marker for fragment #2. Because fragment #2 may be configured to be displayed as soon as possible, it may immediately fire an HTTP request in the background to the server to retrieve fragment #2. This request may be constructed using the unique identifier or marker discovered, which may be:

yopath=http://www.mysite.com/path/loggedin.html/?yo-loc-id=welcome-user

When this request is intercepted by the intermediary, the processing TPU may access a cache to check for fragment #2 according to the information provided by the unique identifier or marker. If the TPU finds fragment #2 in cache and the corresponding TTL is valid, the cached copy may be sent back to the client. If not, the TPU may wait for the origin server to respond to the initial HTTP request to retrieve the web page. Once the response is returned/received, the TPU may extract the corresponding segment from the response webpage as fragment #2, and return this to the client. The client side executable code may take the returned response and replace the HTML element with the returned DOM element. As a result, the user may for example see a personalized welcome message and his last login date and time displayed/updated in the browser, based on the returned DOM element.

In some embodiments, interaction sequencer yo-app-sequencer.js may not do anything proactively for other fragment unique identifiers or markers detected or discovered on the page, because the corresponding fragments may be configured to be loaded as needed. If the user does not scroll the page, these fragments may not need to be loaded, thereby saving significant bandwidth and/or avoiding unnecessary processing on these fragments. In some embodiments, the interaction sequencer may perform a limited or predefined amount of processing in connection with other fragment unique identifiers or markers (e.g., for unique identifiers or markers nearer or proximate to the corresponding viewport), in anticipation of a scrolling action or other trigger, for example.

By way of illustration, responsive to the user scrolling the page, or to some other event occurs that causes a fragment to become visible, the interaction sequencer may use the unique identifier or marker to construct an HTTP request. The interaction sequencer may send or direct this request to the server to retrieve the corresponding fragment. Although the request may be addressed or directed to the server, the TPU may intercept and/or process the request. The HTTP request may be intended for the TPU, and may be generated such that the TPU recognizes the appropriate processing and/or response for the request. In some embodiments, the server may not understand the request and may not be able to directly handle the request. The TPU may go through a similar process to locate the requested fragment (e.g., from cache or from a response sent by the server) and return it to the client. In some embodiments, the TPU may wait for a response from the server, and may generate a fragment requested by the HTML request, based on the response. In certain embodiments, the TPU may request for or retrieve resources for the requested fragment (e.g., from the server, a cache, a third-party service, or a different network device/location). The TPU may generate and/or return the requested fragment, responsive to the request. The client side interaction sequencer may replace a placeholder object and/or a unique identifier in the page with the returned HTML fragment, or otherwise render the fragment.

A loading icon, loading message or loading status indicator may be injected into the placeholder (or as the placeholder) for each fragment. While the fragment is being loaded, the user can see the loading indicator as a visual feedback, thus improving the overall user experience.

JavaScript Sequencing: Introduction

In association with Javascript optimization and other aspects described in this disclosure, it may be helpful to identify factors that can affect web performance. Every web application may require satisfactory performance in order to be functional. Every web application may have its own context such that different factors may influence performance differently. Since the beginning of the web, there have been many performance tuning endeavors responding to what a particular context calls for. A good metric to gauge web performance may be page loading time. Page loading time refers to the time from when browser issues the page URL request to the moment when the page is loaded, rendered and ready for user interaction. Page loading time may be determined by three factors:

Server processing time: the amount of time that the server takes to process a page request and deliver the response to the client;

Network transfer time: The amount of time that it takes to transfer the content from one end point to the other end point;

Front end processing time: the amount of time that the client (browser) takes to process the content it received, including parsing, loading additional resources when required and rendering.

Given that web applications may be distributed across web server, network and web browser, all of the three factors can play a role in performance. However, the relative importance of each factor is different, which is largely related to the web architecture. Historically, the web architecture was server-centric. All (or almost all) intelligence stayed on the server side and there was very little intelligence on the client side. The browser may require very little "intelligence" besides acting as a "dumb display terminal". Further, web content were mostly plain HTML, pages that consume very little network resources to transfer. In this model, the performance bottleneck was typically on the server side and server processing time may be the biggest performance factor. As a result, most of the earlier web performance optimization efforts focused optimizing server side processing, such as using more powerful servers, database tuning, optimizing server side logic, etc.

As web pages grew richer, the number of external objects, such as graphical images, included in web pages started to grow. Because external objects require network round trips, the impact of network transfer started to become more visible, especially when transferring content internationally. HTTP caching was adopted to alleviate the network impact. Further, content delivery services (CDN), which are mostly based on HTTP caching techniques, grew into an industry dedicated at improving network performance for delivering web content.

Over the last several years, there is a so-called "Web 2.0" evolution. Driven by a need to deliver a richer user experience, the web's architecture has shifted away from being 100% server-centric into an architecture that leverages both client side and server side processing power. Putting data and intelligence to where the user is at significantly improves user experience by reducing server round trips. As a result, in today's web 2.0 environment, the client side is taking on more data and computation. From 1995 to 2008, the size of an average web page has increased 22 times, and the number of external objects per page has grown 21.7 times. From 2003 to 2008, the average web page grew from 93.7K to over 312K (233%) and the number of external objects in the average web page nearly doubled from 25.7 to 49.9 external objects per page. Because JavaScript may be a main supported way to implement client side intelligence, today's web applications tend to employ a significant amount of JavaScript code.

Consequentially, this Web 2.0 evolution significantly changed the comparative importance of web performance factors. For the first time, front end processing time is becoming the biggest factor in web performance while server side processing time and network transfer time are both becoming secondary.

More specifically, among front end processing, client side JavaScript code is becoming one of the top influencers on the overall performance due to the increasingly dependency of web applications on JavaScript. In order to understand how the front end, especially JavaScript, is impacting web performance today, some typical web pages were studied. The following table shows content composition of the front pages of two illustrative web sites, American Airline (www.aa.com) and FaceBook (www.facebook.com):

TABLE 1

Content Composition of Selected Web Sites

|  | aa.com front page Size (%) | Facebook.com front page Size (%) |
|---|---|---|
| Total footprint: | 810 KB (100%) | 687 KB (100%) |
| JavaScript: | 334 KB (42%) | 532 KB (77%) |
| HTML | 182 KB (23%) | 23 KB (3%) |
| Images (.gif, .jpg, .png) | 201 KB (29%) | 78 KB (11%) |
| CSS files | 69 KB (9%) | 45 KB (7%) |

In both cases, the initial HTML text is only a small percentage of the page footprint (23% and 3% respectively). This may be generally true for web pages today. Secondly, the biggest portion of both pages is JavaScript, at 42% and 77% respectively. It is not uncommon to find web sites today that JavaScript comprises 40% to 90% of the footprint.

Further, as recognized by the present systems and methods, the front end may be where majority of the page loading time is spent for today's web pages. For example, by studying some major web sites, examples of front page loading times are as shown in table 2. The result show that, on average, only 5% to 20% of the page loading time may be caused by server processing and network transfer of the initial HTML content, while up to 90% of page loading time is spent processing the content.

TABLE 2

Some Major Web Site Front Page Loading Time Distribution

|  | Time Retrieving HTML | Time Elsewhere |
|---|---|---|
| Yahoo! | 10% | 90% |
| Google | 25% | 75% |
| MySpace | 9% | 91% |
| MSN | 5% | 95% |
| ebay | 5% | 95% |
| Amazon | 38% | 62% |
| YouTube | 9% | 91% |
| CNN | 15% | 85% |

As a result, consistent with the present disclosure, a recommendation or proposed rule is to optimize front-end performance first, that is where 80% or more of the end-user response time is spent. For today's web pages, some or all of the following may apply:
   The server time for generating HTML content and network transfer time for such content may only be small factors in page performance, typically only 5% to 20% of the page loading time.
   Front end processing time can be as high as 95% of page loading time.
   HTML may only be a small portion of the footprint while JavaScript can be a significant portion of the footprint, sometimes as high as 80% to 90%;
   JavaScript code performance can be the major performance influencer.

In accordance with the present disclosure, one or more of the following recommendations or rules may apply in general:
   1. Make Fewer HTTP Requests
   2. Use a Content Delivery Network
   3. Add an Expires Header
   4. Gzip Components
   5. Put Stylesheets at the Top
   6. Put Scripts at the Bottom
   7. Avoid CSS Expressions 8. Make JavaScript and CSS External
9. Reduce DNS Lookups
10. Minify JavaScript
11. Avoid Redirects
12. Remove Duplicate Scripts
13. Configure ETags
14. Make AJAX Cacheable The significant popularity of Ajax contributed to widespread usage of JavaScript. A substantial number of web 2.0 applications relies on JavaScript to deliver front end interactivity. A growing list of JavaScript libraries (over 200+) are being created by various Ajax developers, some of which have gathered significant community adoption. Though the usage of JavaScript code can lead to significant better overall user experience, it can also bring problems if not used properly. Some of the common performance related problems are:

1. Sluggish network and runtime performance. It is common to see web pages that load several hundred kilobytes of JavaScript. The size of JavaScript libraries ranges from kilobytes to several hundred kilobytes, or even megabytes. Big footprint introduces not only longer download/parsing time, but also bigger client side memory/CPU footprint. For some browsers, parsing/processing large script can take an excessive amount of time.
2. The browser freezes from time to time. There are many cases that JavaScript code can slow down the entire browser instance. For example, too many JavaScript files that need to be loaded may cause excessive number of network round trips; the execution of a long running JavaScript function can block the browser from responding to user events until the function finishes, etc.

In accordance with the present disclosure, techniques that may be employed to improve JavaScript performance may include:

1. On-Demand Loading (Lazy Loading)

Instead of loading all JavaScript files up front, loading them only when necessary can reduce the upfront network impact. A lot of JavaScript libraries provide such functionality, such as YUI loader and Dojo's package system.

2. Concatenation

Concatenation may be one effective way to reduce the number of round trips. Instead of loading different JavaScript files using separate HTTP requests, concatenating these files into one file would enable all of them to be loaded using one HTTP request. Dojo ShrinkSafe and YUI Compressor are two tools that can support file concatenation.

3. Minimization (and Obfuscation)

JavaScript programs are delivered to the client side as plain text where it is compiled on the fly and executed. However, there are two downsides of this approach. The first is code size. The source can contain materials (such as whitespace and comments) that are not necessary for code execution but rather for the purpose of aiding human readability of the code. Such materials have negative performance impact. The second side effect is lack of code privacy. Given that the code is delivered as plain text, someone could read it, learn embedded techniques, and may even gather hints from the source code on how to compromise associated security.

JavaScript minimization and obfuscation are possible techniques to deal with both issues. Minimization removes the comments and unnecessary whitespace from JavaScript source code. Obfuscation changes the names of variables, functions, and members to strings that are harder to understand (and typically shorter). JavaScript tools typically implement support for both obfuscation and minimization. Some of the popular tools are:

Dojo ShrinkSafe
YUI Compressor
Dean Edward's JS Packer
JSMin

Applying the above techniques, it may be possible to achieve a footprint reduction of 20% to 50%.

JavaScript Sequencing (Hereafter Sometimes Referred to as "Razor")

In some aspects, the present disclosure is directed to methods and systems for JavaScript Sequencing. JavaScript Sequencing may be referred to as a type or category of application sequencing, e.g., application sequencing as applied to JavaScripts or scripts and program code in general. JavaScript Sequencing describes a process for JavaScript optimization. Unlike other JavaScript optimization techniques that are based on static lexical analysis, Razor can use dynamic run-time profile information to achieve results of 60% to 90% savings. Razor or JavaScript Sequencing functionality may be provided in whole or in part by the intermediary and/or executable code injected into a web object fragment. JavaScript Sequencing is developed in part based on at least some of the following observations:

1. JavaScript functions are the basic low level building blocks of JavaScript code. Though typical JavaScript applications are made up of JavaScript files, functions are at a lower level than files because each JavaScript file is composed of JavaScript functions. While current JavaScript optimization techniques operates on a "file" level, performing optimization at the function level could yield much better results;
2. At any moment of time, the browser may need only one function because only one JavaScript function is executed at any moment of time.
3. Theoretically, the application would work fine if we download only one function at a time, right before the function is going to be called. Other functions are not needed. These other functions can stay on the server side without being downloaded until they are going to be called. There is no need to download all the code up front, and there may be no need to download them immediately;
4. If only one function needs to be downloaded and stay on the client side, we can achieve breakthrough savings in both download size as well as client memory/CPU footprint, resulting in significant performance improvements above any other techniques.

In some embodiments, JavaScript optimization (e.g., via the delivery sequencer or TPU) using the present systems and methods sequences the delivery of a JavaScript by breaking the Javascript into individual functions. The intermediary (e.g., via delivery sequencer or TPU) may group functions needed for specific use scenarios to be delivered "just in time" for that use scenario. For example, for the initial application page loading, Razor may only download functions (e.g., to the client) that are necessary for the initial loading scenario by "trimming" other functions from this initial download. This "trimming" process may sometimes be referred to as "raze". After the initial download, if a "raze" function is needed, Razor can download this function on demand in the background.

The Razor process may include an engine to analyze when/which function is called during different run-time scenarios. For example, if the delivery sequencer knows exactly which functions are called and when they are called during the initial application loading, the delivery sequencer can trim all other code from the initial download without breaking the application. This would significantly save the initial download size and improve page loading performance. The knowledge of "when/which function is executed" can be achieved by profiling the application. By recording the profile data, Razor can have an accurate knowledge of the dynamic run-time behavior of the application beyond static lexical analysis for delivering breakthrough optimization results.

Razor Optimization Process

Figure 2L:
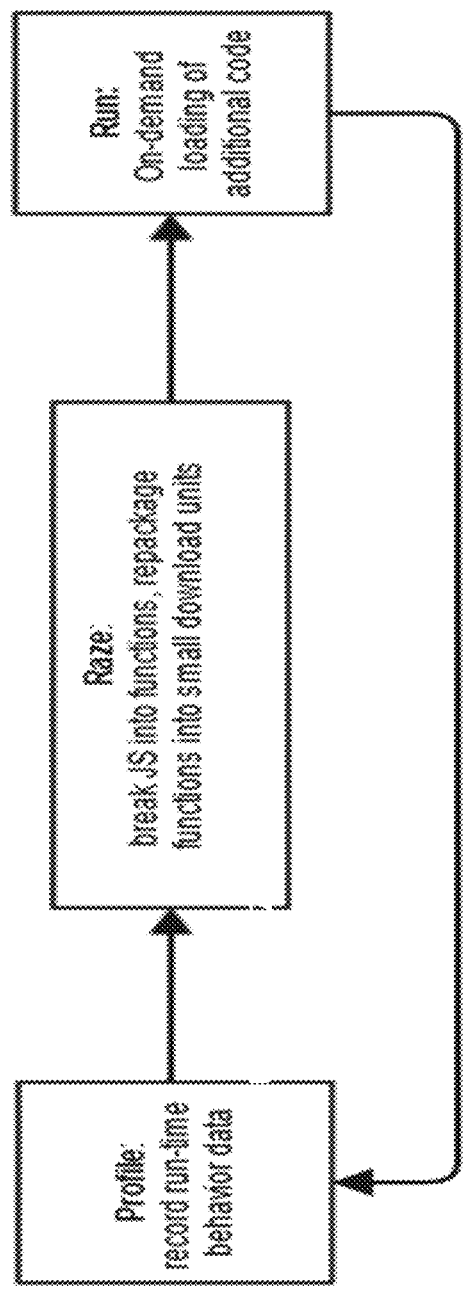
FIG. 2L depicts one embodiment of a method for performing a type of application sequencing.

In some embodiments, Razor uses a three-step sequencing process to optimize JavaScript code: profile, raze and run, as shown in FIG. 2L.

Profile:

During the "profiling" process, Razor may profile the application and record run-time information such as which functions are called, when a function is called, the duration of each function call, and the call stacks etc. These recorded data may be used for the second step, "raze".

Raze:

During the "raze" process, Razor may break the application into many smaller parts at a function level, and re-build download units by assembling only these functions that are called during profile scenarios into assemblies suitable for downloading. Before applying Razor, the download units are JavaScript files written by the developers. A browser may issue a request for each JavaScript file to download it. With Razor, the download units may be assembled from scratch by removing the "not needed" functions and adding these that are called during profiling. As a result, all download units can contain only what is needed and exactly what is needed. For example, Razor may use the "initial loading" profile scenarios data to assemble the "initial loading" download unit. This unit may contain only these functions required for initial loading, and exactly these functions required for initial loading. These functions may be defined in different JavaScript files. Razor can pull them out of these JavaScript files and assemble them into the download unit. Functions are not called during any of the initial loading scenarios are "trimmed" from the initial download and are being kept on the server side instead. When the Javascript application starts, the download unit assembled from the "initial loading" profile scenario may be sent to the browser. Because this download unit can contain all functions required for initialization, this one HTTP request can be enough to satisfy the initialization requirement. As a result, the number of JavaScript round trips may be reduced to 1 for the initial startup. Because only exactly what is needed may be downloaded, the corresponding download footprint may be dramatically reduced as well. Further, "run-time profile scenario" data may be used for assembling run-time download units. Functions called during a run-time scenario, if not downloaded already, may be grouped together into one download package and may be downloaded when needed.

Figure 2M:
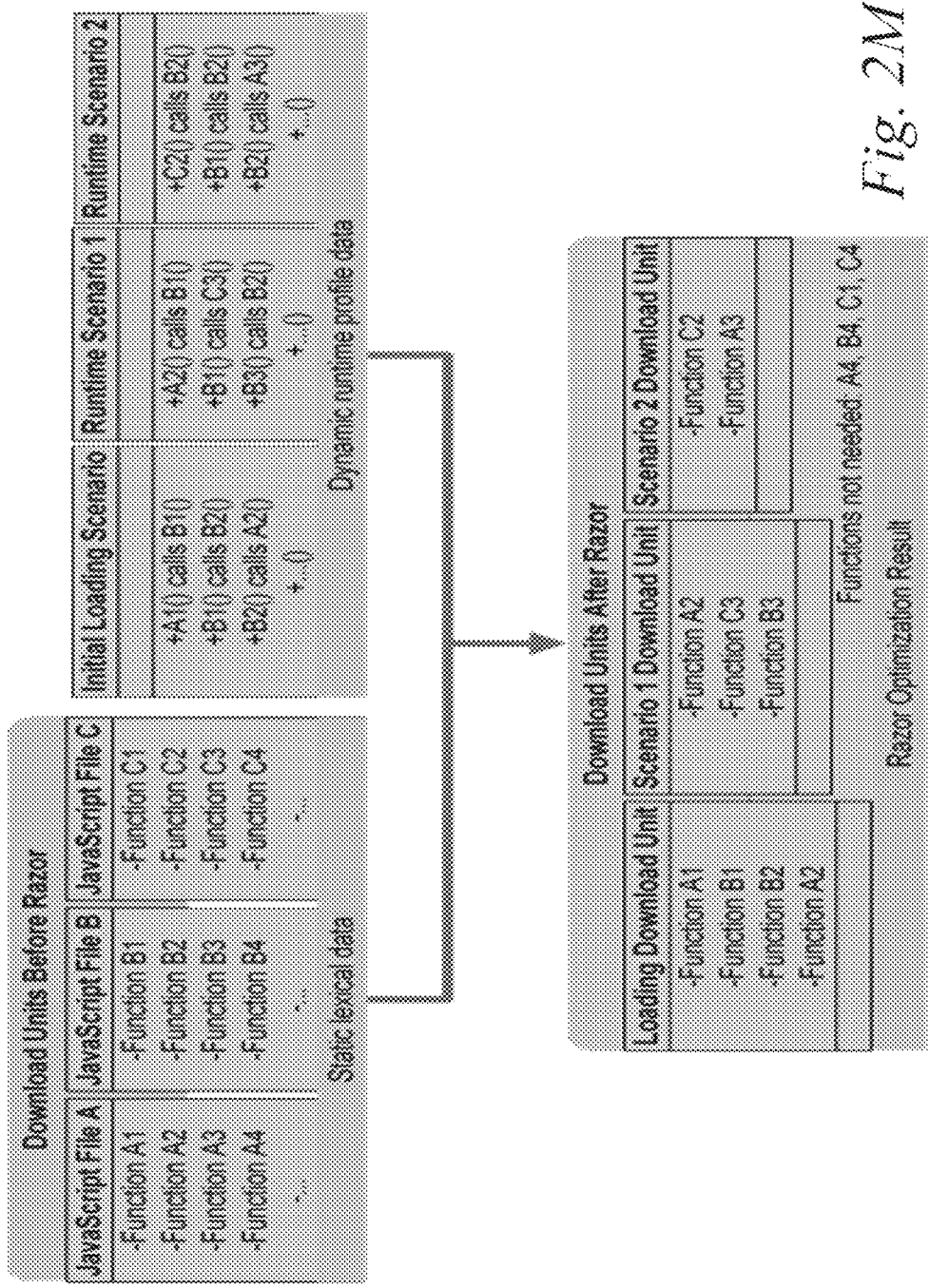
FIG. 2M depicts another embodiment of a method for performing a type of application sequencing.

During the "raze" process, current JavaScript optimization techniques such as minimization, obfuscation and concatenation, etc., can still be applied. FIG. 2M shows one embodiment of the "raze" process. By way of example, the process may "raze" functions that are not needed, and may assemble new download units according to profile data.

Run:

When the application starts, Razor may load the initial download unit to startup the application. At runtime, when a function is going to be called, if the function has been downloaded to the intermediary already, the function may be invoked directly as usual. If not, Razor may check to see if the function is in cache. If so, Razor may restore the function to its original status for invocation. If not, Razor may download the function on demand from the server side.

Optionally, the intermediary may be configured or specified to have certain download units pro-actively streamed to the client side. Once specified, Razor (e.g., on the client side) may download these units in the background as soon as the client becomes idle, without having to wait until functions in these download units are invoked. Once a function is downloaded to the client side, it may be cached and available for future usage.

Razor Optimizer

Embodiments of the present systems may include a Razor Optimizer, which implements the Razor approach for optimizing JavaScript applications. In some embodiments, Razor Optimizer may be a part of the functionality provided by the interaction sequencer, or comprise a module or a script separate from the interaction sequencer. Razor Optimizer may be a combination of hardware and software, or may include software executing on hardware of the intermediary.

Figure 2N:
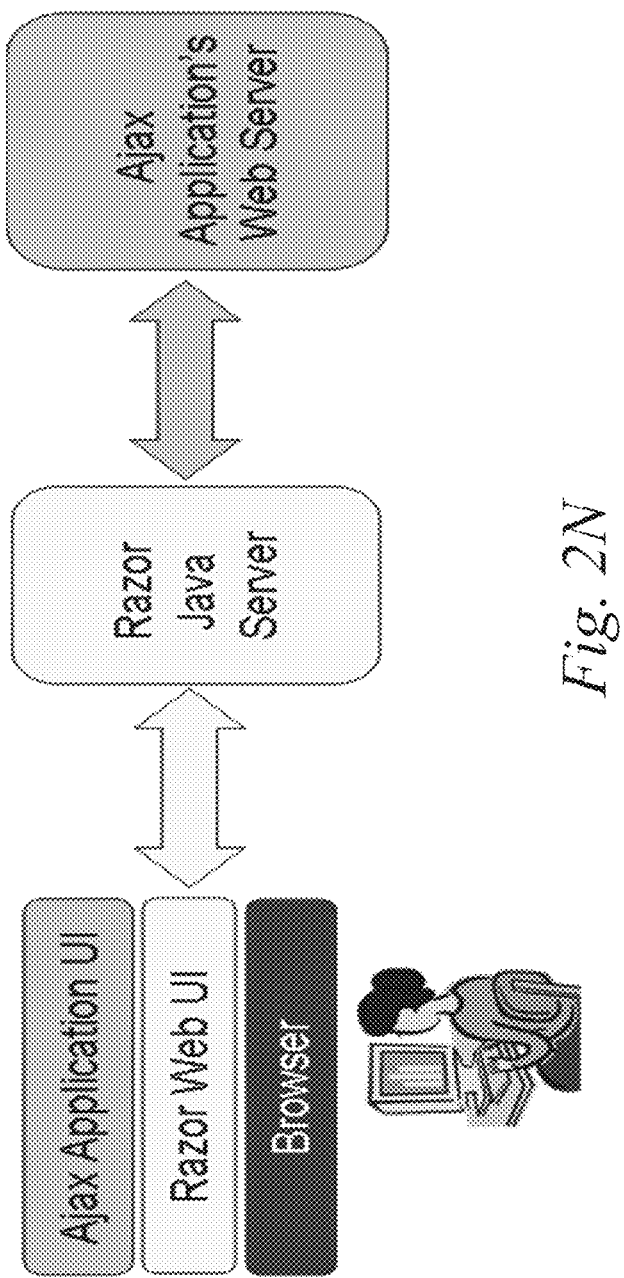
FIG. 2N depicts one embodiment of a system for managing delivery of web content.
Figure 20:
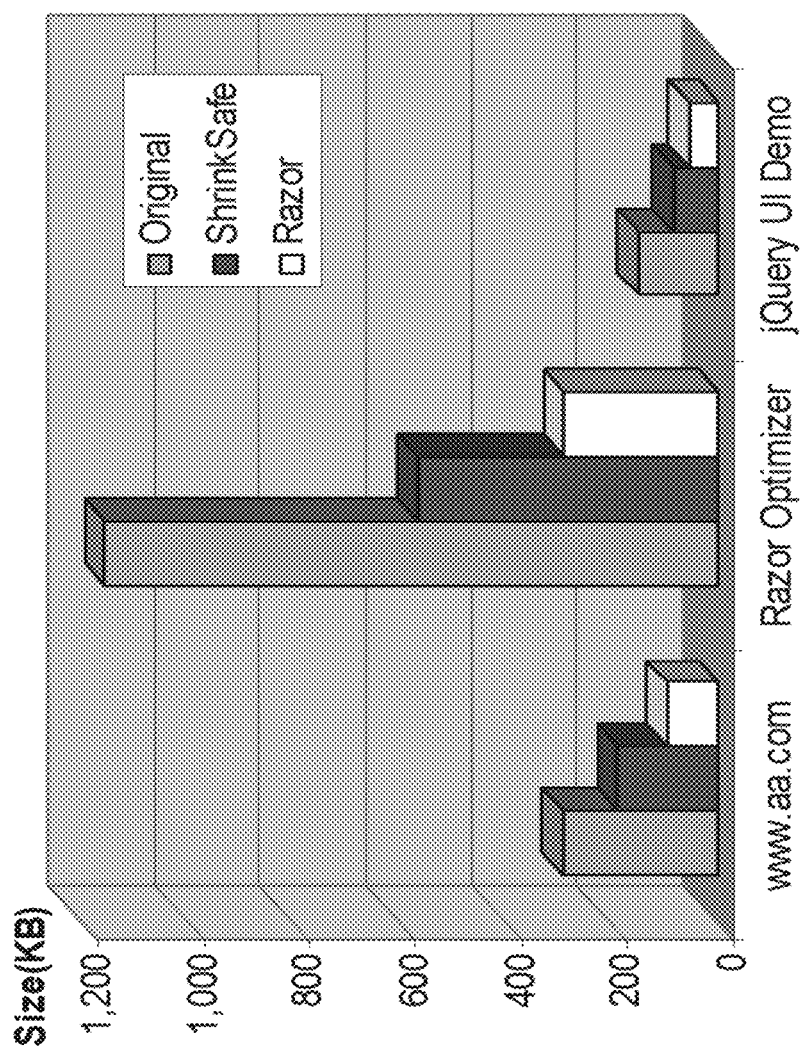

In some embodiments, Razor Optimizer may comprise a web based JavaScript application that runs in any browser. It may include a server component and a client component. By way of illustration, and not intended to be limiting in any way, the Razor Optimizer client may comprise an Ajax application based on Dojo 1.1. The Razor Optimizer client may reside and/or execute on the client. The Razor Optimizer server may comprise a Java web application that runs inside any Java Servlet container. The Razor Optimizer server may reside and/or execute on the server (e.g., web server). FIG. 2N shows one embodiment of a system for managing delivery of web content, and provides an illustrative architecture of Razor Optimizer.

Case Studies

By way of illustration, Razor optimization results from three different applications are presented here. By way of illustration, the three applications may include:

American Airline's web site (http://www.aa.com): this site uses PrototypeJS JavaScript library, one of the popular Ajax toolkits;

Razor Optimizer: This illustrative embodiment of Razor Optimizer comprises a Dojo 1.1 based JavaScript application; and jQueryUI demo (http://ui.jquery.com/functional demos/): this may be an application based on the popular jQuery library.

Table 3 shows an embodiment of some basic information about these three applications:

TABLE 3

| Applications to be Optimized | | |
|---|---|---|
| | Ajax toolkit | Total JavaScript footprint (byte) |
| www.aa.com | Prototype JS | 294,124 |
| Razor Optimizer | Dojo Toolkit | 1,158,664 |
| jQuery UI Demo | jQuery | 151,151 |

Table 4 shows one embodiment of optimization results for these three applications. Razor achieved 67%, 75% and 62% savings for these applications respectively.

TABLE 4

| Razor Optimization Results | | | |
|---|---|---|---|
| | Original (byte) | Razor (byte) | Savings |
| www.aa.com | 294,124 | 96,735 | 67% |
| Razor Optimizer | 1,158,664 | 292,203 | 75% |
| jQuery UI Demo | 151,151 | 56,904 | 62% |

In comparison, Razor can deliver significantly better results than other JavaScript optimization techniques. Using ShrinkSafe to optimize these three applications, the results would be 189 KB, 568 KB, and 86 KB respectively (See Table 5). Razor may further cut down these numbers by half. FIG. 2O depicts one embodiment of a comparison between JavaScript optimization results.

TABLE 5

| Optimization Results Using Dojo ShrinkSafe | | | |
|---|---|---|---|
| | Original | ShrinkSafe | Savings |
| www.aa.com | 294,124 | 189,618 | 36% |
| Razor Optimizer | 1,158,664 | 598,511 | 48% |
| jQuery UI Demo | 151,151 | 86,173 | 43% |

In general, Razor may be able to reduce application footprint by 60% to 80%. In some embodiments, there can be at least three factors determining page performance: server processing time, network transfer time and front end processing time. As the web becomes more interactive and richer, front end processing time may become more and more important. In the web environment we have today:
 The server time for generating HTML content and network transfer time for such content are only small factors in page performance, typically only 5% to 20% of the page loading time.
 Front end processing time can be as high as 95% of page loading time.
 HTML is only a small portion of the footprint while JavaScript can be a significant portion of the footprint, sometimes as high as 80% to 90%;
 JavaScript code performance can be the major performance influencer.

To optimize web performance, a proper approach may be to optimize front-end performance first, which is where 80% or more of the end-user response time may be spent. For applications that use JavaScript, a bottleneck may be in JavaScript. Properly profiling and optimizing JavaScript code using the disclosed methods and systems can significantly improve performance. Other JavaScript optimization techniques may leverage merely on static lexical data. There is still significant room for improving these techniques, for example by leveraging on dynamic runtime information in accordance with the disclosed systems and methods. In certain embodiments, Razor takes advantage of both static lexical data as well as runtime profile data to achieve significant better optimization results than any other available techniques.

System Design

Figure 2P:
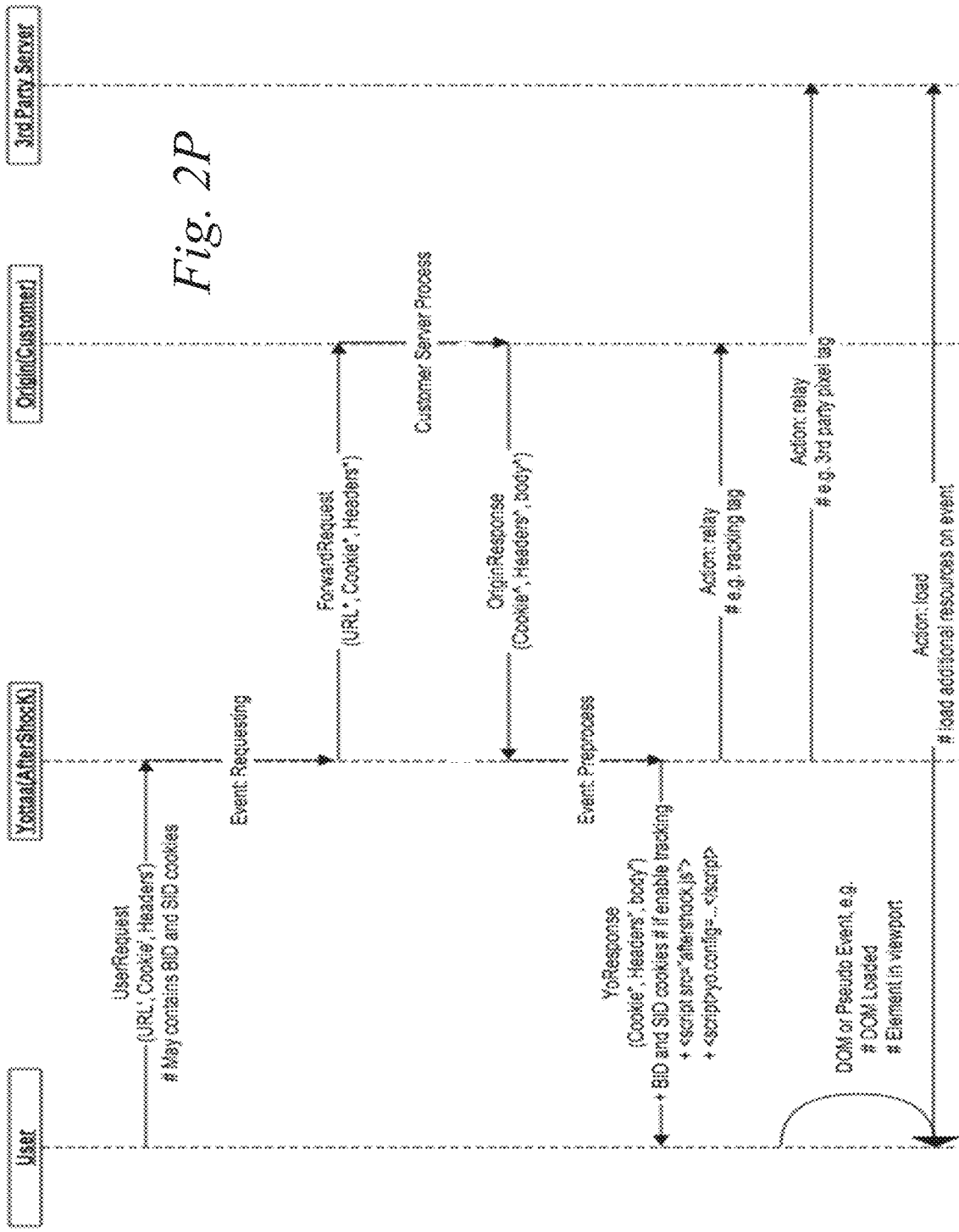
FIG. 2P depicts one embodiment of a method for application sequencing.

By way of illustration, the following describes aspects of a system design for some embodiments of the present systems and methods. FIG. 2P depicts one embodiment of a method for application sequencing. The method illustrates some system interactions between a user operating a client, an intermediary (Yottaa/AfterShock), a server (origin server or customer) and a third-party server. The system design may include a prototype software stack, which may comprise:
 Node.js (e.g., v0.10)
 Libraries
  connect
  request
  jsdom # Server side DOM and browser simulation, for easy manipulation and/or fast prototyping System Components Embodiments of the system for application sequencing may comprise an event driven system. In the lifetime of a request/response transaction, the system may emit a plurality of events. An event which the system have been listening to may trigger one or more actions. An action (e.g., post-trigger action) may comprise a fundamental operational unit. A number of optimization and transformation processes may be coded in action.

An event may be initiated or fired during transition in the system either from the server or client side. From the interaction diagram as shown in FIG. 2P for example, and in some embodiments, there may be two important events in the server side. These may include a) Requesting (e.g., UserRequest), which may happen when a user initiates a request, and b) Preprocess (e.g., Event Preprocess), which can occur after receiving a response from the original server. A Requesting event can provide an opportunity (or trigger) for actions to manipulate and/or send a request that may be sent to the original server. A Requesting event can trigger an action to use cookies for monitoring, and/or relay HTTP requests in the cloud. On the other hand, a Preprocess event may trigger or allow actions to transform a response body from the server before sending it to the user. Actions operating responsive to this event may cut/remove or rewrite HTML elements so that they may be delay loaded in the user's browser.

At the client side, in some embodiments, triggers or events may often times be HTML DOM events, such as readystatechange, DOMContentLoaded, Click, etc. There may also be events that are synthetic, from DOM events or client side script states. For example, a begin event can trigger actions (sometimes referred to as "post-trigger actions") when the client side application sequencing script is ready. A viewable event can trigger when a monitored element comes within a viewport. For example, the interaction sequencer may listen to a scroll and/or a window-size change DOM event, as a trigger to initiate a post-trigger action.

Actions may be configured to have a similar programming environment at both the client side and the server side. An action may use DOM and its API to manipulate content. There may be no single entry point like the main function in the system, and actions may have to register to events. If preprocess of the body of a server's response is required, an action may have to listen to a server side Preprocess event. Similarly, some actions may have to listen to client events in order to be executed at the client side.

Because actions can run in a serial fashion responsive to discrete events, the system can provide a context for certain actions to save or store states during different events. The context can work across a client/server boundary. A context store may have to be carefully designed, since the store may be transferred to the client side (e.g., if the action listens to at least one client side event). A context store that is too large may significantly impact client side performance.

In some embodiments of the present systems, there may be two types of configuration, a server-side configuration and a client side configuration. To configure the system, changes may be made to the server-side configuration. The client-side configuration may be generated or updated for each page after being processed by the server. Manually typing a client-side configuration in a page may be helpful for debugging purpose, and valuable if the server-side implementation changes. By way of illustration, one embodiment of a server-side configuration is depicted as follows:

```
var yo_config = {
  rules: [
    {act:"tracking"},
    {act:"load", selector:"#clickimg", on:{evt:"click",
selector:"#allsizes-photo"}, processed:true},
    {act:"load", selector:"img", on:{evt:"viewable"}},
    {act:"load", selector:"iframe", on:{evt:"viewable"}},
    // {act:"load", selector:"#testimg", fadein:false},
    {act:"pauseXHR", on:{evt:"begin"}},
    {act:"resumeXHR", on:{evt:"complete"}}
  ],
  proxy_host: "http://localhost:8080/"
  // proxy_host:"http://www.vwvortex.com/"
};
```

This configuration may, in certain embodiments, comprise a JavaScript file that has an object named yo_config. The rules property of the configuration may hold a list of actions. Every action, during execution, can obtain its configured rule via a pass-in context object. By default, all actions may listen for a preprocess event.

By way of illustration, one embodiment of a Client-side configuration is depicted as follows:

```
yo.client_config=
{"events":[
  {"evt":"click","selector":"#allsizes-
photo","refs":[1],"actids":[0],"evtid":0,"emid":0},
  {"evt":"viewable","refs":[2,3,4,5,6],"actids":[1],"evtid":
1,"emid":1},
  {"evt":"viewable","refs":[ ],"actids":[2],"evtid":2,"emid":
2},
  {"evt":"begin","actids":[3],"evtid":3,"emid":3},
  {"evt":"complete","actids":[4],"evtid":4,"emid":4}],
"actions":{
  "0":{"act":"load","selector":"#clickimg","processed":true,
"store":{"refs":[0]},"actid":0},
  "1":{"act":"load","selector":"img","store":{ },"actid":1},
  "2":{"act":"load","selector":"iframe","store":{ },"actid":2
},
  "3":{"act":"pauseXHR","store":{ },"actid":3},
  "4":{"act":"resumeXHR","store":{ },"actid":4}},
"elements":[
  {"src":"http://farm8.staticflickr.com/7341/9300157912_f47d
f0a759_b.jpg"},
  { },
  {"src":"http://farm9.staticflickr.com/8550/9029806996_04be
fa585d_b.jpg"},
  {"src":"https://pbs.twimg.com/media/A7EiDWcCYAAZT1D.jpg"},
  {"src":"http://www.ccs.neu.edu/home/liang/img/header.jpg"},
  {"src":"http://imgs.xkcd.com/comics/ice_sheets.png"},
  {"src":"http://imgs.xkcd.com/comics/council_of_300.png"}]}
```

In certain embodiments, a client side configuration may be generated after a server-side preprocess event. The client side configuration may be designed for context storage across a client/server boundary, and may be used to provide settings for client side events. As shown in the example, there may be three properties in a client-side configuration. These may include events to convey to the client script (e.g., interaction sequencer) registering events, actions, which can be invoked when event fired, and elements, which may be used to store processed element information. The configuration may be bounded to yo.client_config that is at the global scope accessible by some or every script in the page. All actions, events and elements may use an unique id for referencing (e.g., within a configuration).

Element Store:

In certain embodiments of the system, server side actions may modify the page before it is passed to the client's browser. During this process, all elements that have one or more to-do-client-side actions may be marked by an identifier. For example, when processed by a load action, an image element may become <img data-yo-ref='0'>. A client side load action may use the reference identifier to find its source (src) attribute in the element store. This feature may allow flexible design in both the server and client side. Actions can save as much data as may be needed for referenced elements. This reference scheme may also help improve client side performance, because the client side system can continue to track a referenced element after a ready event. Thus, there may not be a need use functions like document.querySelectorAll, to select element(s).

Cookie Management:

In some embodiments, cookie management mainly involves resource processing in the cloud, such as handling a pixel tag or sending requests. In some embodiments of the system, there may be two kinds of cookies, a managed cookie and a third party cookie. A managed cookie may include a cookie from a customer (e.g., server). As the name suggests, a customer's traffic may be managed by the system, hence the system may manage such cookies from the customer. On the contrary, a third party cookie may be transparent to the system. Browsers and third party sites can keep these third party cookies. The system can follow the same protocols of handling a third party cookie in a latest version of the Firefox browser, in that it may not send and update a cookie for third party sites, also known as "Block third-party cookies and site data" in Chrome.

For cloud relaying purposes, some embodiments of the system may introduce two cookies to track a user browser and maintain a similar semantic as today's browsers. The first cookie may be referred to as BID. BID may comprise an identifier of user's browser. Its expiration time may be one year (e.g., to save tracking database size, a small number may be deployed) and can update every time the browser visits a managed site (a customer site, e.g. www.PCM.com). The second cookie may comprise a session cookie (e.g., no expires property), SID. SID may be related to BID in that SID may (only) serve as a signal of browser session restart. When the system detects that a user has restarted the browser, all session cookies from managed sites may be trashed. The BID and SID may not be forwarded to the managed site.

Certain embodiments of the system may include an action sometimes referred to as tracking that implements this idea. When the tracking action is enabled, it can maintain BID and SID cookies, and may add isNewBrowser and isNewSession, two boolean flags to the processing context, so that actions executed after tracking may know or have access to a status of the current session, and can save data to the session or browser store, just like in a browser but on the server side.

In some embodiments, the system may provide logging for client-side events. The system's client side script can monitor many events. These events may provide valuable information regarding users' behaviors. Logging for client-side events is a tool for this purpose. This logging subsystem may operate by monitoring a customer's events of interest, such as when a button is clicked, a div (e.g., a HTML division or section) gets focused, etc. Then the subsystem may send tracking behavior back to the system (e.g., periodically). The system may provide an analysis of logs for a customer to understand their users' client side activities.

Figure 2Q:
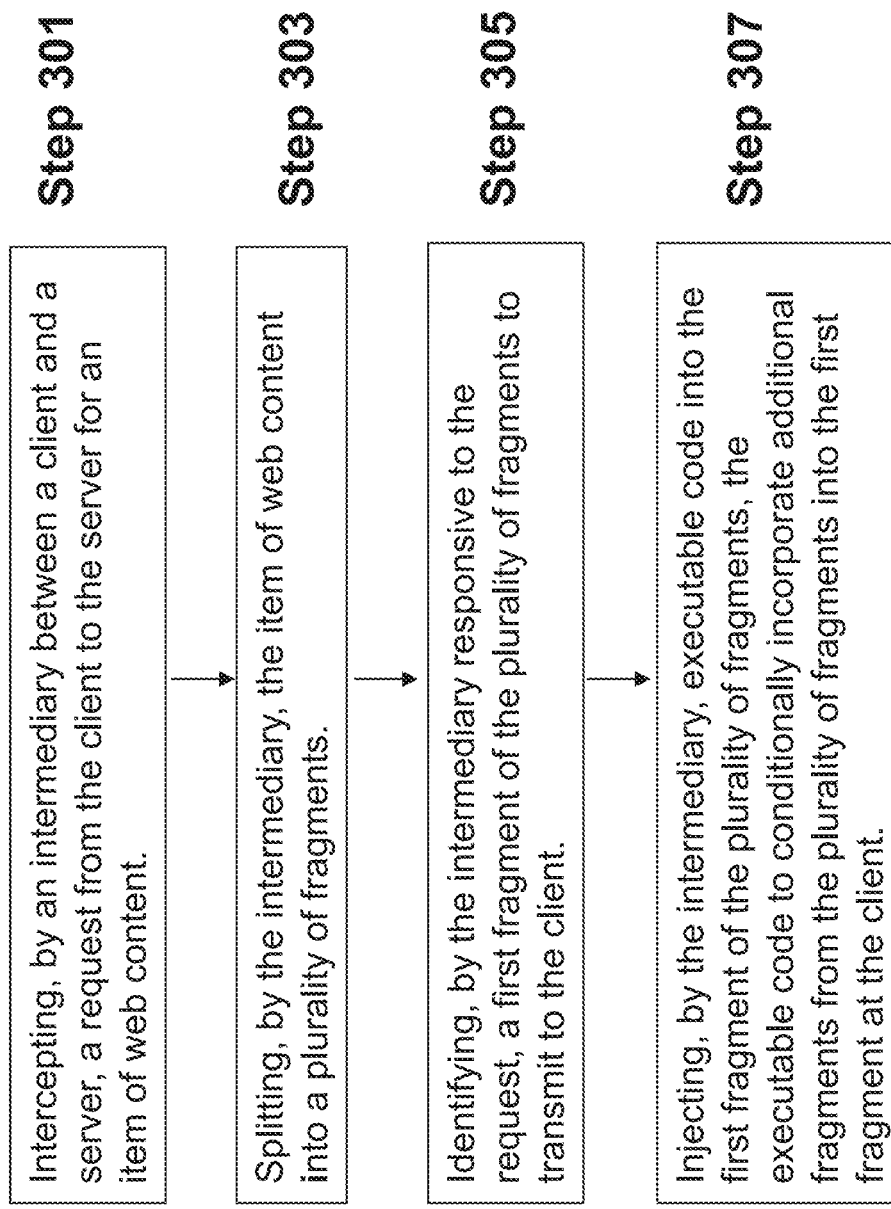
FIG. 2Q depicts one embodiment of a method for delivering an item of web content requested by a client.

Referring now to FIG. 2Q, one embodiment of a method for delivering an item of web content requested by a client, is depicted. The method may sometimes be referred to as delivery sequencing. The method may be part of a method for managing delivery and rendering of an item of web content. One or more steps may be performed by a delivery sequencer. In brief overview, the method may include intercepting, by an intermediary between a client and a server, a request from the client to the server for an item of web content (301). The intermediary may split the item of web content into a plurality of fragments (303). The intermediary may identify, responsive to the request, a first fragment of the plurality of fragments to transmit to the client (305). The intermediary may inject executable code into the first fragment of the plurality of fragments (307). The executable code may conditionally incorporate additional fragments from the plurality of fragments into the first fragment at the client.

In further details of (301), and in some embodiments, an intermediary between a client and a server may intercept or receive a request from the client to the server for an item of web content. The client may send a request to the server for an item of web content. The intermediary may receive or intercept the request as described above in connection with at least FIG. 2I. The intermediary may parse or otherwise process the request to determine information about the request, for example the type of request (e.g., the type of item or web content requested). The intermediary may determine, based on the request, that the item of web content includes one of: an HTML or web page, an image, a cascading style sheet (CSS), a script file, a video object, an audio object, and a flash file or small web format (SWF) file. For example, the intermediary may determine that the item of web content includes an image file such as a JPEG, TIFF, GIF or BMP file. As another example, the intermediary may determine that the item of web content includes a script file or script segment comprising JavaScript code, EMCAscript code, ActionScript code, visual basic code, a plug-in implemented in a language such as C, C++, code referencing a browser plug-in, or code referencing a native module. In some embodiments, the item of web content may correspond to one or more types of HTML elements or groups, such as <img>, <video>, <object>, <div>, <script>, <table>, <stylesheet>, <iframe>, <p>, etc.

In some embodiments, the intermediary, via a TPS for example, intercepts the request for the item of web content. The item of web content may include dynamic or personalized information to be generated by the server. The dynamic or personalized information may be generated based on a context of a communication session between the client and the server. For example, the dynamic or personalized information may be determined and/or generated based on an identity of a user operating the client, a browser of the client, a device type of the client, a time and/or date of the request, a geographical location of the client, and/or a type of browser for accessing the web content. By way of illustration, the dynamic or personalized information may include information for identifying or greeting the user on a corresponding web page, shopping cart information for the user, and advertising targeting specific users. The dynamic or personalized information may include various embodiments of dynamic information described above in connection with at least FIGS. 2A, 2B and 2I.

In certain embodiments, the intermediary may send, transmit, convey or forward the request to the server. The intermediary may send the request to the server as described above in connection with at least FIGS. 2A, 2B, 2C and 2I. In some embodiments, the intermediary may modify or otherwise process the request before sending the modified/processed request to the server. For example, the intermediary may modify the source address of the request, e.g., so that the server may send a response to a destination identified by the modified source address. The intermediary may send or transmit the request to the server during or before any one or more of (303)-(307). For example, the intermediary may transmit the request to the server before or in parallel with sending a fragment of the requested item of web content to the client. In other embodiments, the intermediary may transmit the request to the server after sending a fragment of the requested item of web content to the client.

In further details of (303), and in some embodiments, the intermediary may split the item of web content into a plurality of fragments. The intermediary may define or identify a plurality of fragments of the item of web content. The intermediary may split and/or define the item of web content into a plurality of fragments before receiving the item of web content from the server. The intermediary may split and/or define the item of web content into a plurality of fragments for delivery to the client over a plurality of transmissions. The splitting may include the intermediary defining and/or identifying a fragment (e.g., a first fragment) of the item of web content. Splitting may comprise separating or partitioning the item of web content into a plurality of fragments (e.g., that may be combined or integrated together at a client to substantially include most or all features of the requested item of content). Splitting may comprise a preliminary identification of a plurality of fragments, e.g., prior to receiving and/or processing the requested item from the server. This preliminary identification may be based on prior and/or updated knowledge of one or more of: the server, a web page served previously by the server, information in the request, and information associated with the client, browser and/or user, for example. Splitting may comprise identifying portions of the requested item expected or predicted to be of certain/different types. Splitting may comprise ranking, predicting and/or identifying portions of the requested item based on priority or a configuration, e.g., based on an expected or likely order in which a user may want to access some or all of these portions.

Splitting may comprise a separation or partitioning of one or more prior copies of the requested item, based on an evaluation of the one or more prior copies of the requested item. The splitting and/or evaluation may be based on a configuration, e.g., associated with the intermediary, server, user, client and/or item of web content. As part of the splitting process or step for example, the intermediary may define and/or identify a fragment of the item of web content in accordance with any embodiment of the steps discussed above in connection with at least FIGS. 2B and 2I. The intermediary may define and/or identify a fragment of the item of web content based on a portion or segment of the requested item of web content. The fragment may comprise a standalone HTML message, for example. The fragment may be part of a MIME multipart message.

In some embodiments, the intermediary may define or identify a fragment based on a dynamic or static nature of the fragment, for example as discussed above in connection with at least FIGS. 2B and 2I. The intermediary may split the item of web content into the plurality of fragments based on a version of the item of web content cached by or at the intermediary. The intermediary may split the item of web content into the plurality of fragments based on an unexpired and/or valid version of the item of web content or its fragments (e.g., stored in a cache). The intermediary may define or identify a fragment of the plurality of fragments based on a version of at least a portion of the item of web content stored or cached at the intermediary. For example, the intermediary may define or identify a portion of the requested item as a fragment that includes static data, based on a cached copy of the fragment from a prior version of the requested item. The intermediary may define or identify a portion of the requested item as a fragment that includes dynamic data, for example based on an absence or expiration of a corresponding fragment from a prior version of the requested item in the cache. The intermediary may define or identify a portion of the requested item as a fragment based on a time-to-live (TTL) of the portion, for example a TTL inferred or assumed from a copy of the portion stored in cache for example. In certain embodiments, the intermediary may define or identify a fragment based on a configuration, for example, from the embodiments of configurations and/or settings as described above.

The intermediary may define or identify a fragment based on information about one or more prior versions of the item of web content processed by the intermediary. For example, a TPU of the intermediary may split, partition or segment a prior version/copy of the requested item into the plurality of fragments. The intermediary may define or identify a plurality of fragments based on identified fragments of a prior copy/version of the requested item. The intermediary may define or identify a fragment based on information about one or more prior versions of the item of web content received from the server. The intermediary may define or identify a fragment based on information about one or more items of web content processed by the intermediary, the one or more items of web content having aspects or characteristics (e.g., web page structure) similar to the requested item of web content.

In certain embodiments, the intermediary may define or identify a fragment of the plurality of fragments based on a response from the server to the request. For example, the intermediary may split the item of web content into a plurality of fragments based on one or more dynamic portions of the requested item returned by the server. In some embodiments, the intermediary may split the item of web content into a plurality of fragments based on a response from the server to the request. For example, the intermediary may partially split the item of web content into one or more fragments based on cached data, and may split the rest of the item of web content into one or more fragments based on a response from the server to the request. In certain embodiments or scenarios, the intermediary may wait for a response from the server to the request, to split response, comprising the item of web content, into a plurality of fragments.

In some embodiments, the intermediary modifies a default rendering characteristic derived from the server for each of the plurality of fragments. Each of the modified rendering characteristic may include an action and a trigger based on detecting one of: a user event, a timer event and a document object model event, that involves a display or use of a corresponding fragment.

In further details of (305), and in some embodiments, the intermediary may identify, responsive to the request, a first fragment of the plurality of fragments to transmit to the client. The intermediary may identify a fragment from the plurality of fragments to transmit to the client. The intermediary may identify the fragment from a cache, e.g., of the intermediary. The intermediary may determine, responsive to the request, to transmit, send or deliver some or all of the plurality of fragments to the client over a plurality of transmissions (e.g., possible transmissions). Some of the transmissions may not occur, or some of the fragments may not be sent to the client, for example, because a triggering event may not occur (e.g., the user may not scroll to or view one or more fragments).

The intermediary may determine to transmit some of the plurality of fragments to the client, for example, conditionally or as needed at the client. In some embodiments, the intermediary may deliver one or more fragments in a transmission to the client. The number of possible transmissions in the plurality of transmissions may be different from, or the same as the number of fragments in the plurality of fragments. The intermediary may deliver a different number of fragments between two transmissions to the client. The intermediary may determine an order of transmission for the plurality of transmissions. The intermediary may determine an order of transmission for the plurality of transmissions based on the dynamic and/or static nature of data in the plurality of fragments.

In some embodiments, the intermediary may determine an order or priority of transmission for the plurality of transmissions based on at least one of: a network condition, dependencies between related fragments, size of a fragment, importance of a fragment, availability of a fragment, and visibility of a fragment (e.g., in a viewport of the client or browser). For example, transmission of a smaller fragment may be preferred if a larger fragment may be inappropriate due to network congestion or bottleneck. Some related fragments may be transmitted within the same transmission, or between proximate transmissions, for example to ensure that related content or web-application functionality across fragments are readily available at the client. In certain embodiments, important, required or preferred fragments (e.g., headline news or alerts) are delivered first to the client. A fragment that is available (or expected to be available) earlier relative to another may be scheduled or prioritized for earlier delivery. In certain embodiments, a fragment with content that is expected to be visible to the user (e.g., within an initial viewport of a browser or device), may be delivered to the client before another fragment. The intermediary may identify a fragment (e.g., a first fragment) of the plurality of fragments to deliver immediately to the client, based on any of one or more of the factors discussed above.

The intermediary may determine the order of transmission for the plurality of fragments, but not all of the plurality of fragments may be eventually transmitted and/or needed. The intermediary may control the order of transmission for the plurality of fragments, by generating a first fragment and specifying a sequence or order for the remaining plurality of fragments/transmissions in the first fragments. The intermediary may specify a sequence or order for the remaining fragments/transmissions, for example using unique identifiers or markers for the remaining plurality of fragments in the first fragment. The intermediary may arrange the unique identifiers or markers according to the desired order or sequence of the remaining plurality of fragments/transmissions. The intermediary may control the order for the plurality of fragments/transmissions based on any of the factors discussed above. The intermediary may control the order for the plurality of fragments/transmissions based on a configuration for the requested item of web content, which may be user-specified. In some embodiments, some of the plurality of fragments are identified based on a prediction or expectation by the intermediary, and may not be eventually realized (e.g., based on the actual response from the server to the request). As such, some of the unique identifiers or markers incorporated or injected into the first fragment may correspond to a non-existent or empty fragment, and may eventually be replaced by an empty object or ignored (e.g., by the intermediary and/or code executing at the client).

The intermediary may identify a fragment to deliver immediately to the client, for example, without waiting for a response from the server to the request. The intermediary may identify a fragment to deliver immediately to the client, before or while sending or forwarding the request to the server. The intermediary may deliver the first fragment from a cache. The intermediary may identify a fragment to deliver immediately to the client, comprising static data accessible to the intermediary (e.g., stored in a cache). The intermediary may identify a fragment to deliver immediately to the client, to include or incorporate a script or executable code for execution at the client and/or browser. The intermediary may identify a fragment to deliver immediately to the client, to be responsive to the request for the item of web content. The intermediary may identify a fragment to deliver immediately to the client, to enhance user experience in connection with the request for the item of web content.

The intermediary may generate or construct the (e.g., first) fragment based on a cached copy or version of the fragment or request item. The intermediary may form the first fragment based on a version of the first fragment cached by the intermediary. The intermediary may store the first fragment in a cache, e.g., for handling future requests of the item of web content. The intermediary may generate the fragment as a web message, e.g., a HTML, XML and/or XHTML message. The intermediary may assign a TTL to the fragment. The generated fragment may include a head or header section and/or a body section. The body section may include one or more divisions, sections or <div>'s. The fragment may include one or more elements or groups, such as <img>, <video>, <object>, <div>, <script>, <table>, <stylesheet>, <iframe>, etc. The intermediary may generate the fragment to include one or more references or unique identifiers or markers of additional fragments defined by the intermediary. Each reference or unique identifier or marker may be embedded in, or described by an annotation or statement in the fragment. The annotation or statement may include one of the following types of statements: <img>, <video>, <object>, <div>, <script>, <table>, <stylesheet>, <iframe>, etc. By way of illustration, one embodiment of a unique identifier or marker may include the following HTML statement: <div id="div2" yopath="mypage.html/#div2" . . . >.

In some embodiments, the intermediary performs at least one of the splitting (e.g., in 305) and the identification (e.g., in 303), based on a (e.g., user-defined) configuration of the item of web content. The intermediary may perform at least one of the splitting and the identification, based on a configuration of a web page or the item of web content. The configuration may comprise a default configuration or a default collection of settings. The configuration may be based on, or supplement a default and/or system-generated configuration. The configuration may be updated or further defined by a user, such as an administrator or a representative of the server. For example, the intermediary may provide a user interface (e.g., web interface) to a user, to allow the user to identify an element and/or specify if an element (e.g., <img>, <video>, etc.) may be static or dynamic. If an element is static, the user interface can enable the user to specify a TTL value for the element.

In some embodiments, the configuration may be updated by an analysis/learning engine of the intermediary. The intermediary may include an analysis/learning engine to identify or predict the nature and/or number of fragments, e.g., based on changes in the content of the requested item over time. The intermediary may identify fragments based on information provided by the server about content in the requested item, e.g., regarding the dynamic and/or static nature of portions of the requested items. The intermediary may determine or estimate a TTL for a fragment and/or an element of the fragment, based on a history of fragments processed and/or cached over time. In some embodiments, the history of fragments processed and/or cached over time may be based on test/simulated results and/or real data. The intermediary may generate, provide or recommend a configuration (e.g., to a user, for a certain web item/page/site) based on the analysis and/or learning performed by the intermediary on the server and/or versions of the item of web content.

In further details of (307), and in some embodiments, the intermediary may Inject executable code into the first fragment of the plurality of fragments. The executable code may be configured to conditionally incorporate additional fragments from the plurality of fragments into the first fragment at the client (e.g., based on one or more triggering events or triggers). The intermediary may inject, introduce or incorporate (hereafter generally referred to as "inject") executable code into a fragment (e.g., a first fragment) of the plurality of fragments. The intermediary may inject executable code into a first fragment delivered to the client and/or browser. The executable code may be injected by way of instructions and/or a script added to the fragments, or by adding a link, reference or locator to instructions and/or a script remotely accessible to the browser via the link, reference or locator (e.g., to a file or code segment). In some embodiments, the executable code may be injected into a head/header or a body of the fragment. For example, within a header section of the fragment, the executable code may be injected using a "<script src="/path/sequencer.js"./> statement or annotation. Additional code for performing other functions (e.g., for improving user experience, cookie handling, interaction sequencing, etc.) may be injected in the same way, at the same location and/or at different location(s) in the fragment and/or in additional fragment(s). In some embodiments, the injected code is configured to perform one or more other functions.

The present methods and systems may configure and/or use the executable code to control, manage, coordinate or direct the assembly, integration and/or reconstruction of the requested item (or a modified and/or optimized version of the requested item), for example from content conveyed via multiple fragments. The executable code may conditionally incorporate one or more additional fragments from the plurality of fragments into the fragment at the client. As such, certain fragments may not be requested and/or processed by the executable code (e.g., due to a lack of corresponding triggering events to trigger rendering actions). The executable code may conditionally incorporate the additional fragments during or upon executable/rendering by the browser at the client. The executable code may incorporate content from the additional fragments received in one or more subsequent transmissions, into the first fragment. For example, the executable code may incorporate content from one or more of the header and body of an additional fragment, into a header and/or body of the fragment.

The intermediary may inject the executable code, comprising code expressed in at least one of: ECMAScript language or a language similar or related to the ECMAScript language, ActionScript language, visual basic language and hypertext markup language. The executable code may include one or more of: JavaScript code, EMCAscript code, ActionScript code, visual basic code, a plug-in implemented in a language such as C, C++, code referencing a browser plug-in, or code referencing a native module. The executable code may include or be represented by a script, applet, program, instructions or software for installation and/or execution on hardware (e.g., a processor) of the client. The executable code may be accessed and/or executed prior to the browser processing a body or one or more divisions of the fragment. For example, the executable code may be initiated when the browser processes a header of the fragment, before the browser processes a body of the fragment. The body of the fragment may include one or more unique identifiers or markers for additional fragments. In some embodiments, the executable code may be initiated or rendered with other elements in the fragment, in the order the fragment is processed by the browser (e.g., starting from the first HTML line of the fragment). In certain embodiments, the executable code may be initiated or rendered prior to other elements in the fragment.

The executable code and/or browser may determine whether and/or a priority to deliver one or more of the additional fragments to the client based on at least one of: a network condition, dependencies between related fragments, size of a fragment, importance of a fragment, availability of a fragment, and visibility of a fragment. In some embodiments, the intermediary may Inject the executable code and a plurality of unique identifiers corresponding to the plurality of fragments. The executable code and/or browser may parse or search the contents of the fragment and/or body, to identify one or more unique identifiers or markers. The executable code and/or browser may initiate an action for rendering of a corresponding fragment if a corresponding trigger for the fragment (or corresponding unique identifier) is detected. The executable code and/or browser may determine to deliver one of the additional fragments to the client responsive to at least one of: a user event, a timer event and a document object model event, that involves a display or use of the corresponding fragment at the client.

For example and in some embodiments, the executable code and/or browser may identify, parse for, or search for one or more unique identifiers or markers within a region of the fragment (e.g., within a viewport). The executable code and/or browser may ignore (or not look for) one or more unique identifiers or markers outside of that region (e.g., beyond the viewport). During execution, the injected code may detect or identify a unique identifier or marker inserted by the intermediary into the fragment. The code may perform pattern recognition (e.g., regexp matching) to detect or identify the unique identifier or marker. For example, the code may look for a text string that includes "yopath" or another predefined pattern, alone or in conjunction with other identifying text string(s)/structure(s). The injected code may detect or identify a unique identifier or marker based on a configuration, e.g., provided via the intermediary. For example, the configuration may be delivered to the client with the fragment injected with the code, or the configuration may be remotely accessible at the intermediary.

In some embodiments, the injected executable code may generate a request at the client to the server for a second fragment from the plurality of fragments responsive to detecting an event. The detected event may correspond to a unique identifier of the second fragment. The detected event may include one of: a user event, a timer event and a document object model event, that involves a display or use of the second fragment. In certain embodiments, responsive to identifying a unique identifier or marker (e.g., in a body of the fragment) and/or detecting a corresponding triggering event, the code may generate and/or send a message/request (hereafter sometimes generally referred to as "message" and/or "request". The code and/or browser may send or transmit a request to the server based on the unique identifier or marker. The intermediary may intercept the request for the second fragment, and the intercepted request for the second fragment may be prevented from reaching the server. The request may be intercepted or received by the intermediary, for example similar to any of the steps described above in connection with (301). The request may be configured to be recognized and/or intercepted by the intermediary (e.g., TPU), even though the message/request may be directed to the server. Responsive to receiving or intercepting the request, the intermediary may generate and/or transmit a response to the request. The response may include a fragment (previously-defined by the intermediary and) identified by the unique identifier or marker. The fragment may have been generated prior to intercepting or receiving the request. The response/fragment may be generated based on a response received from the server and/or data from a cache accessible by the intermediary. For example, the intermediary may form the second fragment based on a version of the second fragment cached by the intermediary. In some embodiments, the intermediary may wait for the server's response, and may extract data for the fragment in response to the request. The intermediary may wait for a response from the server to the request for the item of web content, to generate the second fragment. In certain embodiments, the intermediary may generate a message based on the request, and may send the message to the server and/or another device (e.g., third-party server) for a resource to include in the fragment.

In some embodiments, the intermediary forms a second fragment of the plurality of fragments based on a response from the server to the request. The intermediary may receive a response from the server, e.g., in response to the request for the item of web object. The intermediary may form the second fragment for delivery to the client. The intermediary may send the second fragment to the client responsive to the request for the second fragment. The intermediary may send the second fragment to the client responsive to the message generated based on the unique identifier or marker. In some embodiments, the browser and/or the executable code receives and/or incorporates the second fragment into the first fragment. The browser and/or the executable code may determine that the second fragment corresponds to the unique identifier or marker. In some embodiments, the browser and/or the executable code may wait to receive the fragment corresponding to the unique identifier or marker, before processing another unique identifier or marker. In other embodiments, the browser and/or the executable code may process a plurality of unique identifiers or markers asynchronously, sequentially or in parallel, e.g., based on detection of the corresponding triggers, without waiting to receive the fragment corresponding to a first unique identifier or marker.

The browser and/or the executable code may incorporate or insert at least a portion of the second fragment (e.g., a body of the second fragment) at the location of the unique identifier or marker. The browser and/or the executable code may incorporate at least a portion of the second fragment into the first fragment to replace the unique identifier or marker. The executable code may conditionally send a plurality of messages corresponding to a plurality of unique identifiers or markers (e.g., in the order identified/triggered within the first fragment) to the server. The executable code may incorporate a plurality of fragments transmitted by the intermediary in response to the plurality of messages, into the first fragment.

In some embodiments, the intermediary may update a cache based on a response from the server to the request for the item of web content. The intermediary may form a second fragment of the plurality of fragments based on a response from the server to the request, to store in a cache. The intermediary may determine whether to store the second fragment based on a TTL value of the second fragment. The intermediary may determine whether to store the second fragment based on the nature of the content in the second fragment, for example, whether the content includes static or dynamic data. The intermediary may determine or decide to store the second fragment in the cache based on information from the server indicating that content for the second fragment is static and/or having a certain TTL value (e.g., a non-zero value).

Figure 2R:
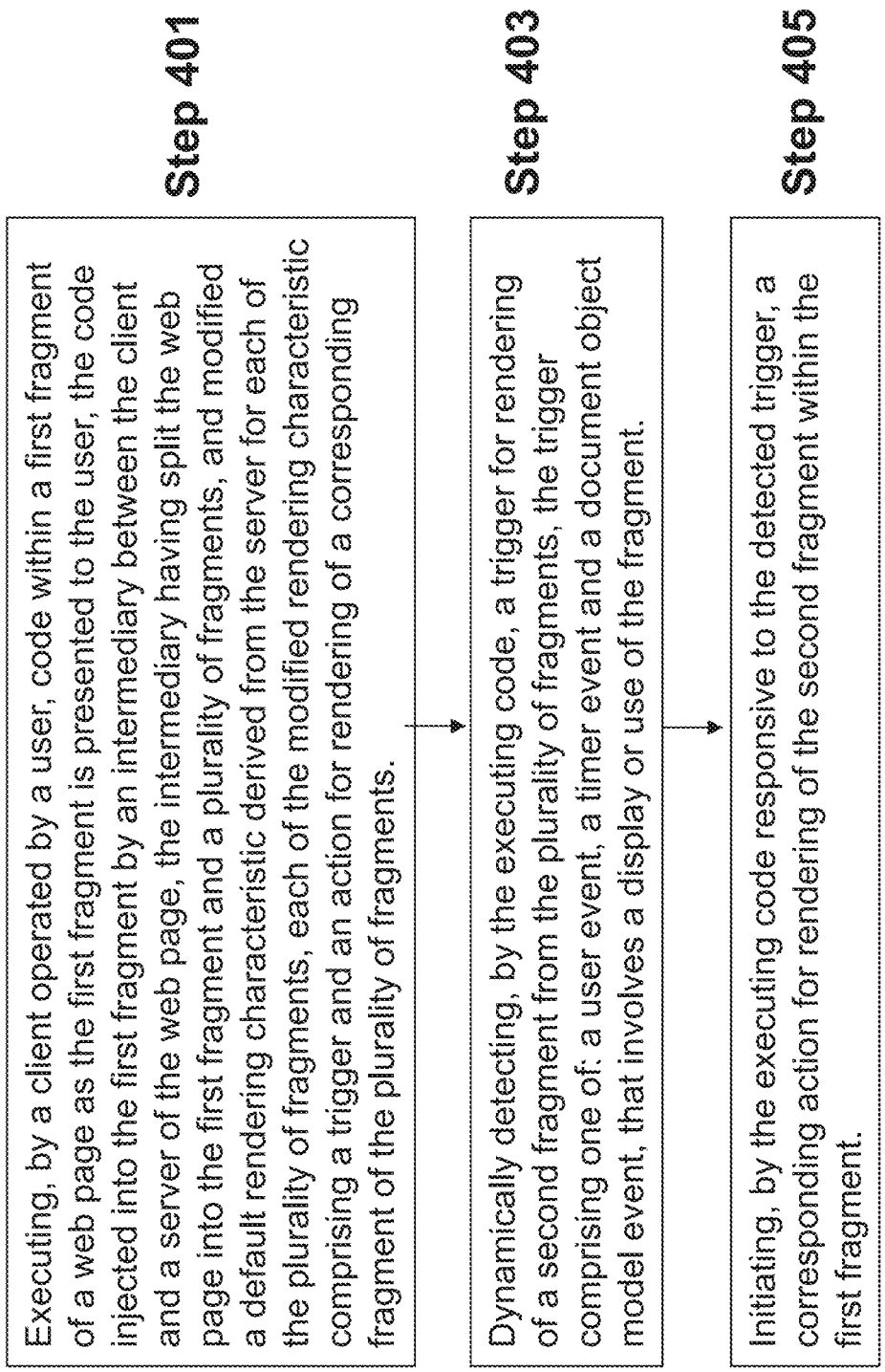
FIG. 2R depicts one embodiment of a method for managing rendering of a web page in a browser.

Referring now to FIG. 2R, one embodiment of a method for managing rendering of a web page in a browser is depicted. The method may sometimes be referred to as interaction sequencing. The method may be part of a method for managing delivery and rendering of an item of web content. One or more steps of the method may be performed by an interactive sequencer, a TPU and/or a delivery sequencer. The method may include executing, by a client operated by a user, code within a first fragment of a web page as the first fragment is presented to the user (401). The code may be injected into the first fragment by an intermediary between the client and a server of the web page. The intermediary may have split the web page into the first fragment and a plurality of fragments. The intermediary may have modified a default rendering characteristic derived from the server for each of the plurality of fragments. Each of the modified rendering characteristic may include a trigger and an action for rendering of a corresponding fragment of the plurality of fragments. The executing code may dynamically detect a trigger for rendering of a second fragment from the plurality of fragments (403). The trigger may include one of: a user event, a timer event and a document object model event, that involves a display or use of the second fragment. The executing code may initiate, responsive to the detected trigger, a corresponding action for rendering of the second fragment within the first fragment (405).

In further details of (401), and in some embodiments, a client operated by a user may execute code within a first fragment of a web page as the first fragment is presented to the user. The client may execute code within (a fragment of) the web page as the web page is partially presented to the user. In certain embodiments, one or more steps described in FIG. 2I and/or FIG. 2Q may precede (401). For example, the fragment(s) described in FIG. 2I and/or FIG. 2Q may be part of the present web page, or comprise the present web page. In some embodiments, the code described in FIG. 2I and/or FIG. 2Q may be part of the present code, or accompany the present code, or separate from the present code. For example, a single locator, link or reference in the web page (or a fragment of the web page) may provide access to code for performing steps in FIG. 2I, FIG. 2Q and/or FIG. 2R.

In some embodiments, the client sends or transmits a request to a server for the web page, for example as described above in connection with at least FIGS. 2I and 2Q. The request may be received or intercepted by an intermediary between the client and the server, for example as described above in connection with at least FIGS. 2I and 2Q. The client may receive from the intermediary a fragment (e.g., a first fragment) from a plurality of fragments, the fragment incorporating the code. The code may be incorporated into the web page by the intermediary between the client and the server. The intermediary may comprise any embodiments and/or features of the intermediaries described above in connection with at least FIGS. 2A-2C, 2I, 2J, 2N, 2P and 2Q. The intermediary may define a plurality of fragments for the web page, for example, as described above in connection with at least FIGS. 2I and 2Q.

In some embodiments, a browser or application of the client may execute the code. The code may be executed as portions of the web page or fragment (e.g., that includes the code) are rendered by the browser or application. In some embodiments, the code may be executed before other portions of the web page or fragment are rendered or loaded. The code may include one or more of: javascript code, actionscript code, hypertext markup code, visual basic code, a plug-in implemented in a language such as C, C++, code referencing a browser plug-in, or code referencing a native module. A browser or application of the client may execute the code, the code comprising at least one of: code expressed in ECMAScript language or a language similar or related to the ECMAScript language, code expressed in ActionScript language, code expressed in hypertext markup language, code expressed in visual basic language, a plug-in, code referencing a browser plug-in, and code referencing a native module. The executable code may include or be represented by a script, applet, program, instructions or software for installation and/or execution on hardware (e.g., a processor) of the client. The code may include any embodiment and/or feature of the executable code described above in connection with at least FIG. 2Q. The code may sometimes be referred to as an interaction sequencer.

In some embodiments, the intermediary may modify a default rendering characteristic or behavior derived from the server, for each of the plurality of fragments. A default rendering characteristic may specify that elements in a web page or fragment are to be rendered in the order/sequence presented in the web page or fragment. The order/sequence presented in the web page or fragment may be based on sequential processing of lines of HTML written for the web page or fragment. For example, for HTML, rendering may start from the top of the page and proceed to the bottom of the page, until the entire page is rendered. In some embodiments, specific elements or groups of elements may have a default rendering characteristic or attribute, as configured by the server. For example, certain images may be configured for lazy loading, and asynchronous loading of particular javascripts may be enabled by the server. In certain embodiments, an element, or a group of elements, may adopt or inherit a default rendering characteristic from a parent element or the web page generated by the server.

Instead of following a normal standard rendering sequence or a default rendering characteristic, interaction sequencing based on the present systems and methods may manage or control the rendering sequence, priority and/or characteristic of various components. Interaction sequencing based on the present systems and methods may also limit delivery and/or rendering to those elements that are needed. For example, important, required and/or available components may be processed/rendered immediately while the others may be deferred or processed as needed. In some embodiments, rendering of certain components are sequenced and/or deferred for efficient use of network bandwidth and efficient processing (e.g., by the client). For example, sequencing and/or deferral of certain components or fragments may be based on any of the factors described above in connection with FIG. 2Q.

In some embodiments, the intermediary may modify the default rendering characteristic of some or all fragments of the plurality of fragments. For instance, the intermediary may modify the HTML associated with a fragment. The intermediary may modify or hide an attribute pertaining to a rendering characteristic of a fragment, from the browser or rendering application. In certain embodiments, the intermediary may modify the default rendering characteristic, or replace the default rendering characteristic with a modified rendering characteristic. The client may receive the plurality of fragments from the intermediary. Each of the plurality of fragments may have a rendering characteristic modified by the intermediary based on a configuration. The configuration may include a default configuration, a user-defined configuration and/or a system-generated configuration that may be dynamically-updated. The configuration may be defined and/or maintained for a website or web page. The configuration may be accessed via the intermediary, accessed remotely by the code, or be delivered/injected with the code to the client. The configuration may include any of the embodiments and/or features of configurations and/or settings described above in connection with at least FIGS. 2I and 2Q. Each of the modified rendering characteristic may include a pre-trigger action, a trigger and/or an action for rendering of a corresponding fragment of the plurality of fragments. For example, in some embodiments, there may not be a pre-trigger action associated with a fragment, while in certain embodiments, a modified rendering characteristic may only include a default or pre-trigger action, e.g., that operates independently of any trigger.

In some embodiments, the executing code may perform a pre-trigger action for the second fragment prior to detecting a trigger for the second fragment. By way of illustration, and in some embodiments, a pre-trigger action may include one or more of the following: withholding rendering of the fragment, displaying nothing at an identified location of the web page, and displaying at least one item. The at least one item may include at least one of: an indicator or message indicating that an item is loading, a temporary or placeholder item or image, an advertisement, and a special call-to-action item. For example, withholding rendering of the fragment may or may not include withholding request and/or download of the fragment to the client. Withholding rendering of the fragment may include taking no action to initiate rendering of the fragment, e.g., not requesting and/or acquiring a resource for the fragment. Displaying nothing at an identified location may include leaving a blank or empty area or section at the location, not adding any items or images to a background component at that location, or not modifying the background component. Displaying nothing at an identified location may include not occupying web page space at that location (e.g., with any placeholder or empty space/section). Displaying at least one item may include displaying or rendering a temporary item at a specific location in the web page. Displaying at least one item may include displaying or rendering an item which may incorporate animation (e.g., a series of images). Displaying at least one item may include displaying or rendering an item which may eventually be layered over by, or replaced by, content from a corresponding fragment. Displaying at least one item may include displaying or rendering an item to the user, such as an advertisement, an invitation (e.g., a call-to-action widget), and a visual indicator (e.g., that the fragment or a resource is loading or currently unavailable).

The code may implement or initiate a corresponding pre-trigger action for the fragment prior to detecting the trigger. The code may implement or initiate a corresponding pre-trigger action responsive to, or as part of the loading of the web page in the browser or application. The code may implement or initiate a corresponding pre-trigger action to improve user experience for the page load (e.g., providing a loading status or placeholder information). The code may implement or initiate a corresponding pre-trigger action for the fragment any time before detecting the trigger. If a pre-trigger action for a fragment has not been initiated or implemented by the time a corresponding trigger is detected, the code may skip or withhold initiation of the pre-trigger action. In some embodiments, a pre-trigger action is configured to be initiated independent of any detected trigger for the same fragment. A pre-trigger action may be configured to be initiated as soon as the web page is loaded onto the browser for display to the user. The pre-trigger action may include or provide a reference to one or more of: code or instructions to perform the pre-trigger action, and item(s) to display and/or to pre-fetch as part of the action.

In further details of (403), and in some embodiments, the executing code may dynamically detect a trigger for rendering of a fragment of a fragment of the plurality of fragments (e.g., a second fragment from the plurality of fragments). The code may be configured to detect a predetermined set of events and/or set of event types during runtime (e.g., for the duration in which the web page is presented to the user). The code may be configured to detect triggers based on system calls, interrupts and/or other types of messages generated in the client or received by the client. A trigger may include one or a combination (e.g., temporal combination) of: a user event, a timer event and/or a document object model event, which involves a display or use of the fragment (e.g., second fragment). The code may be configured to detect multiple triggers that may occur simultaneously or in close succession to one another. The code may be configured to detect each trigger and to associate or link the trigger to a corresponding post-trigger action of a fragment. The code may include event listeners, e.g., DOM event listeners. In some embodiments, a trigger may be associated or linked to a plurality of post-trigger actions and/or fragments. In some embodiments, the code detects a user or user-initiated event comprising one of: a click event, a tap event, a touch event, a mouse-over event and a scroll event on the web page, as examples.

The code may detect that a viewing/viewable region or viewport (hereafter sometimes generally referred to as "viewing region") of the client and/or browser corresponds to a portion of the web page involving a display or use of the fragment of the web page. The viewing region at a particular instance of time may include a region or portion of a web page that the client and/or browser can display or present to the user at that instance. The viewing region may be limited by the size of the client/browser display, zoom and/or font size settings, etc., in relation to the web page. For example, when a web page is rendered for presentation to a user, the browser or client may initially display a fraction of the length and/or area of the web page within borders of the browser and/or a display screen of the client. Upon scrolling, adjustment of the browser's display area, and/or moving the browser beyond a border of the display screen, the viewing region may change. In response to a scrolling and/or zoom action, the portion of the web page viewable in the viewing region may change. Accordingly, a trigger may result from the change.

The code may define or determine a size and/or shape of a viewing region (e.g., relative to a web page) based on a device profile of the client, and/or information about the browser (e.g., display dimensions and location relative to the screen). In some embodiments, the code detects that a viewing region of the client corresponds to, or includes a portion of the web page that includes a reference or unique identifier or marker corresponding to the fragment. Based on the detection, the code may for example send a message to the server (or intermediary) requesting for the fragment. The code may be configured to track the viewing/viewable region or viewport, for example, determine or detect momentum associated with a scrolling or zoom action. The code may perform predictive analysis for the viewing/viewable region or viewport, for example to anticipate or identify a time at which a display or use of a certain fragment should be triggered or initiated. Based on the tracking and/or predictive analysis, the code may perform in-time or just-in-time triggering of a corresponding post-trigger action.

In some embodiments, the code may detect a timer event. For example, a delay or time period may be configured from another event (e.g., a user or DOM event), to initiate a post-trigger action. In some cases, the delay or time period may be configured from the time the web page begins to load on the browser or client, or from the time of the request for the web page. The delay or time period may be configured from a time instance an action (e.g., pre-trigger action) is initiated or completed. The code may be configured to include timer functionality or a timer module to track, determine and/or manage timer events.

In some embodiments, the code may detect a DOM event, sometimes referred to as a HTML or W3C event. DOM events may be defined or identified by an event model used by a web browser. An illustrative event model is that standardized by the W3C in DOM Level 2. Some common W3C events may include mouse events, keyboard events, HTML frame/object events, HTML form events, user interface events, and mutation events (e.g., notification of a change to structure of a page or document). A DOM event may include touch events for touch-enable devices (e.g., touchstart, touchmove, touchleave, etc.). A DOM event may include pointer events for various types of input devices such as a mouse, touch panel and touch pen. Pointer events may include event types such as pointerdown, pointerup, etc. A DOM event may include clipboard events, data binding events, XUL events, and DOM content loading events.

In further details of (405), and in some embodiments, the executing code may initiate, responsive to the detected trigger, a corresponding action for rendering of the second fragment within the first fragment. The executing code may initiate a corresponding post-trigger action for rendering of the fragment in the web page partially delivered to the client. The action may be performed at least in part by the executing code and/or the browser (or rendering application). For example, the action may be performed in part by the code, and in part by the browser. The action may include rendering a fragment comprising one or more of at least a portion of: an image, a cascading style sheet (CSS), a script, a video object, an audio object, a flash file or small web format (SWF) file, and a HTML file.

The executing code may initiate one or more "post-trigger" actions. The executing code may initiate an action based on, or responsive to the detected trigger. An action may be configured to be initiated as soon as a corresponding trigger is detected. The action may include or provide a reference to one or more of: code or instructions to perform the action, and item(s) to load, display, render and/or pre-fetch as part of the action. In some embodiments, an action may include undoing as aspect of a corresponding pre-trigger action. For example, the action may remove a temporary ad or indicator displayed by the pre-trigger action. The code may initiate the action, the action comprising replacing one or more items displayed prior to the action, with the rendering of the fragment (e.g., second fragment).

In some embodiments, the code may initiate the action, the action comprising rendering the corresponding fragment immediately or as soon as the fragment is available for rendering. For example, the browser and/or code may perform one or more of the following: generating and/or sending a request for the fragment, downloading resources for rendering of the fragment, receiving the fragment (e.g., from the intermediary or from memory), loading the fragment in memory for processing, and incorporating the fragment into the web page. The code may initiate the action, the action comprising rendering the fragment based on a specified delay or after a subset of the plurality of fragments have been loaded. In some embodiments, the post-trigger action may include sending a request to the server for downloading a resource, the fragment or a related fragment. For example, a resource, such as a third-party tag or item, may be accessed for rendering with the fragment or as part of the fragment. The action may include pre-fetching a resource or a related fragment, e.g., to improve user experience.

In some embodiments, the code may initiate the action, the action comprising sending a request to the server, e.g., for downloading a resource, the second fragment or a related fragment. The code may initiate a corresponding action for rendering a specific fragment (e.g., the second fragment), the fragment comprising one of at least a portion of: an image, a cascading style sheet (CSS), a script, a video object, an audio object, a flash file or small web format (SWF) file, and a HTML file. The request may be intercepted or received by the intermediary. For example, the code may generate a message based on a unique identifier or marker, and/or send the message to the server as described above in connection with at least FIG. 2Q. The intermediary may generate and/or send a fragment corresponding to the unique identifier or marker, for incorporation into the web page or first fragment, as described above in connection with at least FIG. 2Q.

In some embodiments, the request to the server (for the fragment) may be intercepted or received by the intermediary. The intermediary may prevent this request (for a particular fragment) from reaching the server, e.g., since the server may not be able to identify the requested fragment, and may not be even aware that the web page has been split or fragmented by the intermediary.

In certain embodiments, the code may not detect one or more triggers for rendering a subset of the plurality of fragments (e.g., during the time the web page is presented at the client). For example, the user may not scroll from an initial viewing region that displays a portion of the web page. The absence of scrolling may avoid triggering a corresponding post-trigger action to render a fragment that resides beyond that initial viewing region. Also, by way of illustration, scrolling to another portion of the web page may trigger a post-trigger action for a fragment associated with that portion of the web page. However, post-trigger actions for some other fragments (e.g., outside of this portion) may not be triggered. Thus, certain fragments (e.g., that may not need to be displayed and/or used) may not have to be requested, delivered to the client, and/or rendered at the client. The use of interaction sequencing can therefore provide for an efficient management of network bandwidth, and may avoid unnecessary processing at the client and/or intermediary on fragments that are not needed, viewed and/or used at the client.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A system for managing rendering of a web page, the system comprising:
   one or more processors;
   a cache configured to store a plurality of fragments of a web page, each of the plurality of fragments having a rendering characteristic that comprises a trigger and an action for rendering of a corresponding fragment independent of other fragments of the plurality of fragments;
   a browser executable on the one or more processors, the browser configured to render a first fragment of the plurality of fragments provided from the cache;
   a sequencing engine executing on the one or more processors, the sequencing engine configured to:
      when the first fragment is rendered, dynamically detect, based on a rendering characteristic of a second fragment from the plurality of fragments that is to be provided from the cache, a trigger for rendering of the second fragment within the first fragment, the trigger comprising a user action to move a specific portion of the first fragment having a fragment pointer of the second fragment, into a viewing region of a client, and
      initiating, responsive to the detected trigger, a corresponding action for rendering of the second fragment within the specific portion of the first fragment having the fragment pointer of the second fragment.

2. The system of claim 1, comprising an intermediary between the client and a server of the web page, wherein the browser is configured to send a request to the server for the web page, and the intermediary is configured to intercept the request.

3. The system of claim 1, wherein each of the plurality of fragments has a rendering characteristic specified according to a configuration.

4. The system of claim 1, wherein the browser is further configured to perform a pre-trigger action for the second fragment prior to detecting the trigger, the pre-trigger action comprising at least one of: withholding rendering of the second fragment, displaying nothing at an identified location of the web page, and displaying at least one item, the at least one item comprising at least one of: an indicator or message indicating that an item is loading, a temporary or placeholder item or image, an advertisement, or a special call-to-action item.

5. The system of claim 1, wherein the sequencing engine is configured to detect a user event of the user action, comprising one of: a click event, a tap event, a touch event, a mouse-over event or a scroll event on the web page.

6. The system of claim 1, wherein the sequencing engine is configured to detect that the viewing region of the client includes the specific portion of the first fragment, responsive to the user action.

7. The system of claim 1, wherein the fragment pointer includes a unique identifier or a marker for the second fragment.

8. The system of claim 1, wherein the sequencing engine is configured to initiate the corresponding action, the corresponding action comprising replacing one or more displayed items with the rendering of the second fragment.

9. The system of claim 1, wherein the sequencing engine is configured to initiate the corresponding action, the corresponding action comprising rendering the second fragment immediately or as soon as the second fragment is available for rendering.

10. The system of claim 1, wherein the sequencing engine is configured to initiate the corresponding action, the corresponding action comprising rendering the second fragment according to a specified delay or after a subset of the plurality of fragments have been loaded.

11. A method for managing rendering of a web page in a browser, the method comprising:
   accessing, from a cache, a first fragment of a plurality of fragments of a web page, each of the plurality of fragments having a rendering characteristic that comprises a trigger and an action for rendering of a corresponding fragment independent of other fragments of the plurality of fragments;
   rendering, by a browser executable on a client, the first fragment obtained from the cache;
   dynamically detect, by a sequencing engine executing on the client when the first fragment is rendered, and based on a rendering characteristic of a second fragment from the plurality of fragments that is to be provided from the cache, a trigger for rendering of the second fragment within the first fragment, the trigger comprising a user action to move a specific portion of the first fragment having a fragment pointer of the second fragment, into a viewing region of the client, and
   initiating, by the sequencing engine responsive to the detected trigger, a corresponding action for rendering of the second fragment within the specific portion of the first fragment having the fragment pointer of the second fragment.

12. The method of claim 11, further comprising sending, by the browser, a request to a server for the web page, and intercepting, by an intermediary between the client and the server, the request.

13. The method of claim 11, further comprising specifying the rendering characteristic for each of the plurality of fragments according to a configuration.

14. The method of claim 11, further comprising performing, by the browser, a pre-trigger action for the second fragment prior to detecting the trigger, the pre-trigger action comprising at least one of: withholding rendering of the second fragment, displaying nothing at an identified location of the web page, and displaying at least one item, the at least one item comprising at least one of: an indicator or message indicating that an item is loading, a temporary or placeholder item or image, an advertisement, or a special call-to-action item.

15. The method of claim 11, further comprising detecting, by the sequencing engine, a user event of the user action comprising one of: a click event, a tap event, a touch event, a mouse-over event or a scroll event on the web page.

16. The method of claim 11, further comprising detecting, by the sequencing engine, that the viewing region of the client includes the specific portion of the first fragment, responsive to the user action.

17. The method of claim 11, the fragment pointer includes a unique identifier or a marker for the second fragment.

18. The method of claim 11, further comprising initiating, by the sequencing engine, the corresponding action, the corresponding action comprising replacing one or more displayed items with the rendering of the second fragment.

19. The method of claim 11, further comprising initiating, by the sequencing engine, the corresponding action, the corresponding action comprising rendering the second fragment immediately or as soon as the second fragment is available for rendering.

20. The method of claim 11, further comprising initiating, by the sequencing engine, the corresponding action, the corresponding action comprising rendering the second fragment according to a specified delay or after a subset of the plurality of fragments have been loaded.

* * * * *